United States Patent
Kawaguchi

(10) Patent No.: US 11,165,376 B2
(45) Date of Patent: Nov. 2, 2021

(54) MOVEMENT AND ELECTRONIC TIMEPIECE

(71) Applicant: Seiko Epson Corporation, Tokyo (JP)

(72) Inventor: Takashi Kawaguchi, Shiojiri (JP)

(73) Assignee: Seiko Epson Corporation

(*) Notice: Subject to any disclaimer, the term of this patent is extended or adjusted under 35 U.S.C. 154(b) by 153 days.

(21) Appl. No.: 16/367,706

(22) Filed: Mar. 28, 2019

(65) Prior Publication Data
US 2019/0302698 A1 Oct. 3, 2019

(30) Foreign Application Priority Data

Mar. 29, 2018 (JP) .............................. JP2018-065940

(51) Int. Cl.
| | |
|---|---|
| *H02P 8/12* | (2006.01) |
| *G04C 3/14* | (2006.01) |
| *H02P 6/16* | (2016.01) |
| *H02P 8/08* | (2006.01) |
| *H02P 8/34* | (2006.01) |
| *G04C 3/06* | (2006.01) |

(52) U.S. Cl.
CPC ................ *H02P 8/12* (2013.01); *G04C 3/067* (2013.01); *G04C 3/143* (2013.01); *H02P 6/16* (2013.01); *H02P 8/08* (2013.01); *H02P 8/34* (2013.01)

(58) Field of Classification Search
CPC ...... H02P 8/12; H02P 6/16; H02P 8/08; H02P 8/34; G04C 3/067; G04C 3/143
USPC ......................................................... 319/696
See application file for complete search history.

(56) References Cited

U.S. PATENT DOCUMENTS

| | | | | |
|---|---|---|---|---|
| 4,542,329 A | | 9/1985 | Tu Xuan | |
| 5,166,590 A | * | 11/1992 | Tu ........................... | G04C 3/143 318/685 |
| 5,247,235 A | * | 9/1993 | Tu .......................... | G04C 3/143 318/400.04 |
| 5,504,408 A | * | 4/1996 | Tu .......................... | G04C 3/143 318/685 |
| 6,072,752 A | * | 6/2000 | Igarashi ................... | G04C 3/14 368/187 |
| 6,265,891 B1 | * | 7/2001 | Yamada ............... | H02H 7/0844 318/490 |
| 6,344,802 B1 | * | 2/2002 | Otsuka ............... | G05B 19/0421 340/3.1 |

(Continued)

FOREIGN PATENT DOCUMENTS

| | | |
|---|---|---|
| JP | S59-046575 A | 3/1984 |
| JP | 2009-542186 A | 11/2009 |

*Primary Examiner* — Muhammad S Islam
*Assistant Examiner* — Devon A Joseph
(74) *Attorney, Agent, or Firm* — Harness, Dickey & Pierce, P.L.C.

(57) ABSTRACT

A movement includes a driver having ON and OFF states, and outputting a drive signal to a coil of a motor, a lower limit detector detecting that a current flowing through the coil is less than a lower limit, a drive controller bringing the driver into the ON state based on a result of the lower limit detector, and bringing the driver into the OFF state based on an elapsed time from the ON state, a polarity switcher switching a polarity of the drive signal when an elapsed time from the OFF state of the driver satisfies a switching condition, and a drive stopper stopping driving of the driver when the OFF time satisfies a stopping condition.

17 Claims, 32 Drawing Sheets

(56) References Cited

U.S. PATENT DOCUMENTS

| | | | | |
|---|---|---|---|---|
| 7,038,428 | B1* | 5/2006 | Sasaki | H02P 9/305 322/17 |
| 7,388,812 | B2* | 6/2008 | Nakamura | G04G 21/04 368/47 |
| 10,511,248 | B2* | 12/2019 | Saito | H02P 25/066 |
| 2003/0174584 | A1* | 9/2003 | Fujisawa | G04R 20/12 368/47 |
| 2003/0182975 | A1* | 10/2003 | Tomigashi | D06F 37/304 68/12.04 |
| 2003/0198140 | A1* | 10/2003 | Shimizu | G04R 20/12 368/47 |
| 2008/0215908 | A1* | 9/2008 | De Haas | G06F 1/3203 713/502 |
| 2008/0225648 | A1* | 9/2008 | Kawaguchi | G04C 10/04 368/66 |
| 2010/0001673 | A1 | 1/2010 | Cardoletti et al. | |
| 2016/0114687 | A1* | 4/2016 | Ichikawa | B60L 53/122 701/22 |
| 2016/0276967 | A1* | 9/2016 | Kawaguchi | G04C 3/146 |
| 2016/0344321 | A1* | 11/2016 | Sun | H02P 6/16 |
| 2017/0005605 | A1* | 1/2017 | Sun | H02P 6/20 |
| 2017/0277130 | A1* | 9/2017 | Saito | H02P 8/02 |
| 2017/0279395 | A1* | 9/2017 | Saito | H02K 37/14 |

* cited by examiner

MOVEMENT AND ELECTRONIC TIMEPIECE

The present application is based on, and claims priority from Japanese Patent Application Serial Number 2018-065940, filed Mar. 29, 2018, the disclosure of which is hereby incorporated by reference herein in its entirety.

BACKGROUND

1. Technical Field

The present disclosure relates to a movement and an electronic timepiece.

2. Related Art

There is a technique in which, in a case where a stepping motor driving a pointer of an electronic timepiece is controlled, the supply of a current to a coil of the motor is turned on such that the current is started to be supplied when the current flowing through the coil is equal to or less than a first threshold value, and is turned off such that the supply of the current is stopped when the current flowing through the coil is equal to or more than a second threshold value greater than the first threshold value, a position of a rotor of the motor is estimated on the basis of an ON time (current supply continuation time) or an OFF time (current supply stop time), and thus rotation of the motor is controlled (see, for example, JP-A-59-46575).

However, the ON time and the OFF time may change due to disturbances such as vibrations of the rotor caused by an external magnetic field or impact, and thus there is a problem in that accurate control cannot be performed in a case where a disturbance is received.

Particularly, in a stepping motor of an analog electronic timepiece in which current consumption is reduced to the minimum at which a motor is rotated, a drive force of the motor is small and is thus easily influenced by such a disturbance, and, as a result, there is concern that a problem such as an inaccurate hand position may occur.

SUMMARY

An advantage of some aspects of the present disclosure is to provide a movement and an electronic timepiece capable of being hardly influenced by a disturbance.

A movement according to an aspect of the present disclosure includes a drive unit that has an ON state and an OFF state, and outputs a drive signal to a coil of a motor so as to drive the motor; a lower limit detection unit that detects that a current flowing through the coil is less than a lower limit current value; a drive control unit that brings the drive unit into the ON state on the basis of a detection result in the lower limit detection unit, and brings the drive unit into the OFF state on the basis of an elapsed time from the ON state; a polarity switching unit that switches a polarity of the drive signal in a case where an OFF time which is an elapsed time from the OFF state of the drive unit satisfies a polarity switching condition; and a drive stopping unit that stops driving of the drive unit in a case where the OFF time satisfies a drive stopping condition.

According to the aspect of the present disclosure, the movement includes the drive stopping unit that stops driving of the drive unit in a case where the OFF time of the drive unit driving the motor satisfies a drive stopping condition. Here, the drive stopping condition is set to a condition which is not generated during a normal operation but is generated in a case where a disturbance such as an external magnetic field or impact is applied, and thus it can be detected that the influence of the disturbance is received. Therefore, driving of the drive unit driving the motor is stopped in that case, and thus it is possible to prevent the motor from being driven in a state of being influenced by the disturbance. Therefore, it is possible to prevent the occurrence of a problem that the motor is not accurately controlled due to disturbances, and thus a hand position is inaccurate.

A movement according to another aspect of the present disclosure includes a drive unit that has an ON state and an OFF state, and outputs a drive signal to a coil of a motor so as to drive the motor; a lower limit detection unit that detects that a current flowing through the coil is less than a lower limit current value; a drive control unit that brings the drive unit into the ON state on the basis of a detection result in the lower limit detection unit, and brings the drive unit into the OFF state on the basis of an elapsed time from the ON state; a polarity switching unit that switches a polarity of the drive signal in a case where an OFF time which is an elapsed time from the OFF state of the drive unit satisfies a polarity switching condition; and a drive stopping unit that stops driving of the drive unit in a case where an elapsed time from the time of starting driving or the time of switching a polarity satisfies a drive stopping condition.

According to the aspect of the present disclosure, the movement includes the drive stopping unit that stops driving of the drive unit in a case where an elapsed time from the time of starting driving or an elapsed time from the time of switching a polarity satisfies a drive stopping condition. Here, the drive stopping condition is set to such a long elapsed time which is not generated during a normal operation since driving is started by using the next drive signal of which a polarity is switched, and thus it can be detected that the influence of a disturbance is received. Therefore, driving of the drive unit driving the motor is stopped in that case, and thus it is possible to prevent the motor from being driven in a state of being influenced by the disturbance. Therefore, it is possible to prevent the occurrence of a problem that the motor is not accurately controlled due to disturbances, and thus a hand position is inaccurate.

A movement according to still another aspect of the present disclosure includes a drive unit that has an ON state and an OFF state, and outputs a drive signal to a coil of a motor so as to drive the motor; an upper limit detection unit that detects that a current flowing through the coil is more than an upper limit current value; a drive control unit that brings the drive unit into the OFF state on the basis of a detection result in the upper limit detection unit, and brings the drive unit into the ON state on the basis of an elapsed time from the OFF state; a polarity switching unit that switches a polarity of the drive signal in a case where an ON time which is an elapsed time from the ON state of the drive unit satisfies a polarity switching condition; and a drive stopping unit that stops driving of the drive unit in a case where the ON time satisfies a drive stopping condition.

According to the aspect of the present disclosure, the movement includes the drive stopping unit that stops driving of the drive unit in a case where the ON time of the drive unit driving the motor satisfies a drive stopping condition. Here, the drive stopping condition is set to a condition which is not generated during a normal operation but is generated in a case where a disturbance such as an external magnetic field or impact is applied, and thus it can be detected that the influence of a disturbance is received. Therefore, driving of the drive unit driving the motor is stopped in that case, and thus it is possible to prevent the motor from being driven in a state of being influenced by the disturbance. Therefore, it is possible to prevent the occurrence of a problem that the motor is not accurately controlled due to disturbances, and thus a hand position is inaccurate.

A movement according to still another aspect of the present disclosure includes a drive unit that has an ON state and an OFF state, and outputs a drive signal to a coil of a motor so as to drive the motor; an upper limit detection unit that detects that a current flowing through the coil is more than an upper limit current value; a drive control unit that brings the drive unit into the OFF state on the basis of a detection result in the upper limit detection unit, and brings the drive unit into the ON state on the basis of an elapsed time from the OFF state; a polarity switching unit that switches a polarity of the drive signal in a case where an ON time which is an elapsed time from the ON state of the drive unit satisfies a polarity switching condition; and a drive stopping unit that stops driving of the drive unit in a case where an elapsed time from the time of starting driving or the time of switching a polarity satisfies a drive stopping condition.

According to the aspect of the present disclosure, the movement includes the drive stopping unit that stops driving of the drive unit in a case where an elapsed time from the time of starting driving or the time of switching a polarity satisfies a drive stopping condition. Here, the drive stopping condition is set to such a long elapsed time which is not generated during a normal operation since driving is started by using the next drive signal of which a polarity is switched, and thus it can be detected that the influence of a disturbance is received. Therefore, driving of the drive unit driving the motor is stopped in that case, and thus it is possible to prevent the motor from being driven in a state of being influenced by the disturbance. Therefore, it is possible to prevent the occurrence of a problem that the motor is not accurately controlled due to disturbances, and thus a hand position is inaccurate.

A movement according to still another aspect of the present disclosure includes a drive unit that has an ON state and an OFF state, and outputs a drive signal to a coil of a motor so as to drive the motor; a lower limit detection unit that detects that a current flowing through the coil is less than a lower limit current value; an upper limit detection unit that detects that a current flowing through the coil is more than an upper limit current value; a drive control unit that brings the drive unit into the ON state on the basis of a detection result in the lower limit detection unit, and brings the drive unit into the OFF state on the basis of a detection result in the upper limit detection unit; a polarity switching unit that switches a polarity of the drive signal in a case where a relationship between an ON time which is an elapsed time from the ON state of the drive unit and an OFF time which is an elapsed time from the OFF state of the drive unit satisfies a polarity switching condition; and a drive stopping unit that stops driving of the drive unit in a case where the relationship between the ON time and the OFF time satisfies a drive stopping condition.

According to the aspect of the present disclosure, the movement includes the drive stopping unit that stops driving of the drive unit in a case where the relationship between the ON time of the drive unit and the OFF time of the drive unit satisfies a drive stopping condition. Here, the drive stopping condition is set to a condition which is not generated during a normal operation but is generated in a case where a disturbance such as an external magnetic field or impact is applied, and thus it can be detected that the influence of a disturbance is received. Therefore, driving of the drive unit driving the motor is stopped in that case, and thus it is possible to prevent the motor from being driven in a state of being influenced by the disturbance. Therefore, it is possible to prevent the occurrence of a problem that the motor is not accurately controlled due to disturbances, and thus a hand position is inaccurate.

In the movement according to the aspect of the present disclosure, the polarity switching unit may determine that the polarity switching condition is satisfied in a case where the OFF time is longer than a first switching determination time, and is shorter than a first stop determination time, and the drive stopping unit may determine that the drive stopping condition is satisfied in a case where the OFF time is equal to or longer than the first stop determination time.

In a case where a rotor is rotated by one step by turning on and off the drive unit such that a plurality of drive signals are input to the coil, a rotation angle of the rotor is in conjunction with an OFF time of the drive unit, the OFF time of the drive unit is short at the time of starting rotation of the rotor, and the OFF time is lengthened as rotation of the rotor comes close to an end. Therefore, in a case where the OFF time of the drive unit is longer than the first switching determination time, and is shorter than the first stop determination time, it can be determined that rotation of the rotor corresponding to one step is finished. Since a polarity of a drive signal is switched at this timing, the rotor can be further rotated by one step through the next-step driving of the motor.

A case where an OFF time is equal to or longer than the first stop determination time does not occur during a normal operation. Thus, the drive stopping unit can easily detect that the influence of a disturbance is received. Therefore, driving of the drive unit is stopped, and thus it is possible to prevent the motor from being driven in a state of being influenced by the disturbance.

In the movement according to the aspect of the present disclosure, the polarity switching unit may determine that the polarity switching condition is satisfied in a case where the elapsed time from the time of starting driving or the time of switching a polarity is shorter than a second stop determination time, and the OFF time is longer than a first switching determination time, and the drive stopping unit may determine that the drive stopping condition is satisfied in a case where the elapsed time from the time of starting driving or the time of switching a polarity is equal to or longer than the second stop determination time.

In the aspect of the present disclosure, in a case where the elapsed time from the time of starting driving or the time of switching a polarity is shorter than the second stop determination time, and the OFF time of the drive unit is longer than the first switching determination time, it can be determined that rotation of the rotor corresponding to one step is finished. Since a polarity of a drive signal is switched at this timing, the rotor can be further rotated by one step.

A case where the elapsed time from the time of starting driving or the time of switching a polarity is equal to or longer than the second stop determination time, that is, the next-step driving is not started even if the second stop determination time has elapsed does not occur during a normal operation. Thus, the drive stopping unit can easily detect that the influence of a disturbance is received. Therefore, driving of the drive unit is stopped, and thus it is possible to prevent the motor from being driven in a state of being influenced by the disturbance.

In the movement according to the aspect of the present disclosure, the polarity switching unit may determine that the polarity switching condition is satisfied in a case where the ON time is shorter than a second setting time after a first setting time elapses from the time of starting driving or the time of switching a polarity, and the drive stopping unit may determine that the drive stopping condition is satisfied in a case where the ON time is shorter than the second setting time before the first setting time elapses from the time of starting driving or the time of switching a polarity.

Typically, an ON time of the drive unit is shortened according to rotation of the rotor, and the ON time is shorter than the second setting time in a case where rotation of the rotor corresponding to one step (for example, 180°) is finished. On the other hand, excluding an exception such as the time right after driving is started, a case where an ON time is shorter than the second setting time from the time of starting driving to the time at which the first setting time elapses does not occur during a normal operation.

Therefore, in a case where an ON time of the drive unit is shorter than the second setting time after the first setting time elapses, it can be determined that rotation of the rotor corresponding to one step is finished. Since a polarity of a drive signal is switched at this timing, the rotor can be further rotated by one step.

In a case where an ON time of the drive unit is shorter than the second setting time after driving is started and before the first setting time elapses, the drive stopping unit can easily detect that the influence of a disturbance is received. Therefore, driving of the drive unit is stopped, and thus it is possible to prevent the motor from being driven in a state of being influenced by the disturbance.

In the movement according to the aspect of the present disclosure, in a case where the ON time is indicated by Ton, and the OFF time is indicated by Toff, in each cycle of the drive signal output from the drive unit, the polarity switching unit may determine that the polarity switching condition is satisfied in a case where Ton/(Ton+Toff) is equal to or less than a switching setting value, and the drive stopping unit may determine that the drive stopping condition is satisfied in a case where Ton/(Ton+Toff) increases during driving.

Typically, excluding an exception such as time right after driving is started, an ON time of the drive unit is shorted, and an OFF time thereof is lengthened, according to rotation of the rotor. Thus, in a case where a proportion (Ton/(Ton+Toff)) of the ON time Ton to one cycle of a drive signal, that is, a time obtained by adding the ON time Ton to the OFF time Toff is equal to or less than the switching setting value, it can be determined that rotation of the rotor corresponding to one step is finished. Since a polarity of a drive signal is switched at this timing, the rotor can be further rotated by one step.

Typically, Ton/(Ton+Toff) sequentially decreases, and a case where Ton/(Ton+Toff) increases during driving does not occur during a normal operation. Thus, the drive stopping unit can easily detect that the influence of a disturbance is received. Therefore, driving of the drive unit is stopped, and thus it is possible to prevent the motor from being driven in a state of being influenced by the disturbance.

The movement according to the aspect of the present disclosure may further include a timer that detects that an elapsed time from the drive unit being stopped by the drive stopping unit becomes a standby setting time, the drive control unit may resume driving of the drive unit in a case where the timer detects that the elapsed time becomes the standby setting time.

The drive stopping unit can stop driving of the drive unit by detecting the influence of a disturbance such as an external magnetic field. Thereafter, driving of the drive unit can be automatically resumed after a standby setting time (for example, one second) elapses. The standby setting time is set to a time for which it can be expected that the influence of the disturbance disappears, and thus it is possible to reduce a probability of receiving the influence of the disturbance after driving is resumed. Thus, after driving is resumed, the motor can be driven by a desired movement amount, and thus a pointer can be automatically moved to a desired indication position even in a case where the pointer is moved by the motor.

The movement according to the aspect of the present disclosure may further include a magnetic field detector that detects an external magnetic field, and the drive control unit may resume driving of the drive unit according to an output from the magnetic field detector in a case where the drive unit is stopped by the drive stopping unit.

According to the aspect of the present disclosure, driving of the drive unit can be resumed after the magnetic field detector detects that an external magnetic field disappears. Therefore, after driving is resumed, the motor can be reliably driven by a desired movement amount, and thus a pointer can be reliably moved to a desired indication position even in a case where the pointer is moved by the motor.

In the movement according to the aspect of the present disclosure, the magnetic field detector may include a control unit that brings at least one end of the coil into any of a high impedance state, a pull-down state, and a pull-up state, and a voltage detection unit that detects a voltage generated in one end of the coil.

Since the coil of the motor can be used as a part of the magnetic field detector, a configuration can be simplified compared with a case where a dedicated magnetic sensor is separately provided, and cost can also be reduced.

In the movement according to the aspect of the present disclosure, the magnetic field detector may include a chopper amplification circuit that subjects a voltage generated in at least one end of the coil to chopper amplification, and a voltage detection unit that detects the voltage.

Since the magnetic field detector can subject an induced voltage in the coil to the chopper amplification with the chopper amplification circuit, it is possible to improve the sensitivity of external magnetic field detection, to determine the presence or absence of an external magnetic field with high accuracy, and also to increase a certainty of driving at the time of resuming.

In the movement according to the aspect of the present disclosure, the drive control unit may output the drive signal in one step or a plurality of steps after a standby setting time elapses from the drive unit being stopped by the drive stopping unit, and resume driving of the drive unit in a case where a drive stopping condition for the drive unit is not satisfied at the time of outputting the drive signal.

After driving of the drive unit is stopped by the drive stopping unit, a drive signal is output in one step or a plurality of steps, for example, two steps, and thus it is possible to check whether or not the drive stopping condition is satisfied, that is, the influence of a disturbance is received. Therefore, it is not necessary to add a special detection unit such as a magnetic sensor detecting the influence of a disturbance, and it can be determined whether or not driving is resumed with a simple configuration.

Since the movement according to the aspect of the present disclosure can stop driving of the motor in a case where the influence of a disturbance is received, and can resume driving of the motor in a case where the influence of a disturbance is reduced, it is possible to implement the movement capable of increasing driving accuracy even in a case where a disturbance is present.

An electronic timepiece according to a still another aspect of the present disclosure includes the movement.

According to the electronic timepiece, a pointer can be moved with the movement having the motor control circuit, and thus it is possible to increase indication accuracy of the pointer. Particularly, even an analog electronic timepiece in which current consumption is reduced to the minimum for rotating a motor can be hardly influenced by a disturbance, and thus it is possible to improve indication accuracy of a hand.

DESCRIPTION OF EXEMPLARY EMBODIMENTS

Figure 1:
FIG. 1 is a front view illustrating an electronic timepiece of a first embodiment.

Hereinafter, with reference to the drawings, embodiments of the present disclosure will be described.

First, a theory of a motor drive control to which the present disclosure is applied will be described.

In a case where control is performed such that, when a current flowing through a motor exceeds an upper limit current value Imax, a drive unit is turned off, and when the current is less than a lower limit current value Imin, the drive unit is turned on, assuming that a difference between Imax and Imin is sufficiently smaller than a current value of Imax or Imin, a voltage Vc of both ends of a coil, a coil resistance R, an inductance L of the coil, a drive current i, and an induced voltage V have a relationship of $Vc=R*i+L*di/dt+V$. In a case where an ON time Ton which is an elapsed time for an ON state of the drive unit and an OFF time Toff which is an elapsed time from an OFF state thereof are sufficiently short, this leads to $i \approx (Imax+Imin)/2$. When the drive unit is in an ON state, a power source voltage is indicated by E, and thus Vc is E, so that $E=R*i+L*di/dt+V$ (1) is obtained.

In a case where the ON time Ton is sufficiently short, $di/dt=(Imax-Imin)/Ton$ (2) is obtained.

When the drive unit is in an OFF state, Vc is 0, and thus $0=R*i+L*di/dt+V$ (3) is given.

In a case where the OFF time Toff is sufficiently short, $di/dt=(Imin-Imax)/Toff$ (4) is obtained.

A relationship of $V=E*Ton/(Ton+Toff)-R*i$ (5) is obtained on the basis of the above (1) to (4). Since the induced voltage is correlated with a rotation position of a rotor, in a case where Imax and Imin are fixed according to Equation (5), a rotation position of the rotor can be estimated on the basis of a relationship between Ton and Toff, and thus phase switching, that is, polarity switching of a drive signal can be performed at a desired timing.

Here, in a case where Ton and Imin are fixed, and Ton is sufficiently small, Imax≅Imin≅i is obtained, and thus polarity switching of a drive signal can be performed at a desired timing by estimating a rotation position of the rotor on the basis of only Toff.

Here, in a case where Toff and Imax are fixed, and Toff is sufficiently small, Imax≅Imin≅i is obtained, and thus polarity switching of a drive signal can be performed at a desired timing by estimating a rotation position of the rotor on the basis of only Ton.

However, in a case where a magnetic field is applied from the outside, or a rotational speed of the rotor changes due to impact, such a relationship is not established, and thus polarity switching of a drive signal may not be performed at an optimal timing.

Thus, in the embodiments of the present disclosure, a novel function of stopping driving is added in a case where Ton and Toff have numerical values which are not present during normal times, or do not have expected numerical values for a predetermined time, and thus a wrong operation is prevented. Hereinafter, each embodiment of the present disclosure will be described.

First Embodiment

Hereinafter, with reference to the drawings, an electronic timepiece 1 according to a first embodiment of the present disclosure will be described.

As illustrated in FIG. 1, the electronic timepiece 1 is a wristwatch mounted on a user's wrist, and includes an outer case 2, a disk-shaped dial 3, a movement (not illustrated), a stepping motor 13 (refer to FIG. 2; and hereinafter, referred to as a motor 13) provided in the movement, a second hand 5, a minute hand 6, an hour hand 7 which are driven pointers, and a crown 8 and a button 9 as operation members.

Circuit Configuration of Electronic Timepiece

Figure 2:
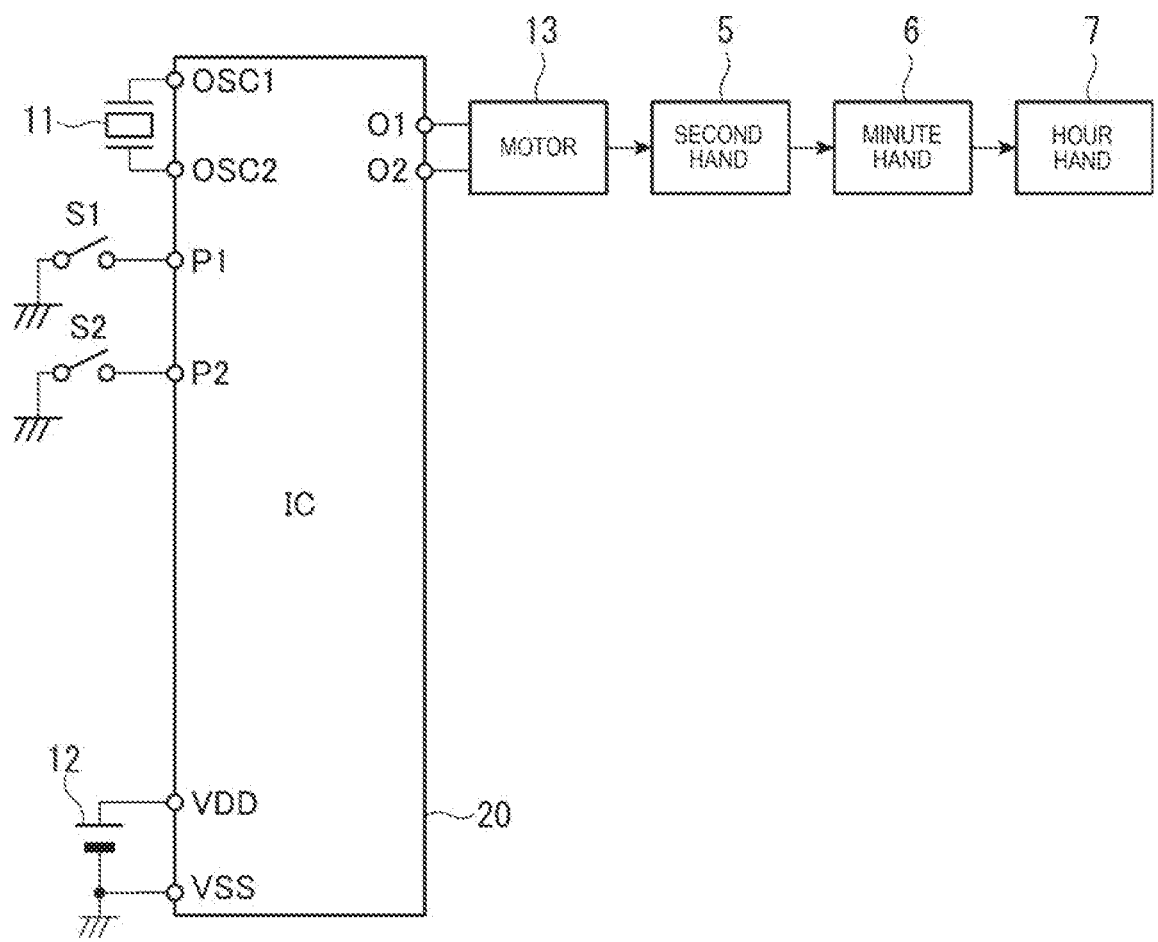
FIG. 2 is a circuit diagram illustrating a circuit configuration of the electronic timepiece according to the first embodiment.

As illustrated in FIG. 2, the electronic timepiece 1 includes a quartz crystal resonator 11 which is a signal source, a battery 12 which is a power source, a switch S1 which is turned on and off in conjunction with an operation on the button 9, a switch S2 which is turned on and off in conjunction with an extraction operation on the crown 8, and the motor 13, and an IC 20 for the timepiece.

Configuration of Motor

Figure 3:
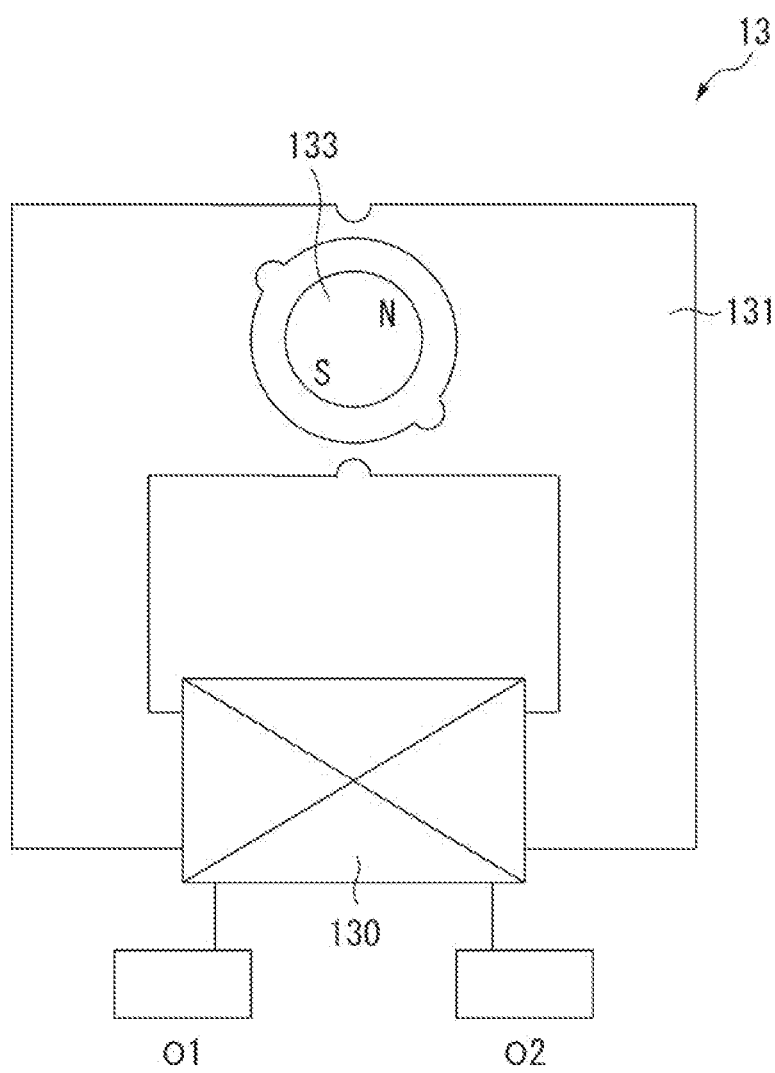
FIG. 3 is a diagram illustrating a configuration of a motor of the electronic timepiece according to the first embodiment.

As illustrated in FIG. 3, the motor 13 includes a stator 131, a coil 130, and a rotor 133. Both ends of the coil 130 are electrically connected to output terminals O1 and O2 of a driver 51 which will be described later, and the rotor 133 is a magnet which is magnetized to two poles in a diameter direction. Therefore, the motor 13 is a bipolar single-phase stepping motor used for an electronic timepiece, and is driven by motor drive pulses (drive signals) output from the output terminals O1 and O2 of the IC 20 as will be described later.

The second hand 5, the minute hand 6, and the hour hand 7 are in conjunction with each other by a gear train (not illustrated), and are driven by the motor 13 so as to respectively display a second, a minute, and an hour. In the present embodiment, the second hand 5, the minute hand 6, and the hour hand 7 are driven by the single motor 13, but a plurality of motors may be provided, such as a motor driving the second hand 5, and a motor driving the minute hand 6 and the hour hand 7.

As illustrated in FIG. 2, the IC 20 has connection terminals OSC1 and OSC2 connected to the quartz crystal resonator 11, input/output terminals P1 and P2 connected to the switches S1 and S2, power source terminals VDD and VSS connected to the battery 12, and the output terminals O1 and O2 connected to the coil 130 of the motor 13.

In the present embodiment, a positive electrode of the battery 12 is connected to the high potential side power source terminal VDD, a negative electrode thereof is connected to the low potential side power source terminal VSS, and the low potential side power source terminal VSS is set to be grounded (for example, a reference potential).

The quartz crystal resonator 11 is driven by an oscillation circuit 21 which will be described later, and generates an oscillation signal.

The battery 12 is configured with a primary battery or a secondary battery. In a case of the secondary battery, the battery is charged by a solar cell (not illustrated).

The switch S1 is operated in conjunction with the button 9 located at the position of two o'clock of the electronic timepiece 1, and is brought into an ON state in a state in which the button 9 is pushed, and is brought into an OFF state in a state in which the button 9 is not pushed.

The switch S2 is a slide switch operated in conjunction with the crown 8. In the present embodiment, the switch S2 is brought into an ON state in a state in which the crown 8 is drawn out to the first stage, and is in an OFF state in the zero-th stage.

Circuit Configuration of IC

Figure 4:
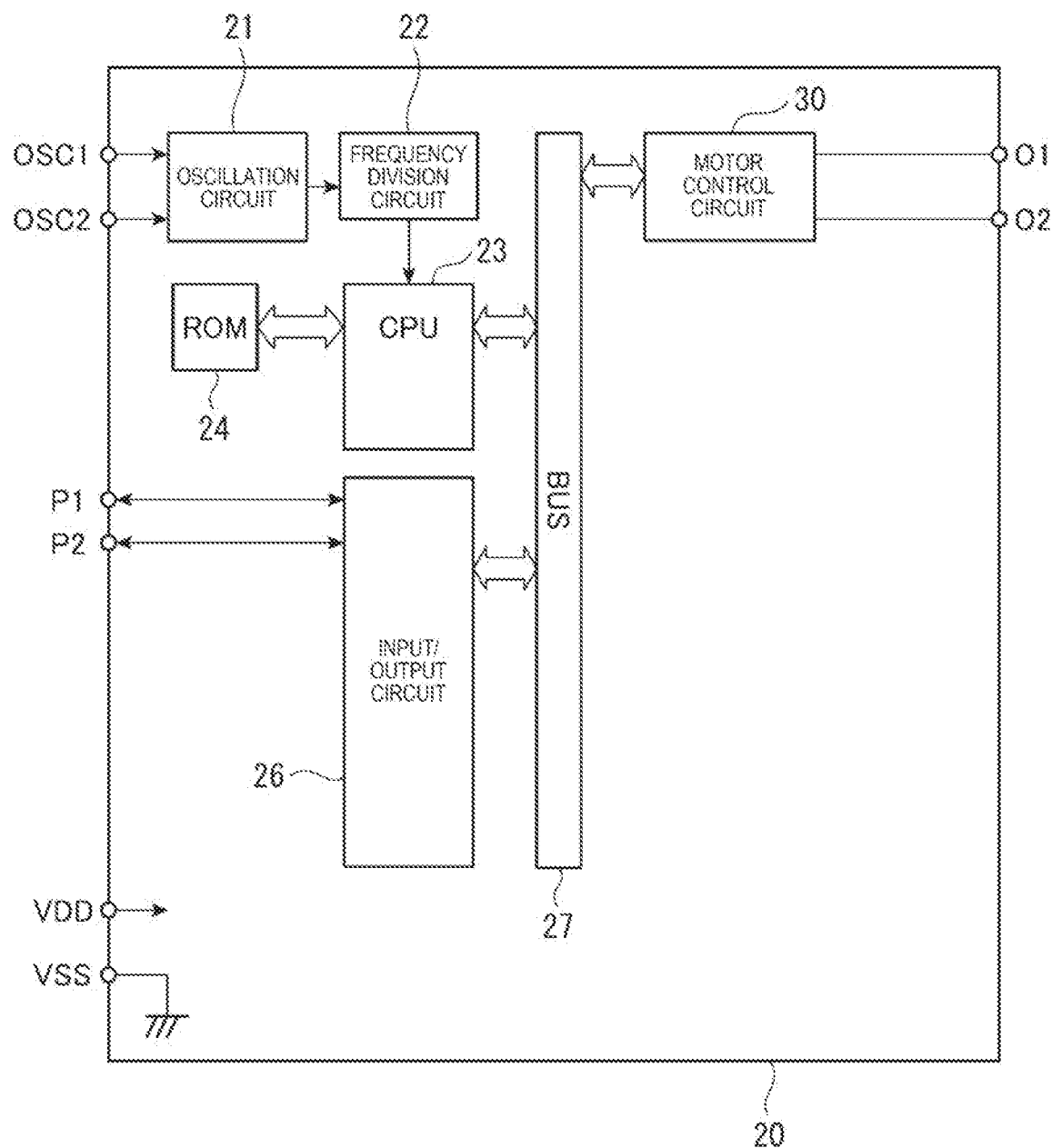
FIG. 4 is a configuration diagram illustrating a configuration of an IC of the electronic timepiece according to the first embodiment.

As illustrated in FIG. 4, the IC 20 includes the oscillation circuit 21, a frequency division circuit 22, a central processing unit (CPU, processor) 23 for control of the electronic timepiece 1, a read only memory (ROM) 24, an input/output circuit 26, a bus 27, and a motor control circuit 30.

The oscillation circuit 21 causes the quartz crystal resonator 11 which is a reference signal source to oscillate at a high frequency, and outputs an oscillation signal having a predetermined frequency (for example, 32768 Hz) generated through high frequency oscillation, to the frequency division circuit 22.

The frequency division circuit 22 frequency-divides the output from the oscillation circuit 21, so as to supply a timing signal (clock signal) to the CPU 23.

The ROM 24 stores various programs executed by the CPU 23. In the present embodiment, the ROM 24 stores programs for realizing a fundamental timepiece function.

The CPU 23 executes the programs stored in the ROM 24 so as to realize the respective functions.

The input/output circuit 26 outputs states of the input/output terminals P1 and P2 to the bus 27. The bus 27 is used to transmit data among the CPU 23, the input/output circuit 26, and the motor control circuit 30.

The motor control circuit 30 outputs a predetermined drive signal (that is, a drive pulse) in response to a communication which is input from the CPU 23 via the bus 27.

Configuration of Motor Control Circuit

Figure 5:
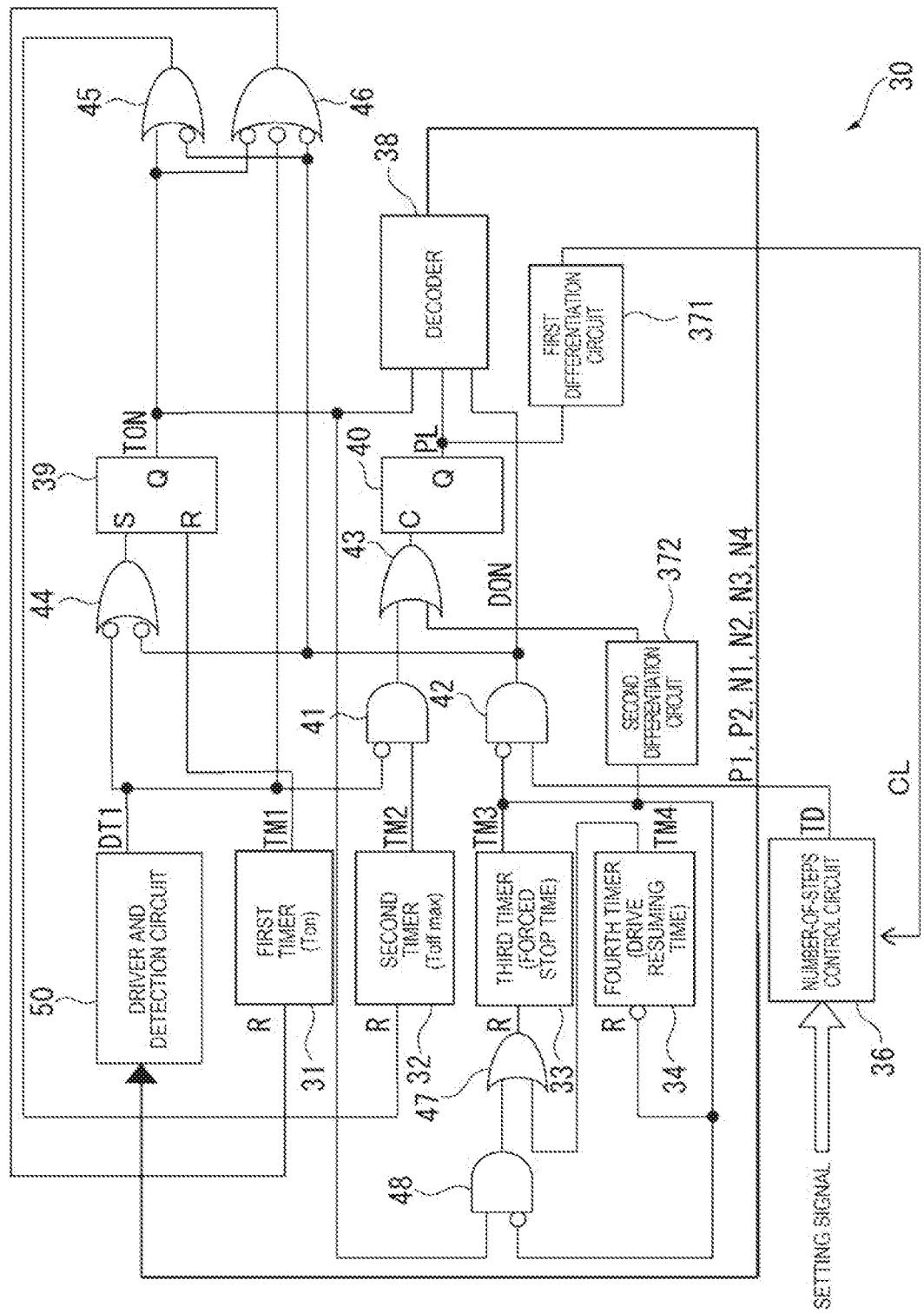
FIG. 5 is a circuit diagram illustrating a configuration of a motor control circuit according to the first embodiment.

As illustrated in FIG. 5, the motor control circuit 30 includes a first timer 31, a second timer 32, a third timer 33, a fourth timer 34, a number-of-steps control circuit 36, a first differentiation circuit 371, a second differentiation circuit 372, a decoder 38, an SR latch circuit 39, a flip-flop 40, AND circuits 41, 42, and 48, OR circuits 43, 44, 45, 46, and 47, and a driver and detection circuit 50.

The first timer 31 is a timer measuring a time t1 for which a current is supplied to the coil 130 of the motor 13. An output TM1 from the first timer 31 is turned to an H level after the time t1 elapses from the time at which a reset terminal R of the first timer 31 is turned to an L level such that a reset state thereof is canceled.

The second timer 32 is a timer measuring a determination time t2 related to a condition for switching a polarity of a current flowing through the coil 130 of the motor 13. In other words, the determination time t2 is a first switching determination time. An output TM2 from the second timer 32 is turned to an H level after the time t2 elapses from the time at which a reset terminal R of the second timer 32 is turned to an L level such that a reset state thereof is canceled.

The third timer 33 is a timer measuring a time t3 related to a condition for temporarily stopping driving of the motor 13. In other words, the time t3 is a first stop determination time. An output TM3 from the third timer 33 is turned to an H level after the time t3 elapses from the time at which a reset terminal R of the third timer 33 is turned to an L level such that a reset state thereof is canceled.

The fourth timer 34 is a timer measuring a standby time t4 until driving of the motor is resumed. In other words, the standby time t4 is a standby setting time. An output TM4 from the fourth timer 34 is turned to an H level after the time t4 elapses from the time at which a reset terminal R of the fourth timer 34 is turned to an H level such that a reset state thereof is canceled.

The driver and detection circuit 50 is a circuit which supplies a current to the coil 130 of the motor 13 and determines whether or not a value of the current flowing through the coil 130 exceeds a predetermined value. Details of the driver and detection circuit 50 will be described later with reference to FIG. 6.

The number-of-steps control circuit 36 includes a presettable down-counter, and outputs a drive period signal TD. The number-of-steps control circuit 36 sets the drive period signal TD in an H level until a preset value of the presettable down-counter set by a setting signal is counted down and becomes 0 by using a clock signal CL, and turns the drive period signal TD to an L level when the presettable down-counter becomes 0.

The setting signal which is input to the number-of-steps control circuit 36 is input from, for example, the CPU 23 via the bus 27.

The decoder 38 receives a signal TON for switching ON and OFF of an drive signal output which will be described later, a drive polarity signal PL for switching a polarity of a drive signal, and a drive signal DON for controlling starting and stopping of the driver 51, and outputs gate signals P1, P2, N1, N2, N3, and N4 to the driver and detection circuit 50 depending on states of the signals as illustrated in timing charts in FIGS. 8 to 10 which will be described later. Therefore, a drive control unit controlling driving of the driver 51 which is a drive unit is configured to include the decoder 38.

The first differentiation circuit 371 outputs a differentiation pulse whenever the drive polarity signal PL rises and falls.

The second differentiation circuit 372 outputs a differentiation pulse whenever the timer signal TM3 rises.

The AND circuit 41 receives a signal obtained by inverting an output DT1 from the driver and detection circuit 50 and the output TM2 from the second timer 32.

The AND circuit 42 receives a signal obtained by inverting the output TM3 from the third timer 33, and the output TD from the number-of-steps control circuit 36.

The OR circuit 43 receives an output from the AND circuit 41 and an output from the second differentiation circuit 372.

The OR circuit 44 receives a signal obtained by inverting the output DT1 from the driver and detection circuit 50, and a signal obtained by inverting the output DON from the AND circuit 42.

The SR latch circuit 39 has a set terminal S to which an output from the OR circuit 44 is input, and a reset terminal R to which the output TM1 from the first timer 31 is input. The SR latch circuit 39 outputs an ON/OFF switching signal TON from an output terminal Q.

The flip-flop 40 has a clock terminal C to which an output from the OR circuit 43 is input. The flip-flop outputs the drive polarity signal PL from an output terminal Q.

The OR circuit 45 receives an inverted signal of the output DON from the AND circuit 42, and the signal TON output from the SR latch circuit 39. An output from the OR circuit 45 is input to the reset terminal R of the second timer 32.

The OR circuit 46 receives an inverted signal of the output DON from the AND circuit 42, an inverted signal of the output TON from the SR latch circuit 39, and an inverted signal of the output DT1 from the driver and detection circuit 50. An output from the OR circuit 46 is input to the reset terminal R of the first timer 31.

The AND circuit 48 receives the output TON from the SR latch circuit 39, and an inverted signal of the output TM3 from the third timer 33.

The OR circuit 47 receives an output from the AND circuit 48, and the output TM4 from the fourth timer 34. An output from the OR circuit 47 is input to the reset terminal R of the third timer 33.

The output TM3 from the third timer 33 is inverted to be input to the reset terminal R of the fourth timer 34.

Configurations of Driver and Detection Circuit

Figure 6:
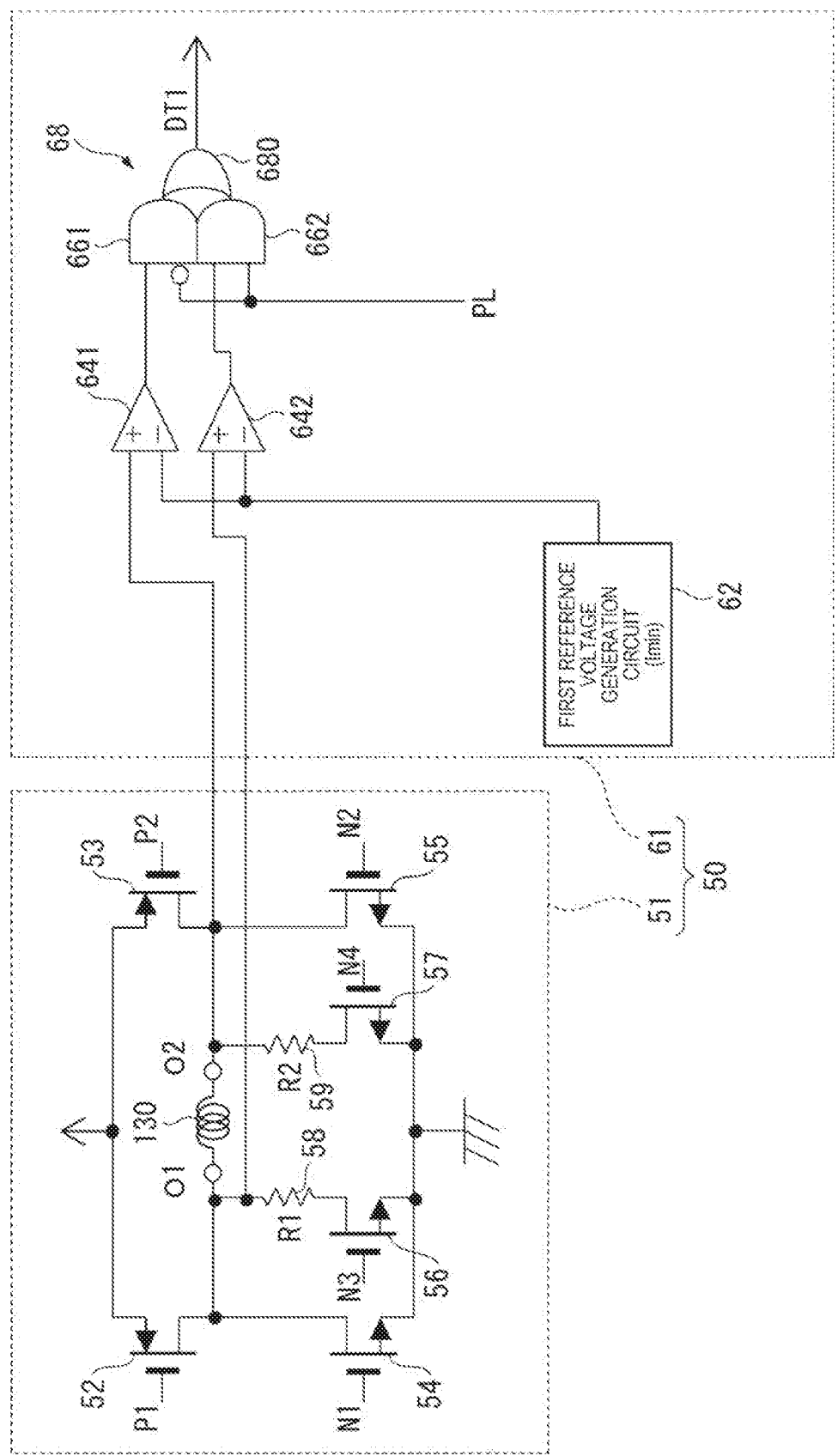
FIG. 6 is a circuit diagram illustrating configurations of a driver and a detection circuit according to the first embodiment.

The driver and detection circuit 50 includes the driver 51 and a current detection circuit 61 as illustrated in FIG. 6.

The driver 51 includes two Pch transistors 52 and 53, four Nch transistors 54, 55, 56, and 57, and two detection resistors 58 and 59. The respective transistors 52 to 57 are controlled according to the gate signals P1, P2, N1, N2, N3, and N4 output from the decoder 38, and supplies currents to the coil 130 of the motor 13 in both of a forward direction and a backward direction. Therefore, the driver 51 is a drive unit which outputs a drive signal to the coil 130 of the motor 13 and drives the motor 13.

The current detection circuit 61 includes a first reference voltage generation circuit 62, comparators 641 and 642, and a complex gate 68. The complex gate 68 is a single element having a function equivalent to a combination of AND circuits 661 and 662 and an OR circuit 680 as illustrated in FIG. 6.

The comparators 641 and 642 respectively compare voltages generated in both ends of the detection resistors 58 and 59 having resistance values R1 and R2 with a voltage from the first reference voltage generation circuit 62.

Since the drive polarity signal PL is inverted to be input to the AND circuit 661, and the drive polarity signal PL is input to the AND circuit 662 without being inverted, an output from one of the comparators 641 and 642 selected according to the drive polarity signal PL is output as the output DT1.

The first reference voltage generation circuit 62 is set to output a potential corresponding to voltages generated in both ends of the detection resistors 58 and 59 in a case where a current flowing through the coil 130 is the lower limit current value Imin.

Therefore, in a case where a current I flowing through the coil 130 is equal to or more than the lower limit current value Imin, voltages generated in both ends of the detection resistors 58 and 59 exceed an output voltage from the first reference voltage generation circuit 62, and thus the detection signal DT1 is turned to an H level. On the other hand, in a case where the current I is less than the lower limit current value Imin, the detection signal DT1 is turned to an L level. Therefore, the current detection circuit 61 is a lower limit detection unit that detects that the current I flowing through the coil 130 is less than the lower limit current value Imin.

Control Process of Motor Control Circuit

Next, control performed by the motor control circuit 30 of the present embodiment will be described with reference to a flowchart in FIG. 7, and timing charts in FIGS. 8 to 10. FIG. 8 is a timing chart illustrating an operation of the motor control circuit 30 of the present embodiment during normal times, FIG. 9 is a timing chart in a comparative example showing a defect due to a disturbance such as an external magnetic field, and FIG. 10 is a timing chart illustrating an operation of the motor control circuit 30 of the present embodiment in a case where a disturbance such as an external magnetic field occurs. The comparative example illustrated in FIG. 9 corresponds to an operation example in a case where the third timer 33 and the fourth timer 34 are omitted from the motor control circuit 30 of the present embodiment.

Operation of Motor Control Circuit

In a case where drive control for the motor 13 is started, the CPU 23 of the IC 20 outputs a setting signal for setting a movement amount of a pointer to the number-of-steps control circuit 36 of the motor control circuit 30. For example, in a case where the number of steps for moving the second hand 5 by one second is "5", the CPU 23 outputs a signal for setting a setting value n of the number-of-steps control circuit 36 to "5" every second (SA1).

After the CPU 23 outputs the setting signal, and the setting value n of the number-of-steps control circuit is set, the following control is performed by each circuit of the motor control circuit 30. In other words, the CPU 23 may only output a setting signal for setting a drive amount of the motor 13 to the motor control circuit 30 at a timing at which the motor 13 is driven.

In a case where the setting value n=5 is set in the number-of-steps control circuit 36 according to the setting signal, the drive period signal TD is turned to an H level, the output DON from the AND circuit 42 is turned to an H level, the decoder 38 turns on the driver 51 of the motor 13 by using the gate signals P1, P2, N1, N2, N3, and N4 (SA2), and thus a forward current flows through the coil 130. In the flowchart and the following description, turning on the driver 51 indicates that the driver 51 is controlled to be brought into an ON state in which a drive current can be made to flow through the coil 130, and turning off the driver 51 indicates that the driver 51 is controlled to be brought into an OFF state in which a drive current cannot be made to flow through the coil 130.

Figure 8:
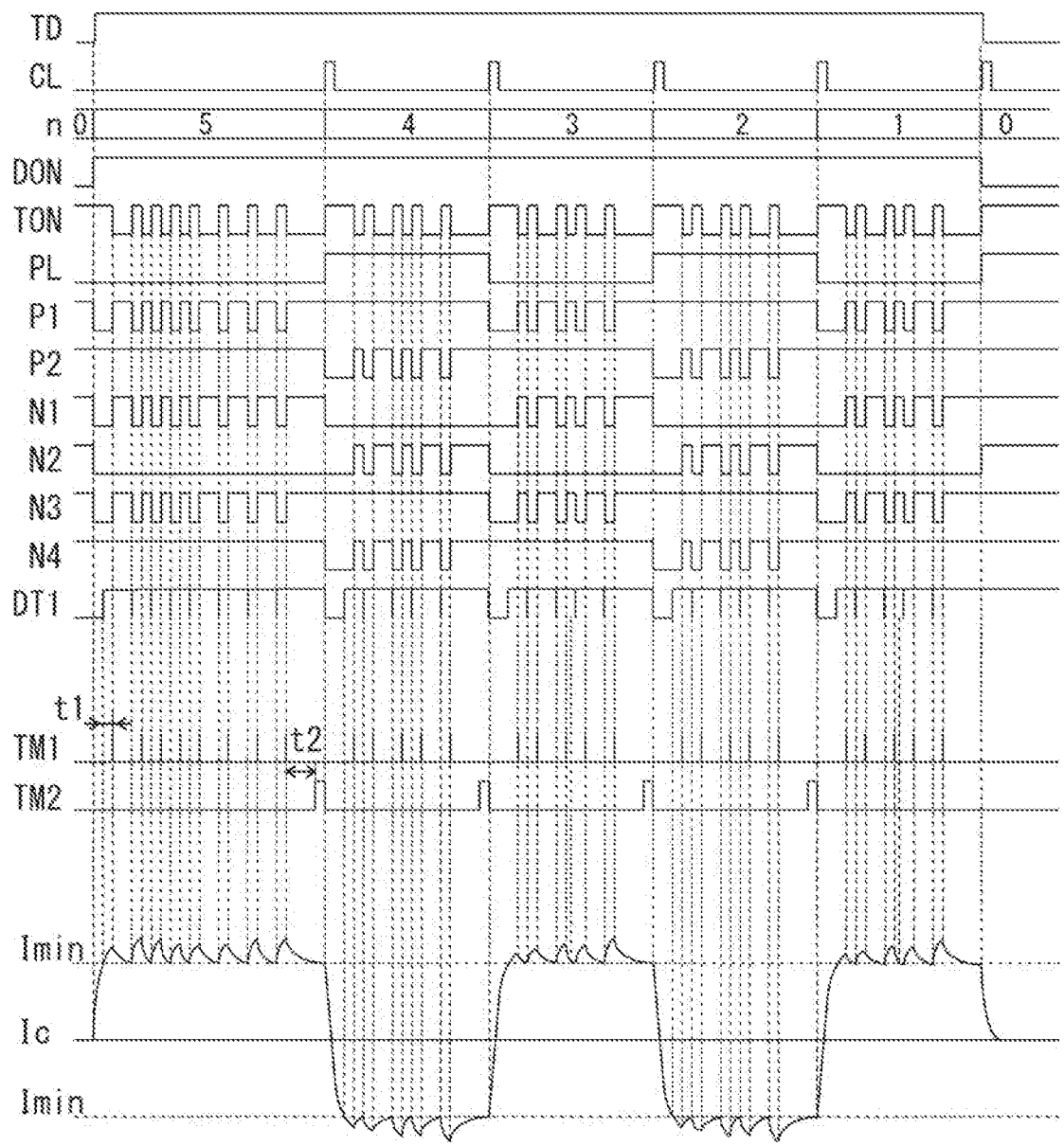
FIG. 8 is a timing chart illustrating an operation in the motor control process according to the first embodiment.

In the present embodiment, in the timing chart in FIG. 8, right after the output DON is turned to an H level, P1 has an L level, and P2 has an H level. Thus, the Pch transistor 52 is turned on, and the Pch transistor 53 is turned off. Since the N1 to N3 have an L level, and N4 has an H level, the Nch transistors 54, 55, and 56 are turned off, and the Nch transistor 57 is turned on. Thus, a current flows through the Pch transistor 52, the terminal O1, the coil 130, the terminal O2, the detection resistor 59, and the Nch transistor 57. In the present embodiment, the current flowing through the coil 130 from the terminal O1 toward the terminal O2 is defined as a forward current. In the present embodiment, a drive signal (drive current) output to the coil 130 switches between a first polarity and a second polarity, and a forward current flows through the coil 130 in a case of the first polarity. Therefore, a state in which a forward current flows through the coil 130 is a state in which the driver 51 is controlled to be brought into an ON state such that a drive signal having the first polarity is output.

Next, the current detection circuit 61 determines whether or not the current I flowing through the coil 130 exceeds the lower limit current value Imin (SA3). The current detection circuit 61 continuously performs the determination process in SA3 until voltages generated in the detection resistors 58 and 59 exceed a reference voltage from the first reference voltage generation circuit 62 (NO in SA3).

On the other hand, in a case where it is determined that a determination result in SA3 is YES, the current detection circuit 61 turns the detection signal DT1 to an H level, and thus the first timer 31 is operated. The first timer 31 is operated, and thus it can be determined whether or not the time t1 has elapsed after the current I exceeds the lower limit current value Imin (SA4).

In other words, in a case where the detection signal DT1 is turned to an H level, an output from the OR circuit 46 is turned to an L level from an H level, and thus a reset state of the first timer 31 is canceled. Thus, the first timer 31 starts to measure elapse of the time t1, continuously outputs a signal having an L level until the time t1 elapses, and outputs a signal having an H level in a case where the time t1 has elapsed, that is, a determination result in SA4 is YES.

In a case where the output TM1 from the first timer 31 is turned to an H level, and thus a determination result in SA4 is YES, the SR latch circuit 39 is reset, and the output TON is turned to an L level. Therefore, the decoder 38 turns off the driver 51 by using the gate signals P1, P2, N1, N2, N3, and N4 (SA5). Specifically, P1 is turned to an H level, P2 is turned to an H level, N1 is turned to an H level, N2 is turned to an L level, N3 is turned to an H level, and N4 is turned to an H level. Thus, both ends of the coil 130 are connected to the power source terminal VSS, so as to be short-circuited to each other, and thus the supply of the current I to the coil 130 from the driver 51 is also stopped. Therefore, a state in which a current does not flow through the coil 130 is a state in which the driver 51 is controlled to be brought into to an OFF state. In the present embodiment, a state in which the Pch transistors 52 and 53 and the Nch transistor 55 are turned off, and the Nch transistors 54, 56, and 57 are turned on is an OFF state of the driver 51 in the first polarity.

In this case, an output from the OR circuit 45 changes in conjunction with a level of the signal TON while the output DON has an H level since the output DON is inverted to be input. Therefore, in a case where the driver 51 is turned off, and thus the signal TON is turned to an L level, the output from the OR circuit 45 is also turned to an L level, so that the reset state of the second timer 32 is canceled, and thus the second timer 32 starts timer measurement. Therefore, in a case where the driver 51 is turned on, and thus the signal TON is turned to an H level, the output from the OR circuit 45 is also turned to an H level, so that the second timer 32 is reset, and thus measurement of the time t2 is stopped. Consequently, it can be determined whether a turned-off time of the driver 51 which is a drive unit is equal to or smaller than the first switching determination time t2 or exceeds the time t2 by using the second timer 32.

Next, it is determined whether or not the time t3 measured by the third timer 33 has elapsed (SA6). The third timer 33 cancels a reset state thereof at a timing at which the output TON from the SR latch circuit 39 is turned to an L level from an H level, that is, a timing at which the driver 51 is turned off, and starts time measurement.

In a case where the motor 13 is normally operated, an elapsed time (an OFF time of a drive unit) from turning-off of the driver 51 until the current I is less than Imin is not equal to or longer than the first stop determination time t3, and thus a determination result in SA6 is NO.

In a case where a determination result in SA6 is NO, that is, the time t3 has not elapsed from turning-off of the driver 51 in SA5, it is determined whether or not the current I flowing through the coil 130 is less than Imin (SA7). In a case where a determination result in SA7 is YES, it is determined whether or not the OFF time of the driver 51 (an OFF time of a drive unit) exceeds the first switching determination time t2 (SA8). In other words, in a case where a time (OFF time) from turning-off of the driver 51 until the current I is less than Imin is equal to or shorter than the time t2, a determination result in SA8 is NO, and, in a case where the time exceeds the time t2, a determination result in SA8 is YES.

In a case where a determination result in SA8 is NO, polarity switching is not performed, and the flow returns to SA2, so that the driver 51 is turned on to drive the motor 13.

In other words, when the output TON is turned to an L level, the second timer 32 cancels a reset state thereof, and starts measurement of the time t2, and the output TM2 from the second timer 32 is turned to an H level at a time point at which the time t2 has elapsed.

In a case where the current I is less than Imin, the detection signal DT1 is turned to an L level. In this case, in a case where an OFF time measured by the second timer 32 is shorter than the time t2, since the output TM2 from the second timer 32 has an L level, an output from the OR circuit 43 is maintained to have an L level, and thus the drive polarity signal PL output from the flip-flop 40 is maintained to have an identical level. Therefore, polarity switching is not performed, the detection signal DT1 is turned to an L level, the output TON from the SR latch circuit 39 is turned to an H level, and thus the driver 51 is turned on.

In a case where the OFF time of the driver 51 exceeds the first switching determination time t2, and thus a determination result in SA8 is YES, the flip-flop 40 performs polarity switching by turning the drive polarity signal PL to an H level (SA9).

In a case where a determination result in SA8 is YES, the output TM2 has an H level, and the detection signal DT1 has an L level. Thus, since an output from the AND circuit 41 has an H level, and an output from the OR circuit 43 also has an H level, the clock signal is input to the flip-flop 40, a state of the drive polarity signal PL is inverted, and the decoder 38 controls the driver 51 to switch between polarities of a drive signal. Since an OFF time of the driver 51 is correlated with a rotation angle of the rotor 133, the time t2 may be set on the basis of a value generated when the rotor 133 is rotated by about 180°.

Therefore, in the present embodiment, a polarity switching unit is configured with the second timer 32, the third timer 33, and the current detection circuit 61 respectively measuring the time t2, the time t3, and the current I related to polarity switching conditions, and that the current I is less than the lower limit current value Imin, and the flip-flop 40 and the decoder 38 controlling the driver 51 to switch a polarity of a drive signal on the basis of such measurement results.

In a case where a state of the polarity signal PL is inverted, and polarity switching is performed, a signal is output from the first differentiation circuit 371 to which the polarity signal PL is input, the signal is input to the number-of-steps control circuit 36 as a clock signal CL, and thus the remaining number of steps is reduced by one (SA10).

The number-of-steps control circuit 36 checks whether or not the remaining number of steps is 0 (SA11), and maintains the drive period signal TD in an H level in a case where a determination result in SA11 is NO (n is not 0). Thus, the flow returns to SA2, and the driver 51 is turned on by using a signal from the decoder 38. However, since the polarity signal PL is inverted, the decoder 38 outputs gate signals for setting a direction of a current flowing through the coil 130 to be opposite to a direction in the positive time. Specifically, P1 is turned to an H level, P2 is turned to an L level, N1, N2, and N4 are turned to an L level, and N3 is turned to an H level. Consequently, the Pch transistor 52 is turned off, and the Pch transistor 53 is turned on. The Nch transistors 54, 55, and 57 are turned off, and the Nch transistor 56 is turned on. Thus, a current flows through the Pch transistor 53, the terminal O2, the coil 130, the terminal O1, the detection resistor 58, and the Nch transistor 56. Therefore, a drive signal (that is, a drive current) output to the coil 130 has the second polarity, and a current in the backward direction opposite to the forward direction flows through the coil 130. Therefore, a state in which the backward current flows through the coil 130 is a state in which the driver 51 is controlled to be turned on to output a drive signal having the second polarity.

As illustrated in FIG. 8, the gate signals P1, P2, N1, N2, N3, and N4 are set such that directions of a current flowing through the coil 130 are different from each other, that is, polarities are different from each other, in a case of n=5, 3, and 1 and in a case of n=4 and 2.

In the present embodiment, in an OFF state of the driver 51 in the second polarity, P1 has an H level, P2 has an H level, N1 has an L level, N2 has an H level, N3 has an H level, and N4 has an H level.

In other words, a state in which the Pch transistors 52 and 53 and the Nch transistor 54 are in an OFF state, and the Nch transistors 55, 56, and 57 are in an ON state is an OFF state of the driver 51 in the second polarity. Also in the OFF state in the second polarity, both ends of the coil 130 are connected to the power source terminal VSS so as to be short-circuited to each other, and thus the supply of the current I to the coil 130 from the driver 51 is stopped.

In a case where a determination result in SA11 is YES, the number-of-steps control circuit 36 turns the drive period signal TD to an L level, and thus the output DON is also turned to an L level such that the drive control for the motor 13 is finished.

Therefore, SA2 to SA11 are repeatedly performed, and thus the control as illustrated in FIG. 8 is performed. In other words, in a case where the current I is less than the lower limit current value Imin, the driver 51 is turned on, and, in a case where an elapsed time from turning-on of the driver 51 exceeds the time t1, the driver 51 is turned off. In a case where an OFF time of the driver 51 does not exceed the time t2, the driver 51 is turned on again. Therefore, turning-on and turning-off of the driver 51 are repeatedly performed in an identical polarity.

The polarity is switched at a time point at which the OFF time of the driver 51 exceeds the time t2, the remaining number of steps is reduced by one, and, in a case where the number of steps is not 0, the same drive control as described above is performed as illustrated in FIG. 8 except that a polarity differs. In a case where the number of steps becomes 0, the drive control for the motor 13 is finished.

Operation (Comparative Example) During Occurrence of Defect

Here, for comparison with the present embodiment, a description will be made of an example in which a defect occurs due to the influence of an external magnetic field or impact in a case where the third timer 33 and the fourth timer 34 are not provided, with reference to a timing chart in FIG. 9.

An ON time and an OFF time of the driver 51 depend on an inverse induced voltage generated in the coil 130, but the inverse induced voltage changes due to the influence of an external magnetic field or impact, and thus a relationship between an ON time or an OFF time and a rotational position of the rotor 133 may not be established. For example, as illustrated in FIG. 9, in a case where a timing at which the rotor 133 is regarded to be rotated by 180° is ta, an OFF time is originally required to exceed the time t2 before the timing ta.

However, in a case where an OFF time becomes shorter than the time t2 due to the influence of an external magnetic field or impact, the driver 51 is turned on again. Thus, in a case where the driver 51 is turned off after the time t1 elapses, detection of rotation is delayed, and thus the current I may be less than Imin after the rotor 133 greatly exceeds 180°.

In this case, when there is no control using the signals TM3 and TM4 in the present embodiment, polarity switching is performed at an abnormal timing, a step-output state occurs, and thus a relationship between a rotation angle and an ON time or an OFF time is not established. Thus, polarity switching is performed in an extremely short time as in a third step (n=3) in FIG. 9, and the rotor 133 is not rotated. Therefore, the next step (n=2) enters a suction state, and thus the rotor 133 is not rotated and is stopped even if a drive current is continuously supplied.

Figure 9:
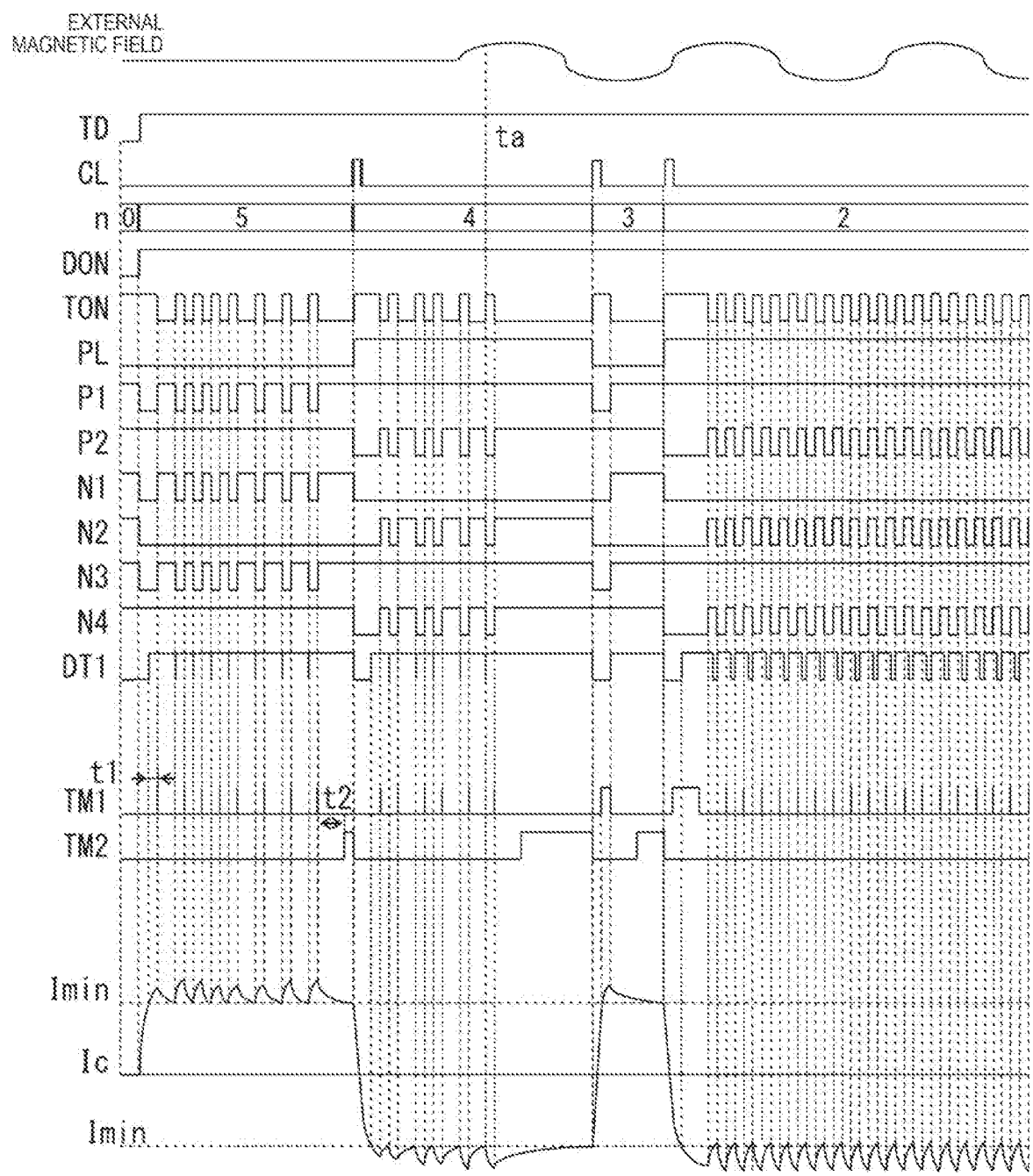
FIG. 9 is a timing chart illustrating an operation in a comparative example in the motor control process according to the first embodiment.

The example illustrated in FIG. 9 is an example of defect occurrence patterns, and defects of other various patterns occur due to a disturbance.

Operation in First Embodiment During Occurrence of a Disturbance

A description will be made of an operation for preventing the defect in the present embodiment with reference to FIGS. 7 and 10.

In a case where the output TM4 from the fourth timer 34 is maintained in an L level, and the output TON is turned to an L level, that is, the driver 51 is turned off, the third timer 33 cancels a reset state thereof, and starts to measure the time t3. In a case where the output TON is turned to an H level before the time t3 elapses, and thus the driver 51 is turned on, the third timer 33 is reset.

Figure 10:
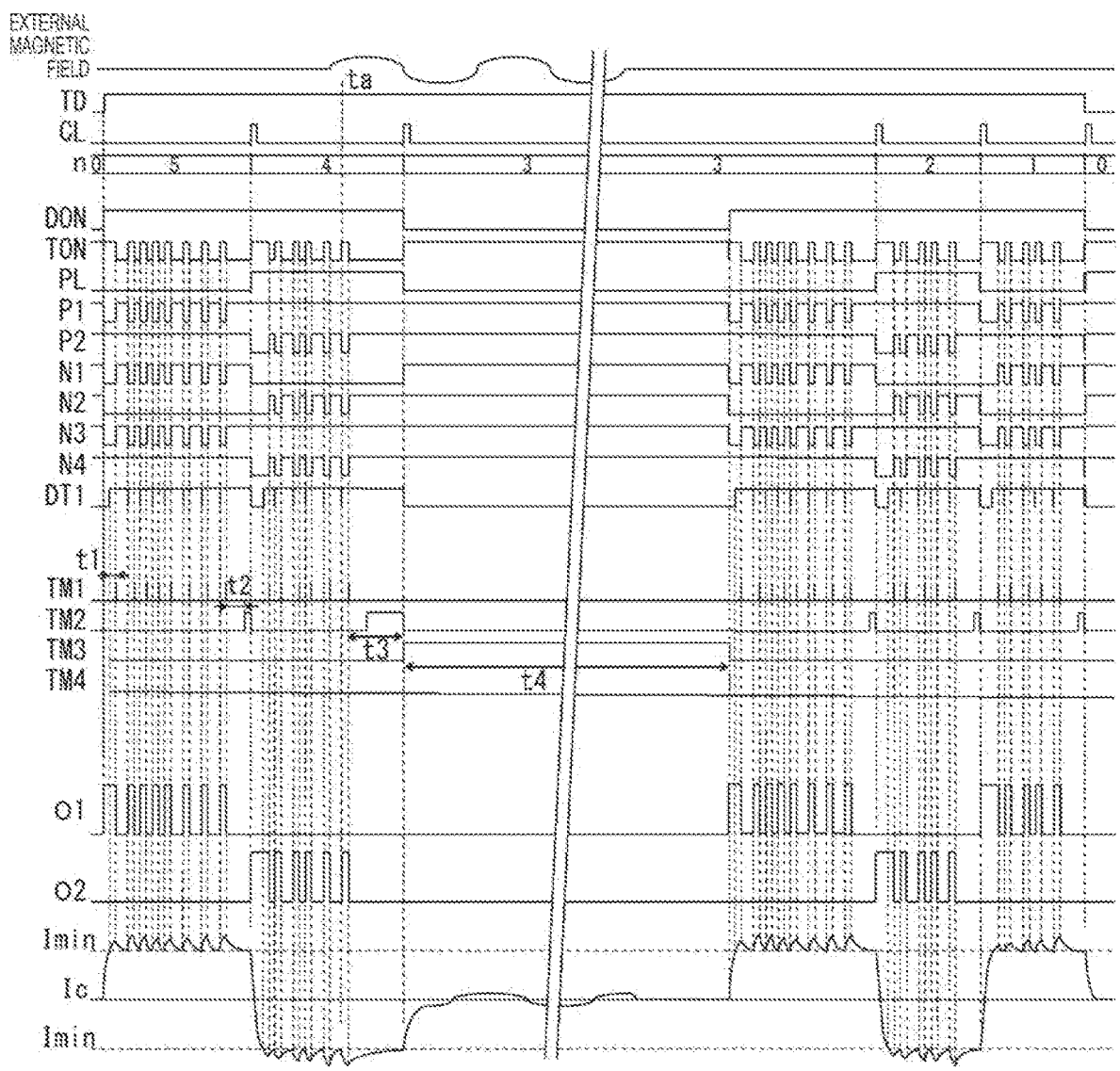
FIG. 10 is a timing chart illustrating an operation in the motor control process according to the first embodiment.

In a case where an OFF period of the driver 51 exceeds the first stop determination time t3 due to the influence of an external magnetic field or impact as in driving in a second step (n=4) in the timing chart in FIG. 10 (YES in SA6), the driver 51 stops to be driven (SA12). Therefore, in the present embodiment, the third timer 33 and the decoder 38 configure a drive stopping unit which determines whether or not a drive stopping condition is satisfied, and stops driving of the driver 51.

In other words, in a case where an OFF period of the driver 51 exceeds the time t3, the output TM3 from the third timer 33 is turned to an H level, thus the output TM3 is inverted to be input to the AND circuit 42, and the drive signal DON which is an output from the AND circuit 42 is turned to an L level. Thus, the decoder 38 stops driving of the driver 51. In a case where an OFF state of the driver 51 in SA5 is compared with a stop state of the driver in SA12, in SA5, the decoder 38 turns off the Pch transistors 52 and 53 so as to control the driver 51 to be turned off, turns on one of the Nch transistors 54 and 55, turns off the other, and turns on the Nch transistors 56 and 57. On the other hand, in SA12, the decoder 38 turns off the Pch transistors 52 and 53 so as to control the driver 51 to be turned off, and turns on all of the Nch transistors 54, 55, 56, and 57 as in a third step (n=3) in FIG. 10.

In SA12, in a case where the drive signal DON is turned to an L level, an output from the OR circuit 44 is turned to an H level, and the output TON from the SR latch circuit 39 is turned to an H level. Since the signal TON is a signal for switching turning-on and turning-off of the driver 51, in a case where the signal TON is turned to an H level, typically, the decoder 38 turns on the driver 51, but the drive signal DON has an L level, and thus the decoder 38 prioritizes a process of stopping driving of the driver 51. In a case where the drive signal DON is turned to an L level, the Pch transistors 52 and 53 are turned off, and all of the Nch transistors 54 to 57 are turned on. In a case where all of the Nch transistors 54 to 57 are turned on, total ON resistance can be reduced such that short brake force can be increased, and thus stability for disturbance can be realized.

The outputs from the comparators 641 and 642 are constant, and thus it is possible to suppress an increase in unnecessary current consumption.

In a case where the output TM3 from the third timer 33 is turned to an H level, an output from the second differentiation circuit 372 has an H level, a signal having an H level is input to the flip-flop 40 from the OR circuit 43, the polarity signal PL is inverted, and a polarity is switched (SA13).

Since the polarity signal PL is inverted, a clock signal is output from the first differentiation circuit 371, and the number-of-steps control circuit 36 reduces the remaining number of steps by one (SA14).

Since the output TM3 from the third timer 33 is inverted to be input to the reset terminal R of the fourth timer 34, the fourth timer 34 cancels a reset state thereof and starts to measure the time t4 in a case where the output TM3 is turned to an H level, and determines whether or not the time t4 has elapsed after the drive signal DON for the decoder 38 is turned to an L level (SA15). The fourth timer 34 sets a standby time until drive control for the motor 13 is resumed, and the standby setting time t4 is set to an OFF time having a length which is not normally generated. Since drive control is stopped until the time t4 elapses, it can be expected that the influence of a disturbance such as an external magnetic field or impact is removed.

In a case where it is determined that a determination result in SA15 is YES, the motor control circuit 30 returns to SA2, turns on the driver 51, and performs the subsequent respective processes after SA2.

In other words, the fourth timer 34 turns the output TM4 to an H level after the time t4 elapses. Thus, the third timer 33 is reset, and the output TM3 is also turned to an L level.

In a case where the output TM3 is turned to an L level, the fourth timer 34 is reset. Therefore, the output TM4 temporarily has an H level, and immediately returns to an L level.

In a case where the output TM3 is turned to an L level, the drive signal DON is turned to an H level, and thus the driver 51 is turned on by using the gate signals from the decoder 38. Consequently, driving of the motor 13 is resumed. In this case, since a polarity is switched, there is a low probability that the rotor 133 may be in a suction state, and thus the rotor 133 can be rotated.

Thereafter, as described above, SA2 to SA11 are repeatedly performed, driving of the motor 13 is performed until n becomes 0, and the driving is finished.

In a case where the time t3 is measured again after driving is resumed in SA2 (it is determined that a determination result in SA6 is YES), the stopping processes in SA12 to SA15 are performed again.

The time t1 to the time t4 respectively measured by the timers 31 to 34 may be set according to characteristics or drive voltages of the motor 13, and, for example, the time t1 is set to 50 μsec, the first switching determination time t2 is set to 100 μsec, the first stop determination time t3 is set to 200 μsec, and the standby setting time t4 is set to 1 sec.

Effects of First Embodiment

According to the motor control circuit 30 of the present embodiment, a case where the time t3 or more elapses from turning-off of the driver 51, that is, a case where the current I flowing through the coil 130 is not less than the lower limit current value Imin even if the time t3 has elapsed from turning-off of the driver 51 is a situation which does not occur during a normal operation, and thus driving of the driver 51 is stopped. Consequently, it is possible to detect the influence of a disturbance such as an external magnetic field, and thus to prevent the motor 13 from being driven in a state of being influenced by the disturbance. Therefore, it is possible to prevent the occurrence of a problem that the motor 13 is not accurately controlled due to disturbances, and thus a hand position is inaccurate.

The motor control circuit 30 is provided with the timers 31 to 34 in addition to the current detection circuit which is a lower limit detection unit comparing the current I with the lower limit current value Imin, and can perform control by only measuring an elapsed time from turning-on of the driver 51 or an OFF time of the driver 51. Thus, a configuration of the motor control circuit 30 can be simplified.

The motor control circuit 30 is configured with dedicated circuits using logic elements, and can thus realize low voltage driving and low power consumption so as to be appropriate for the portable electronic timepiece 1 such as, especially, a wristwatch.

First Modification Example

Figure 7:
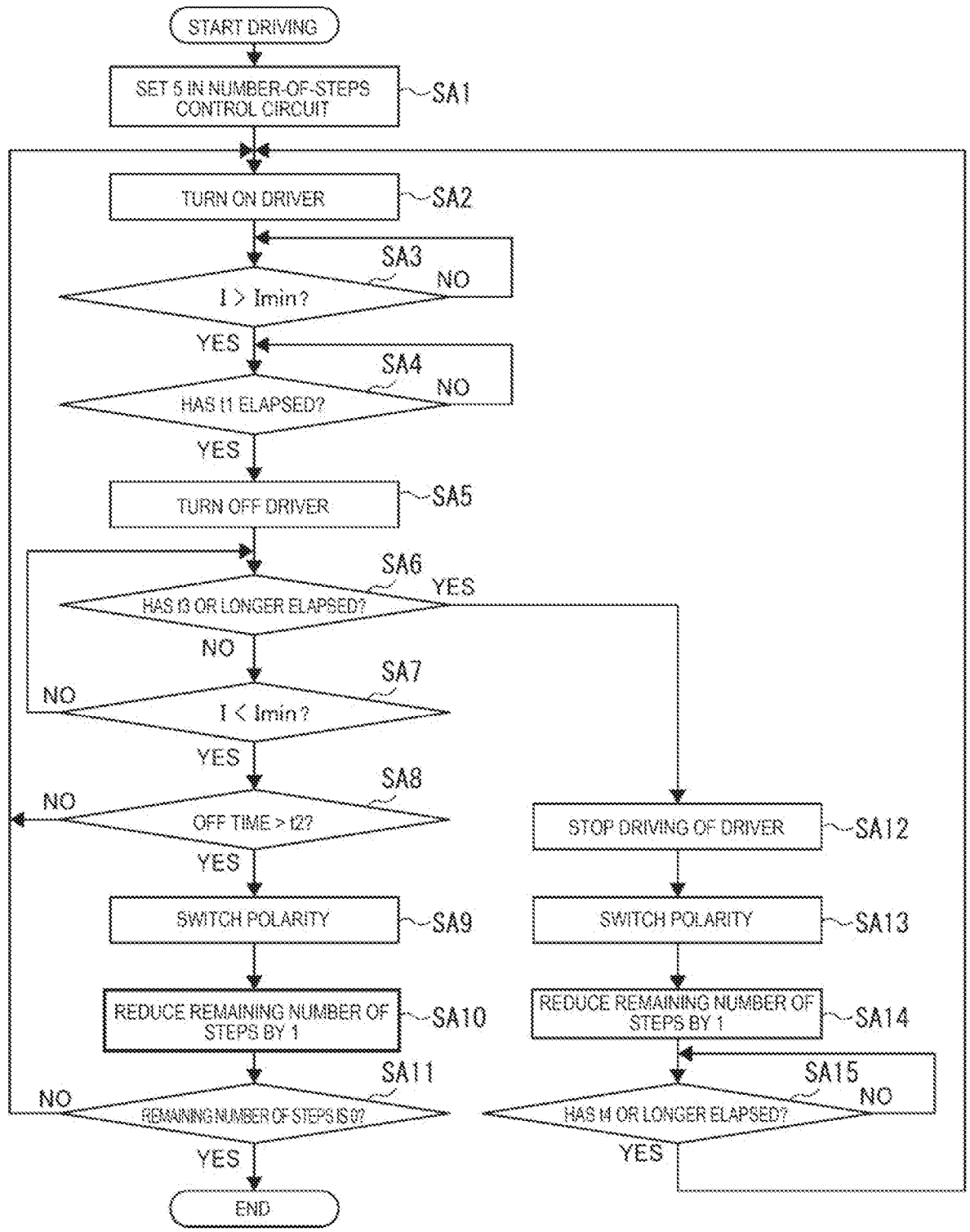
FIG. 7 is a flowchart illustrating a motor control process according to the first embodiment.
Figure 11:
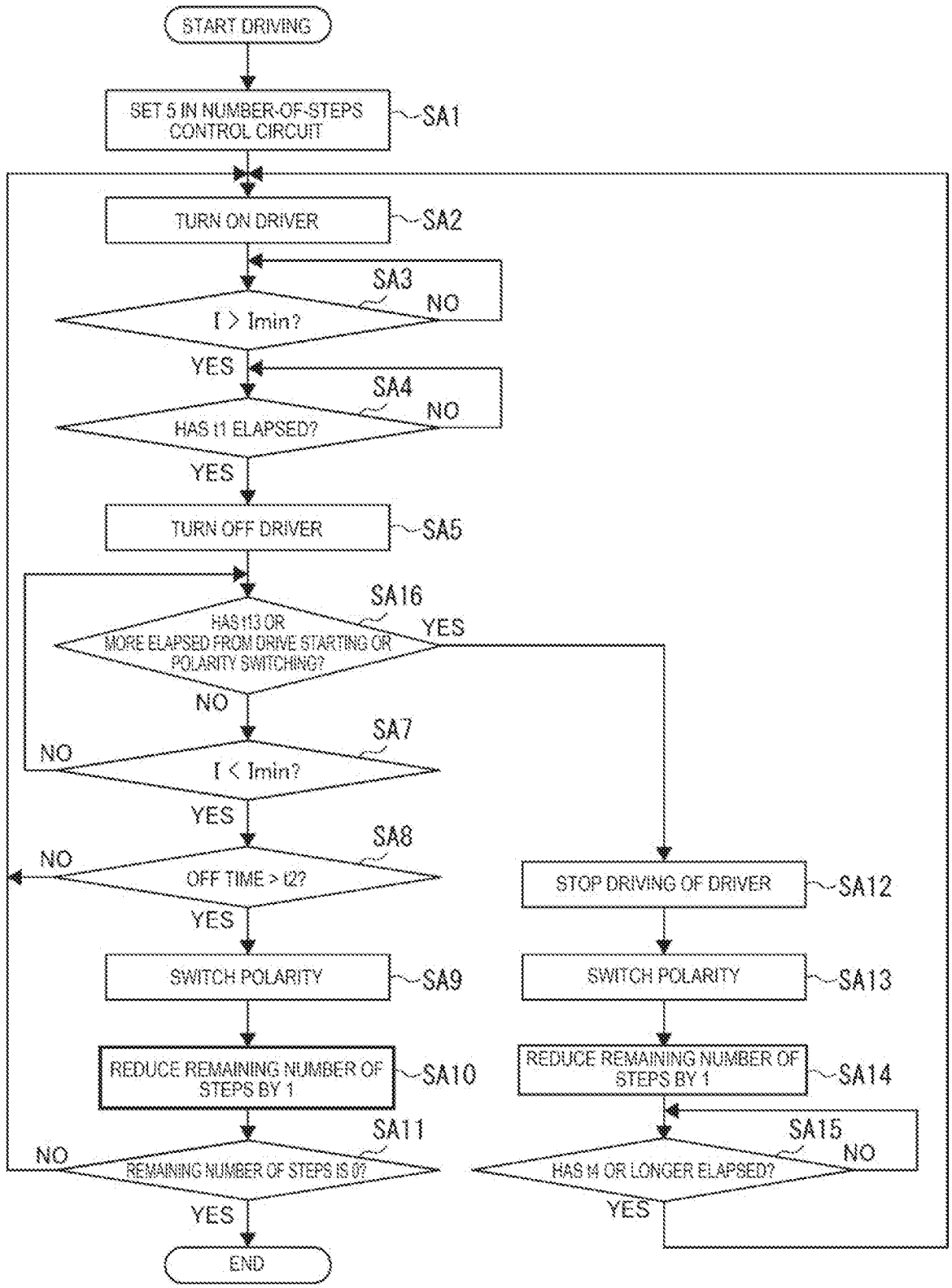
FIG. 11 is a flowchart illustrating a motor control process according to a modification example of the first embodiment.

In the first embodiment, as illustrated in FIG. 7, in a case where an elapsed time from turning-off of the driver 51 exceeds the time t3, a determination result in SA6 is YES, and the processes in SA12 to SA15 are performed. In contrast, in a first modification example, as illustrated in a flowchart in FIG. 11, in a process in SA16 of determining a condition for transition to the processes in SA12 to SA15, the number of steps is set in the number-of-steps control circuit 36, and the processes in SA12 to SA15 are set to be performed in a case where an elapsed time from a time point of starting driving, or a time point of switching a polarity, that is, starting of driving in each step, is equal to or longer than a second stop determination time t13. The time t13 such as 10 msec may be set to a condition which is not generated in a normal operation, and is generated in a case where the rotor 133 is in a suction state due to the influence of an external magnetic field or impact. In other words, as illustrated in FIG. 8, in a normal operation, a drive process in each step is finished within a predetermined time, a polarity is switched, and a drive process in the next step is started. On the other hand, as indicated by the step of n=4 in FIG. 9, in a case where the influence of a disturbance is received, a drive process in the step is not often finished within a predetermined time. Therefore, in a case where an elapsed time from a drive starting time point, that is, an elapsed time in an initial step (the step of n=5 in FIGS. 8 to 10) is equal to or longer than the time t13, or an elapsed time from switching of a polarity, that is, an elapsed time in the second and subsequent steps (n=4 to 1) is equal to or longer than the time t13, it is determined that the influence of a disturbance is received, and processes (SA12 to SA15) of stopping driving of the driver 51 for a predetermined time may be performed.

Also in the first modification example, the same advantageous effect as in the first embodiment can be achieved. In the first embodiment, in a case where an OFF time of the driver 51 is shorter than the first stop determination time t3 due to the influence of a disturbance, driving of the driver 51 cannot be stopped. In contrast, according to the first modification example, even in a case where an OFF time becomes shorter due to a disturbance, when an elapsed time from a starting time point of each step is equal to or longer than the second stop determination time t13, driving of the driver 51 can be stopped. On the other hand, in the first embodiment, there is an advantage in that, in a case where an OFF time of the driver 51 is longer than the first stop determination time t3, the driver 51 can be stopped early at that time.

Therefore, preferably, the first embodiment and the first modification example are combined with each other, and, in a case where a determination result in SA6 is NO, determination in SA16 is performed, and, in a case where a determination result of either of SA6 and SA16 is YES, a process of stopping driving of the driver 51 in SA12 is performed.

Second Embodiment

Next, a second embodiment of the present disclosure will be described with reference to FIGS. 12 to 15. In the second embodiment, a constituent element equal or similar to that in the first embodiment is given the same reference numeral, and a description thereof will be omitted or made briefly.

Description of Configuration

Figure 12:
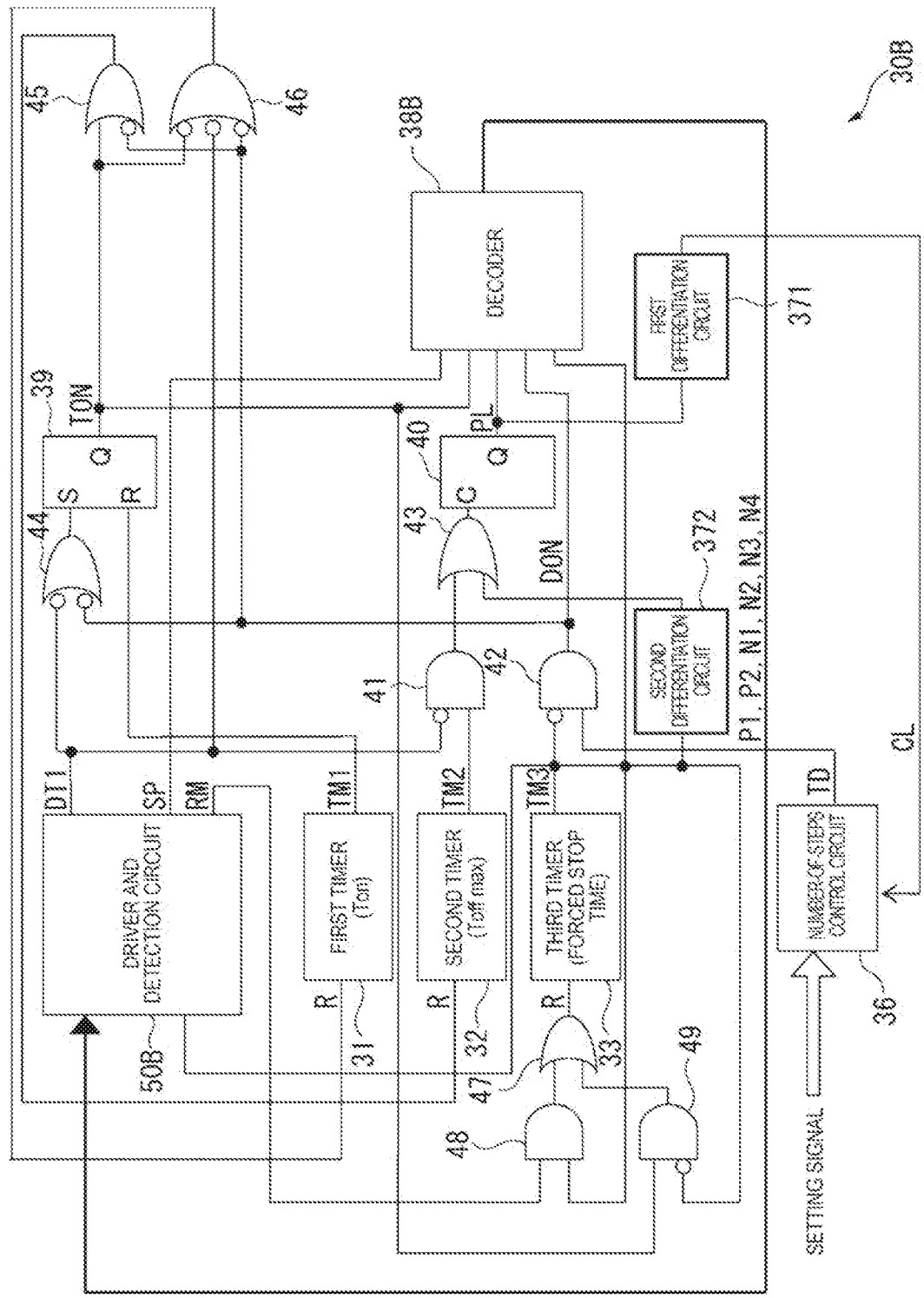
FIG. 12 is a circuit diagram illustrating a configuration of a motor control circuit according to a second embodiment.

The second embodiment is different from the first embodiment in that a motor control circuit 30B illustrated in FIG. 12 is used. The motor control circuit 30B of the second embodiment also controls driving of the motor 13 of the electronic timepiece 1 in the same manner as in the first embodiment.

The motor control circuit 30B is different from the motor control circuit 30 in terms of configurations of a driver and detection circuit 50B and a decoder 38B. The motor control circuit 30B is different from the motor control circuit 30 in that the fourth timer 34 is not provided, and an AND circuit 49 is provided. The rest configuration is the same as that of the motor control circuit 30.

Configurations and operations of the first timer 31, the second timer 32, and the third timer 33 of the motor control circuit 30B are the same as those in the motor control circuit 30. The third timer 33 is the same as that in the motor control circuit 30 in that the output TM3 is input to the second differentiation circuit 372 and the AND circuit 42, but is different from that in the motor control circuit 30 in that the output TM3 is input to the decoder 38B and the AND circuit 49.

Figure 15:
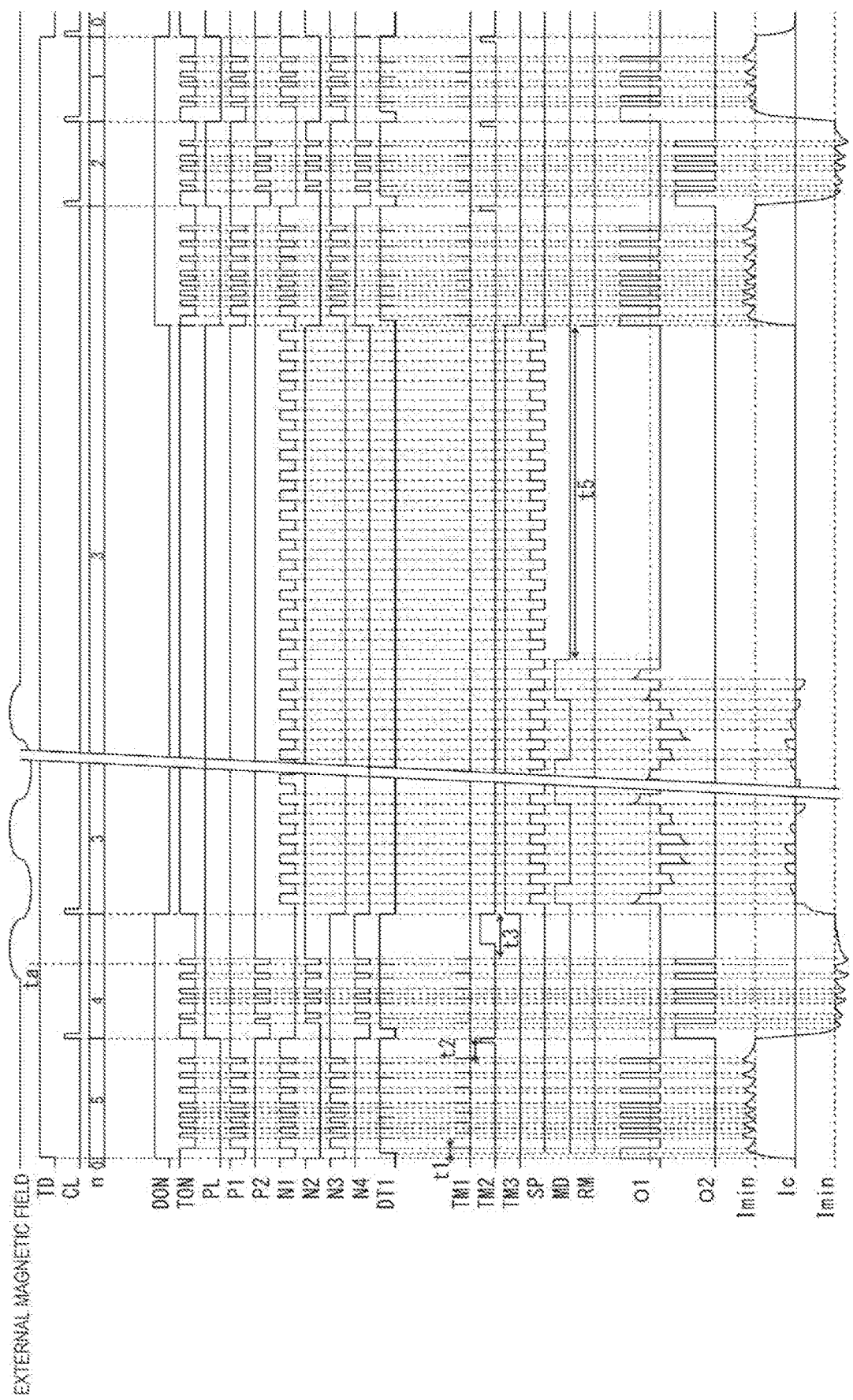
FIG. 15 is a timing chart illustrating an operation in the motor control process according to the second embodiment.

The decoder 38B outputs the gate signals P1, P2, N1, N2, N3, and N4 for the driver and detection circuit 50B as illustrated in a timing chart in FIG. 15 according to states of the ON/OFF switching signal TON for a current output, the drive polarity signal PL, the drive signal DON, the timer output TM3, and a clock signal SP.

Configurations and operations of the number-of-steps control circuit 36, the first differentiation circuit 371, the second differentiation circuit 372, the SR latch circuit 39, and the flip-flop 40 of the motor control circuit 30B are the same as those in the first embodiment. Also in the second embodiment, a condition in which a polarity of a drive signal is switched or a condition for stopping the driver 51 by controlling the driver 51 with the decoder 38B is the same as that in the first embodiment, and thus a drive control unit, and a polarity switching unit and a drive stopping unit are the same as those in the first embodiment.

Figure 13:
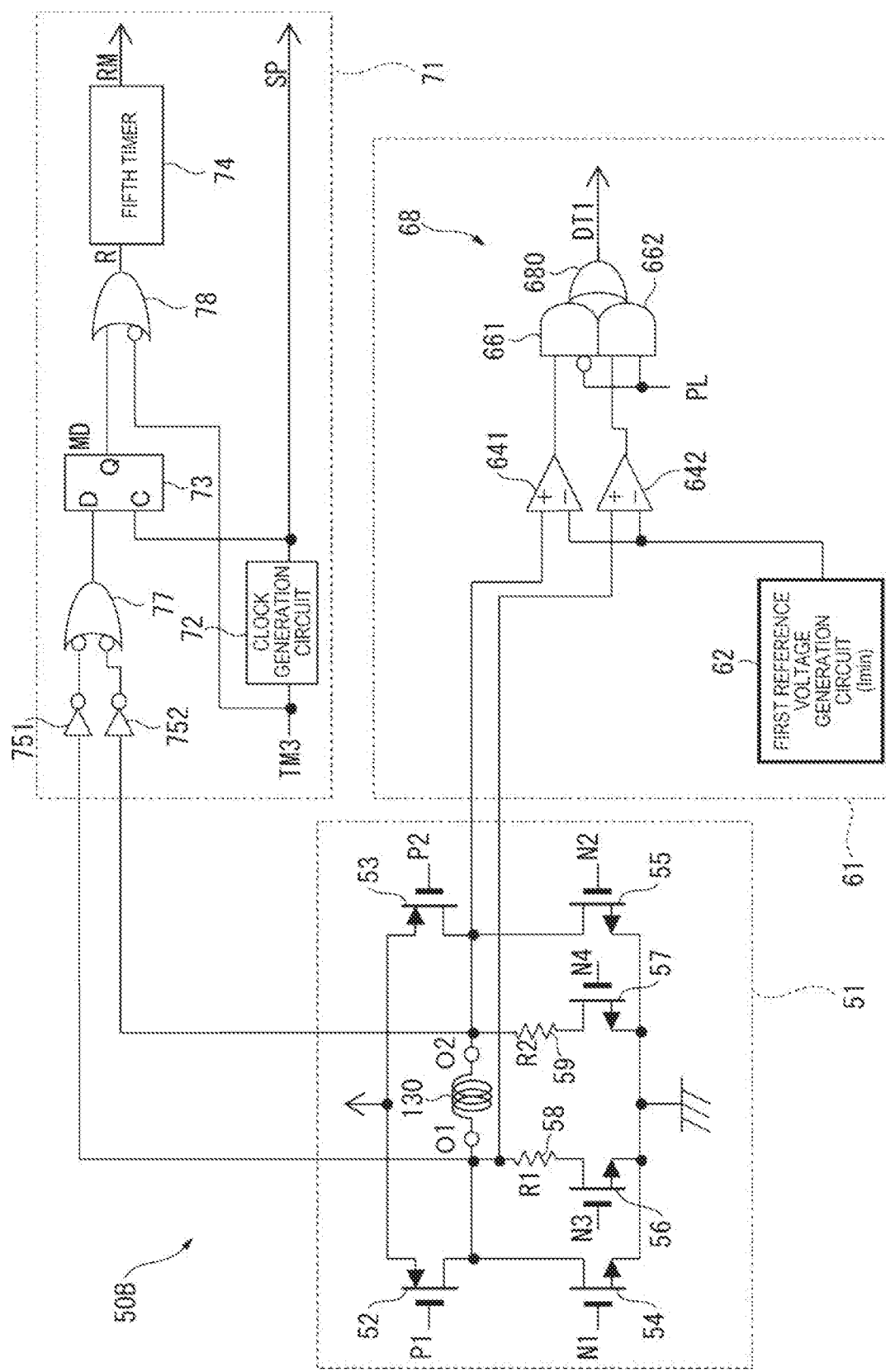
FIG. 13 is a circuit diagram illustrating configurations of a driver and a detection circuit according to the second embodiment.

The driver and detection circuit 50B includes a driver 51 and detection circuits as illustrated in FIG. 13. The detection circuits include a current detection circuit and a magnetic field detection circuit 71 which is a magnetic field detector.

The configurations and operations of the driver and the current detection circuit 61 are the same as those in the first embodiment. In other words, the driver supplies a current to the coil 130, and the current detection circuit 61 detects whether a current value of the current I flowing through the coil 130 is equal to or greater than the lower limit current value Imin or is smaller than the lower limit current value Imin.

The magnetic field detection circuit 71 is a circuit detecting the presence or absence of an external magnetic field. The magnetic field detection circuit 71 includes a clock generation circuit 72, a latch circuit 73, a fifth timer 74, inverters 751 and 752, and OR circuits 77 and 78.

The magnetic field detection circuit 71 is operated in a case where the output TM3 from the third timer 33 is turned to an H level.

Then, the decoder 38B controls the driver 51 on the basis of a clock signal output from the clock generation circuit 72 of the magnetic field detection circuit 71, and subjects electromotive force caused by an external magnetic field generated in the coil 130 to chopper amplification. Therefore, the magnetic field detection circuit 71, the decoder 38B, and the driver 51 configure a chopper amplification circuit. The magnetic field detection circuit 71 detects an external magnetic field depending on whether or not a voltage value subjected to chopper amplification exceeds threshold voltages of the inverters 751 and 752.

In a case where the output TM3 from the third timer 33 is turned to an H level, the clock generation circuit 72 is operated, and outputs the clock signal SP to the latch circuit 73 as a clock input and the decoder 38B.

Operation in Second Embodiment

Figure 14:
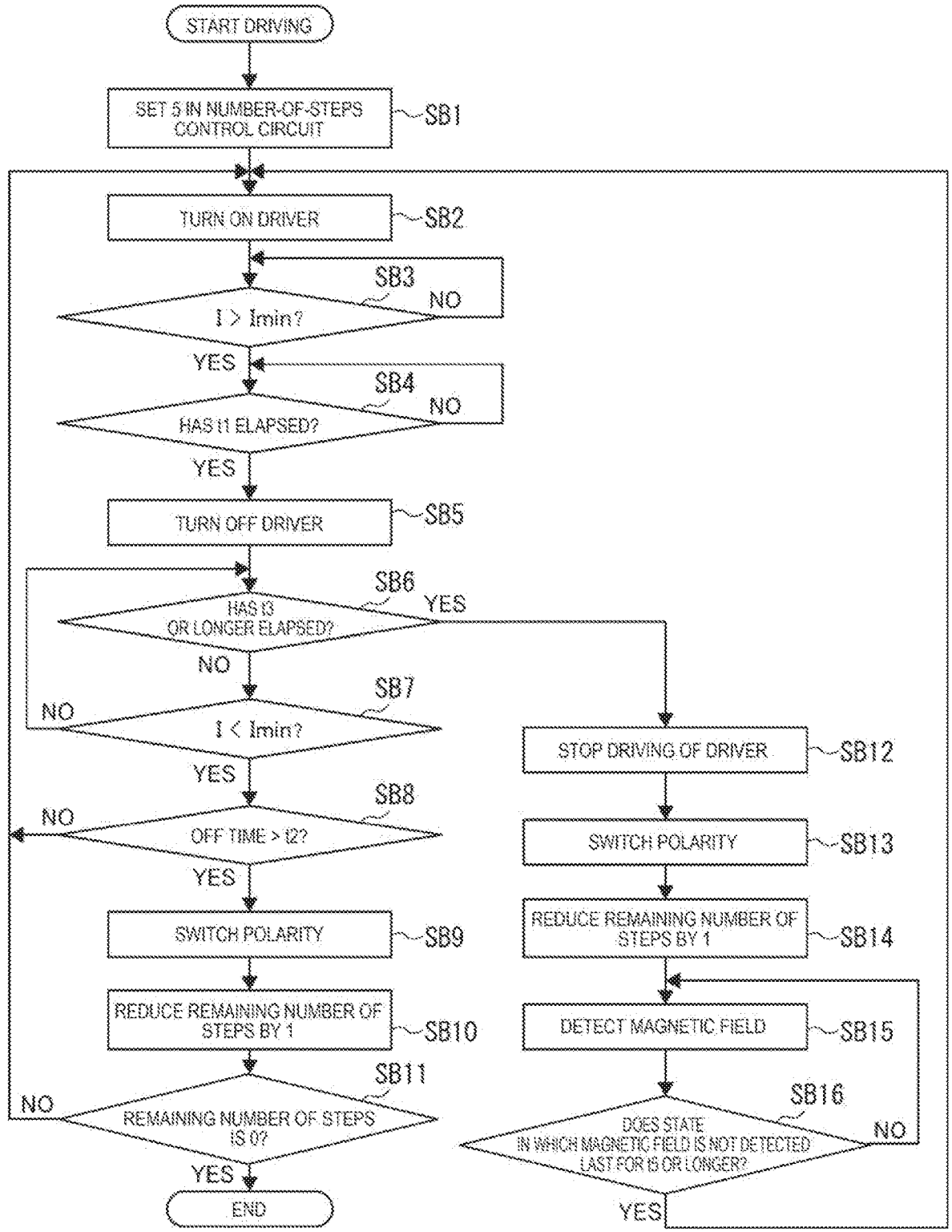
FIG. 14 is a flowchart illustrating a motor control process according to the second embodiment.

Next, a description will be made of control performed by the motor control circuit 30B of the second embodiment with reference to a flowchart in FIG. 14 and a timing chart in FIG. 15. Processes in SB1 to SB14 of the flowchart in FIG. 14 are the same as the processes in SA1 to SA14 of the flowchart in FIG. 7 in the first embodiment, and thus a description thereof will be made briefly.

Also in the second embodiment, in the same manner as in the first embodiment, in a case where a setting signal is input from the CPU 23, the motor control circuit 30B starts driving, and sets the number of steps (for example, five) in the number-of-steps control circuit 36 (SB1).

The number-of-steps control circuit 36 turns the drive period signal TD to an H level such that the drive signal DON is turned to an H level, and the decoder 38B controls the gate signals P1, P2, and N1 to N4 so as to turn on the driver 51, so that the current I is supplied to the coil 130 (SB2).

Thereafter, in the same manner as in the first embodiment, the processes in SB3 to SB11 are performed, during a normal operation as in a case of the number of steps n=5 in FIG. 15, the motor control circuit 30B switches a polarity of a drive signal in a case where an OFF time of the driver 51 exceeds the first switching determination time t2, and continuously performs drive control.

On the other hand, as in a case of a second step (n=4) illustrated in FIG. 15, an OFF time of the driver 51 may change due to the influence of an external magnetic field, impact, or the like, and may thus exceed the first stop determination time t3 set as an OFF time having a length which is not generated during normal times. In this case, in the same manner as in the first embodiment, since a determination result in SB6 is YES, and the drive signal DON has an L level, driving of the driver 51 is stopped (SB12). In this case, since the output DT1 has an L level in an H level of the output TM2, the polarity signal PL which is an output from the flip-flop 40 is inverted, and thus a polarity is switched (SB13). A clock signal CL is output from the first differentiation circuit 371, and the number-of-steps control circuit 36 reduces the remaining number of steps by one (SB14).

Since the output TM3 is turned to an H level, the magnetic field detection circuit 71 is operated, and thus a magnetic field detection process is performed (SB15). The magnetic field detection process in SB15 is performed as follows.

In a period in which the output TM3 has an H level, as illustrated in FIG. 15, the decoder 38B controls each gate signal according to an output cycle of the clock signal SP such that the output terminal O1 or the output terminal of the driver 51 is repeatedly brought into a high impedance state and a short state. The output terminal O1 or the output terminal O2 may be selected as a terminal side to which the current I is supplied through polarity switching. For example, in a third step (n=3) in FIG. 15, the Nch transistor 54 connected to the output terminal O1 is turned on and off in synchronization with the clock signal SP, and thus an induced voltage generated in the coil 130 is subjected to chopper amplification.

In a case where a potential of the output terminal O1 subjected to chopper amplification exceeds a threshold voltage of the inverter 751, an output signal from the inverter 751 is turned to an L level, and thus an output from the OR circuit 77 to which the signal is inverted to be input is turned to an H level. Therefore, an output MD from the latch circuit 73 is turned to an H level in synchronization with the clock signal SP. Here, since the output MD from the latch circuit 73 and an inverted signal of the output TM3 are input to the OR circuit 78, in a case where the output TM3 has an H level, an output from the OR circuit 78 also has an H level when the output MD from the latch circuit 73 has an H level. Thus, the fifth timer 74 is maintained in a reset state while an external magnetic field in the coil 130 is detected.

In the same manner for a case where the output terminal O2 side is subjected to chopper amplification, in a case where a potential of the output terminal O2 exceeds a threshold voltage of the inverter 752, the output MD from the latch circuit 73 is turned to an H level in synchronization with the clock signal SP, and thus the fifth timer 74 is reset.

On the other hand, in a case where there is no external magnetic field, since respective potentials of the output terminals O1 and O2 do not exceed the threshold voltages of the inverters 751 and 752, output signals from the inverters 751 and 752 are maintained in an H level, and an output from the OR circuit 77 to which the signals are inverted to be input is maintained in an L level.

Thus, the output MD from the latch circuit 73 is also maintained in an L level, and a reset state of the fifth timer 74 is canceled in a case where the output TM3 has an H level. In other words, the fifth timer 74 starts time measurement at a timing at which the output MD from the latch circuit 73 is turned to an L level from an H level, that is, a timing at which a state in which an external magnetic field is detected changes to a state in which an external magnetic field is not detected.

The fifth timer 74 turns an output signal RM to an H level in a case where a reset cancelation state, that is, a state in which an external magnetic field is not detected last for a time t5 or more. In a case where the output signal RM is turned to an H level, the third timer 33 is reset, the output TM3 is turned to an L level, and the drive signal DON is turned to an H level. Thus, driving of the motor 13 is resumed.

Therefore, the time t5 measured by the fifth timer 74 is an external magnetic field determination time, and is set to, for example, 30 msec. The time t5 is preferably set to a period longer than a cycle of an AC power source (about 50 Hz) which tends to be a noise source.

Effects of Second Embodiment

According to the second embodiment, the same effects as those in the first embodiment can be achieved.

In other words, according to the motor control circuit 30B, a case where the time t3 or more elapses from turning-off of the driver 51, driving of the driver 51 is stopped, and thus it is possible to prevent the motor 13 from being driven in a state of being influenced by a disturbance such as an external magnetic field.

Therefore, it is possible to prevent the occurrence of a problem that the motor 13 is not accurately controlled due to a disturbance, and thus a hand position is inaccurate.

The motor control circuit 30B includes the magnetic field detection circuit 71, and resumes driving of the driver 51 after the magnetic field detection circuit 71 detects that an external magnetic field disappears in a case where driving of the driver 51 is stopped. Thus, a probability that the driver 51 may be stopped again due to the influence of a disturbance after resuming driving of the driver 51 is reduced, and thus a pointer moved by the motor 13 can be reliably moved to a desired indication position after resuming the driving.

Third Embodiment

Next, a third embodiment of the present disclosure will be described with reference to FIGS. 16 to 21. In the third embodiment, a constituent element equal or similar to that in the first and second embodiments is given the same reference numeral, and a description thereof will be omitted or made briefly.

Description of Configuration

A motor control circuit 30C of the third embodiment is different from the first and second embodiments in which driving of the motor 13 is controlled by comparing the current I with the lower limit current value Imin in that driving of the motor 13 is controlled by comparing the current I with an upper limit current value Imax.

Figure 16:
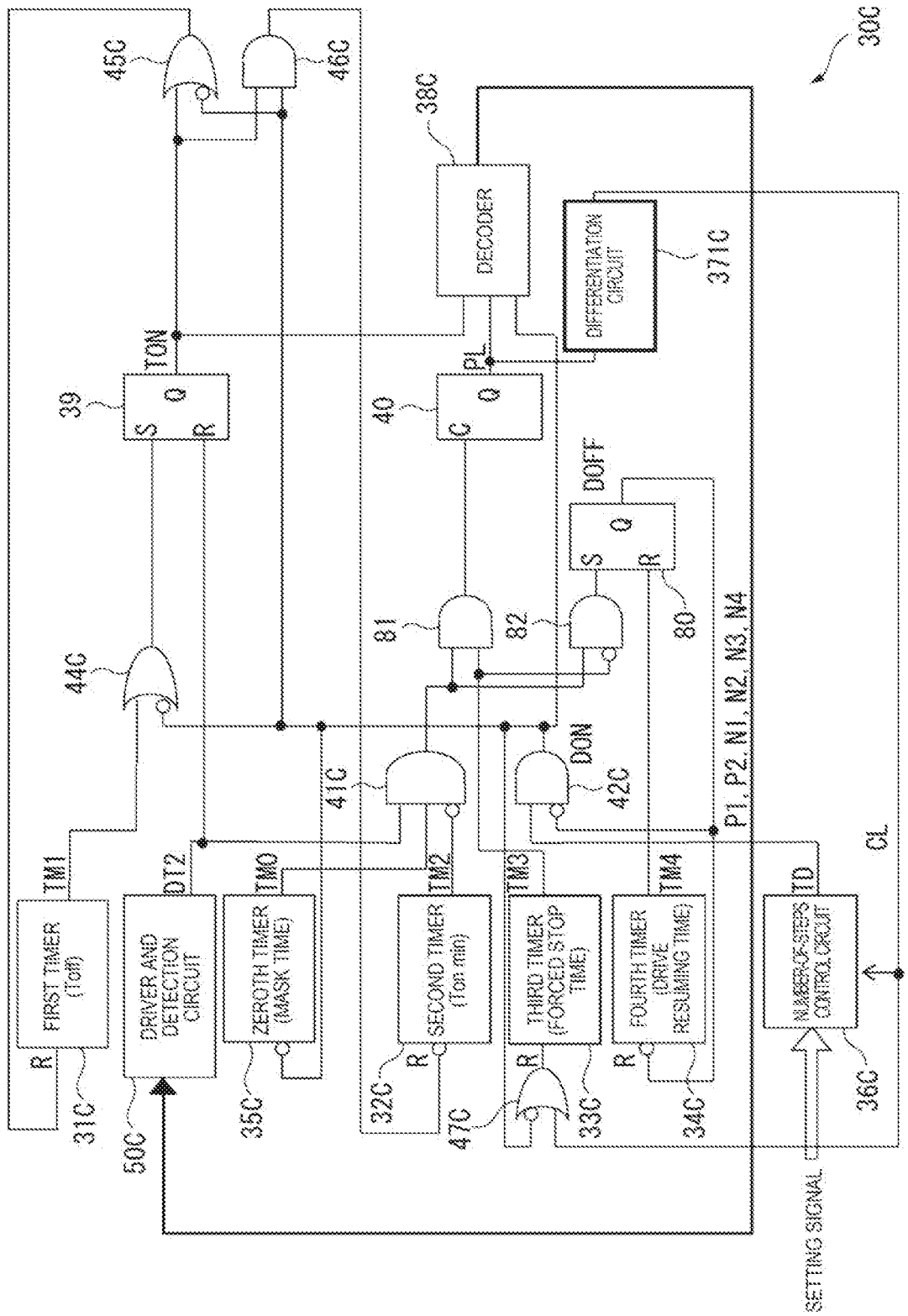
FIG. 16 is a circuit diagram illustrating a configuration of a motor control circuit according to a third embodiment.

As illustrated in FIG. 16, the motor control circuit 30C includes a first timer 31C, a second timer 32C, a third timer 33C, a fourth timer 34C, a zeroth timer 35C, a number-of-steps control circuit 36C, a differentiation circuit 371C, a decoder 38C, SR latch circuits 39 and 80, a flip-flop 40, AND circuits 41C, 42C, 46C, 81, and 82, OR circuits 44C, 45C, and 47C, and a driver and detection circuit 50C.

The first timer 31C is a timer measuring a time (OFF time Toff) t31 for which the supply of a current to the coil 130 of the motor 13 is stopped while the driver 51 is in an OFF state. An output TM1 from the first timer 31C is turned to an H level after a signal which is input to a reset terminal R of the first timer 31C is turned to an L level such that a reset state thereof is canceled, and then the time t31 elapses.

The second timer 32C is a timer measuring a time (ON time Ton) t32 for which a current is supplied to the coil 130 of the motor 13 while the driver 51 is in an ON state. The time t32 is a second setting time, and is one of conditions for switching a polarity of a current or stopping driving of the driver 51 as will be described later. An output TM2 from the second timer 32C is turned to an H level after a signal which is input to a reset terminal R of the second timer 32C is turned to an H level such that a reset state thereof is canceled, and then the time t32 elapses.

The third timer 33C is a timer measuring a first setting time t33 serving as a condition for stopping driving of the motor 13. An output TM3 from the third timer 33C is turned to an H level after a signal which is input to a reset terminal R of the third timer 33C is turned to an L level such that a reset state thereof is canceled, and then the time t33 elapses.

The fourth timer 34C is a timer measuring a standby setting time t34 until driving of the motor 13 is resumed. An output TM4 from the fourth timer 34C is turned to an H level after a signal which is input to a reset terminal R of the fourth timer 34C is turned to an H level such that a reset state thereof is canceled, and then the time t34 elapses.

The zeroth timer 35C is a timer measuring a mask time t30 for preventing a wrong determination of polarity switching when driving is started. An output TM0 from the zeroth timer 35C is turned to an H level after a signal which is input to a reset terminal R of the zeroth timer 35C is turned to an H level such that a reset state thereof is canceled, and then the time t30 elapses.

The driver and detection circuit 50C is a circuit which supplies a current to the coil 130 of the motor 13, and also determines whether or not a value of the current flowing through the coil 130 exceeds the upper limit current value Imax. The details of the driver and detection circuit 50C will be described later with reference to FIG. 17.

The number-of-steps control circuit 36C includes a presettable down-counter, and outputs a drive period signal TD. The number-of-steps control circuit 36C sets the drive period signal TD in an H level until a preset value of the presettable down-counter set by a setting signal is counted down and becomes 0 by using a clock signal CL, and turns the drive period signal TD to an L level when the presettable down-counter becomes 0. The setting signal which is input to the number-of-steps control circuit 36C is input from, for example, the CPU 23 via the bus 27.

Figure 19:
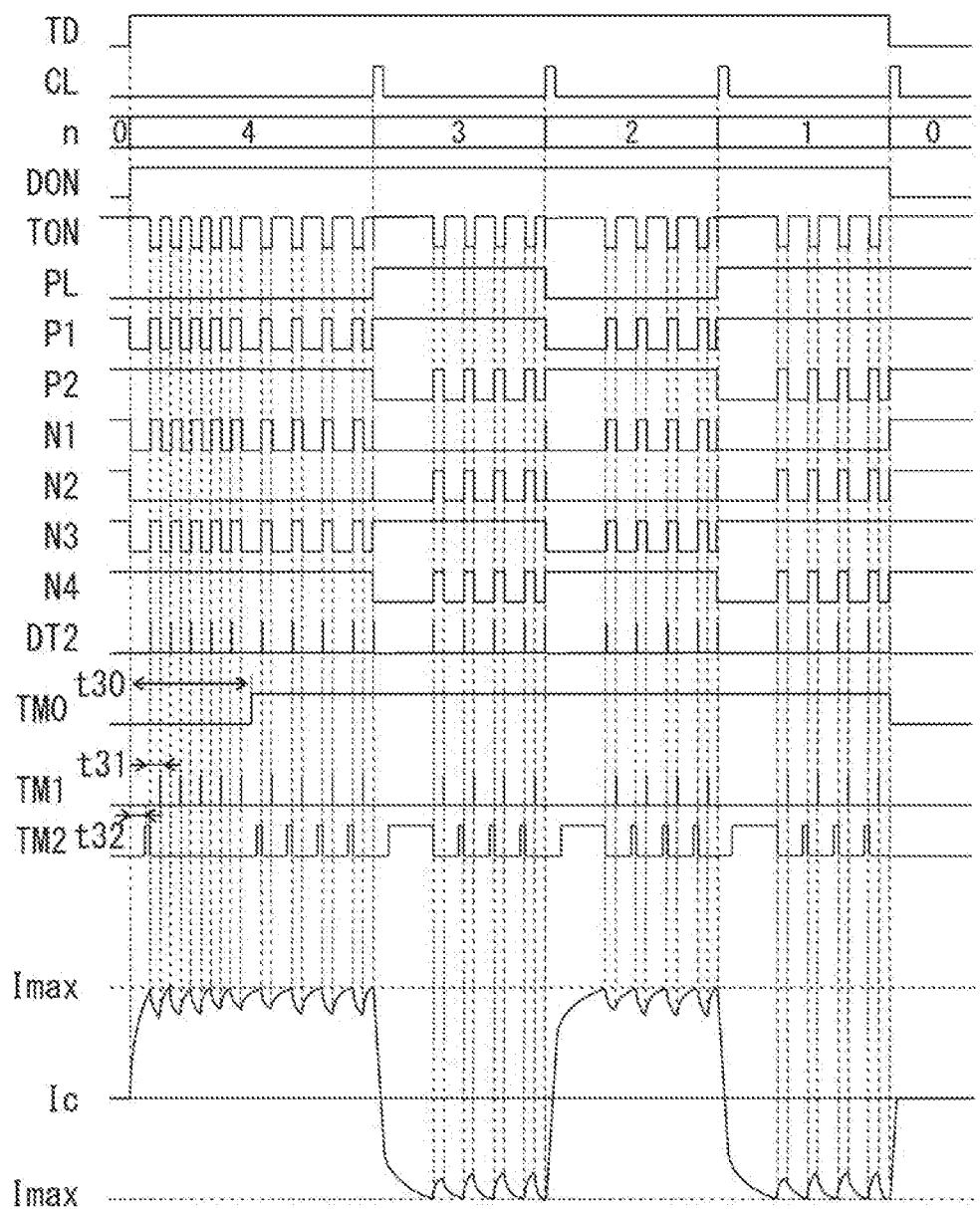
FIG. 19 is a timing chart illustrating an operation in the motor control process according to the third embodiment.
Figure 20:
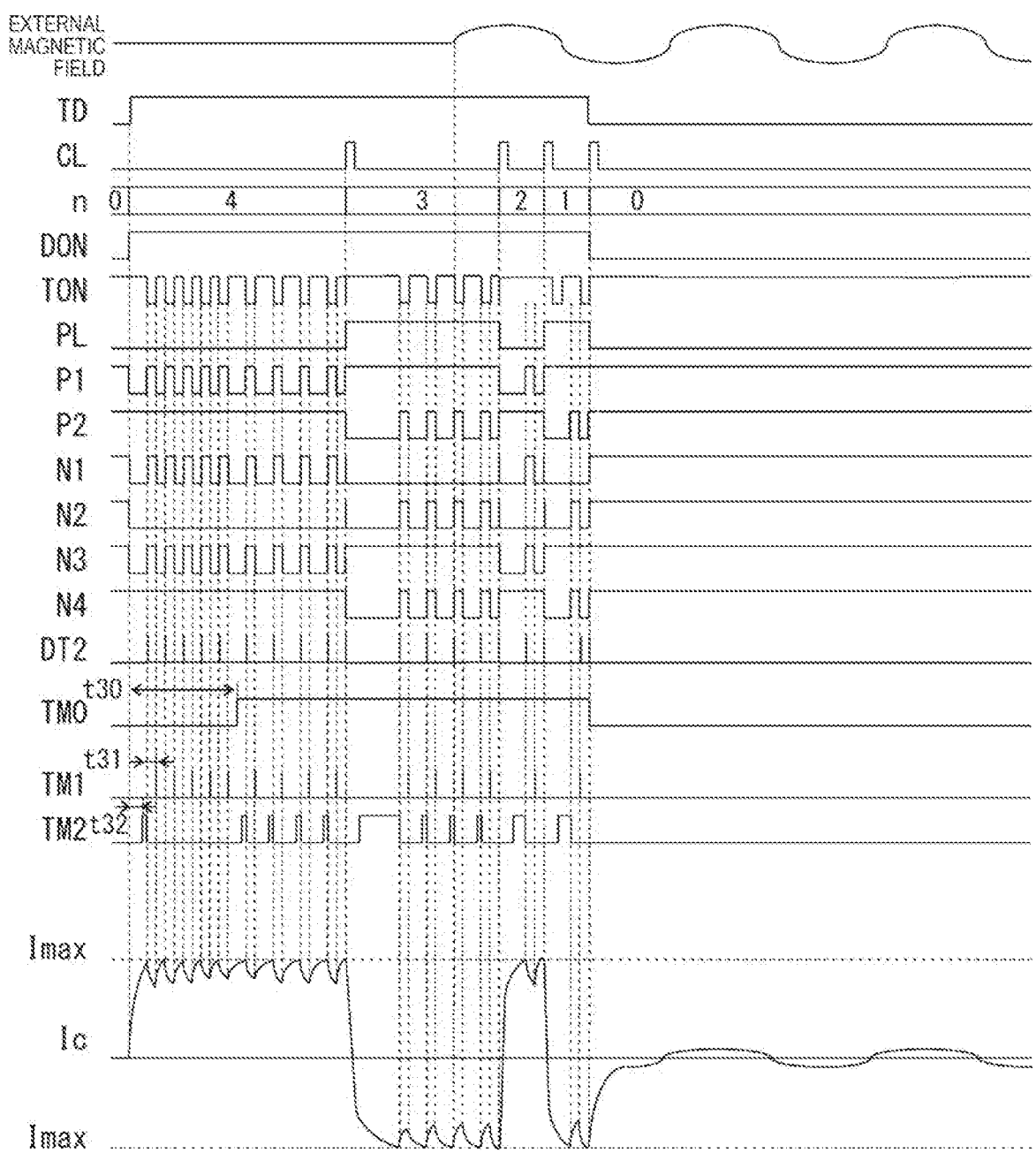
FIG. 20 is a timing chart illustrating an operation in a comparative example in the motor control process according to the third embodiment.
Figure 21:
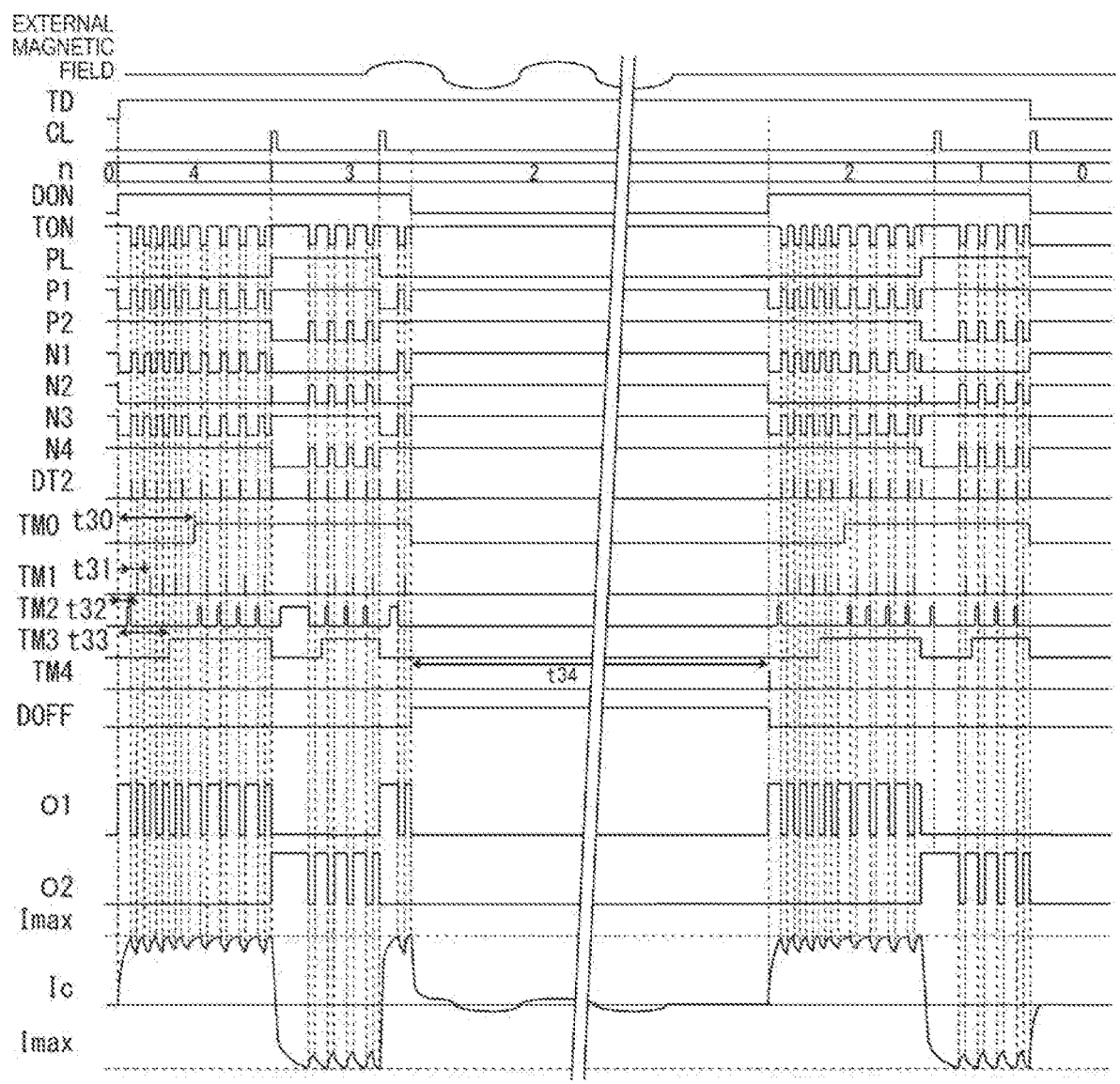
FIG. 21 is a timing chart illustrating an operation in the motor control process according to the third embodiment.

The decoder 38C which is a drive control unit outputs the gate signals P1, P2, N1, N2, N3, and N4 for the driver and detection circuit 50C as illustrated in timing charts in FIGS. 19 to 21 according to states of the ON/OFF switching signal TON for a current output, the drive polarity signal PL, and the drive signal DON.

The differentiation circuit 371C outputs a differentiation pulse (clock signal CL) whenever the drive polarity signal PL rises and falls.

The AND circuit 41C receives an output DT2 from the driver and detection circuit 50C, an inverted signal of the output TM2 from the second timer 32C, and the output TM0 from the zeroth timer 35C. An output from the AND circuit 41C is input to the AND circuit 81 along the output TM3 from the third timer 33C. An output from the AND circuit 81 is input to a clock input of the flip-flop 40.

The AND circuit 42C receives an inverted signal of an output DOFF from the SR latch circuit 80 and the drive period signal TD. An output DON from the AND circuit 42C is input to the decoder 38C and the OR circuit 44C.

The OR circuit 44C receives an inverted signal of the output DON and the output TM1 from the first timer 31C, and outputs a signal to the SR latch circuit 39.

The OR circuit 45C receives an output TON from the SR latch circuit 39 and an inverted signal of the output DON, and an output signal from the OR circuit 45C is input to the reset terminal R of the first timer 31C.

The AND circuit 46C receives the output TON and the output DON, and an output signal from the AND circuit 46C is inverted to be input to the reset terminal of the second timer 32C.

The OR circuit 47C receives the clock signal CL output from the differentiation circuit 371C and an inverted signal of the output DON, and an output from the OR circuit 47C is input to the reset terminal R of the third timer 33C.

The AND circuit 82 receives an output signal from the AND circuit 41C and an inverted signal of the output TM3, and an output signal from the AND circuit 82 is input to a set terminal S of the SR latch circuit 80.

The output TM4 is input to a reset terminal R of the SR latch circuit 80, and an output signal DOFF from the SR latch circuit 80 is inverted to be input to the reset terminal of the fourth timer 34C and the AND circuit 42C.

Configurations of Driver and Detection Circuit

Figure 17:
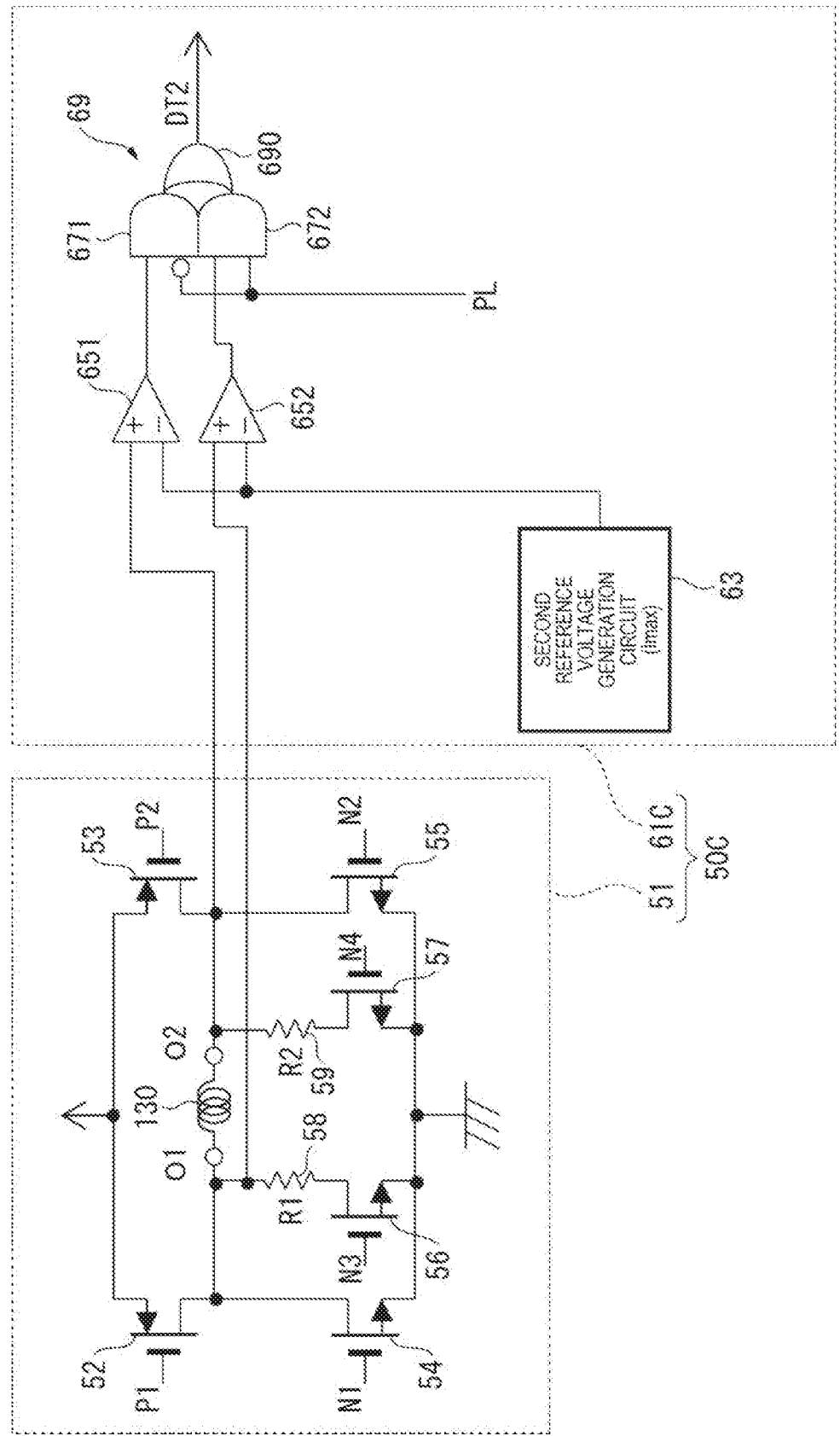
FIG. 17 is a circuit diagram illustrating configurations of a driver and a detection circuit according to the third embodiment.

The driver and detection circuit 50C includes a driver 51 and a current detection circuit 61C as illustrated in FIG. 17. The driver 51 is the same as that in the first embodiment and is thus given the same reference numeral, and a description thereof will be omitted.

The current detection circuit 61C includes a second reference voltage generation circuit 63, comparators 651 and 652, and a complex gate 69. The complex gate 69 is a single element having a function equivalent to a combination of AND circuits 671 and 672 and an OR circuit 690. In other words, the first reference voltage generation circuit 62 of the current detection circuit 61 is changed to the second reference voltage generation circuit 63.

The second reference voltage generation circuit generates a voltage corresponding to the upper limit current value Imax. Therefore, the output DT2 from the current detection circuit 61C is turned to an H level in a case where the current I flowing through the coil 130 exceeds the upper limit current value Imax, and is turned to an L level in a case where the current I is equal to or less than the upper limit current value Imax. Thus, the current detection circuit 61C is an upper limit detection unit detecting that the current I flowing through the coil 130 exceeds the upper limit current value Imax.

Control Process of Motor Control Circuit

Next, control performed by the motor control circuit 30C of the present embodiment will be described with reference to a flowchart in FIG. 18, and timing charts in FIGS. 19 to 21. FIG. 19 is a timing chart illustrating an operation of the motor control circuit 30C during normal times, FIG. 20 is a timing chart in a comparative example in which a defect occurs due to a disturbance such as an external magnetic field, and FIG. 21 is a timing chart illustrating an operation of the motor control circuit 30C in a case where a disturbance such as an external magnetic field occurs.

Operation of Motor Control Circuit

Figure 18:
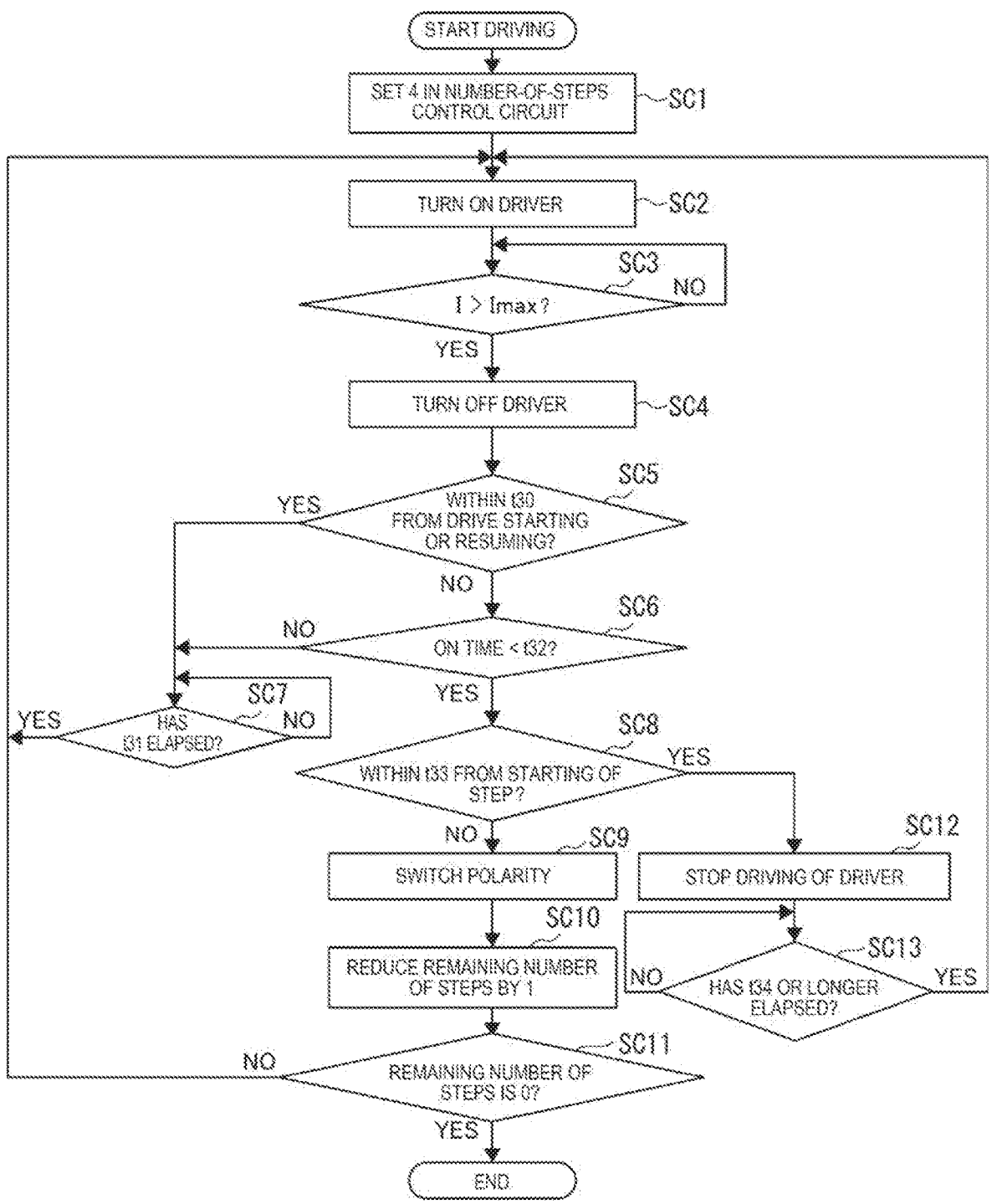
FIG. 18 is a flowchart illustrating a motor control process according to the third embodiment.

As illustrated in FIG. 18, the CPU 23 of the IC 20 outputs a setting signal for setting a movement amount of a pointer to the number-of-steps control circuit 36C of the motor control circuit 30C (SC1). In the present embodiment, a setting signal for setting the number of steps to "4" is output.

In a case where the setting value n=4 is set in the number-of-steps control circuit 36C according to the setting signal, the drive period signal TD is turned to an H level, the output DON from the AND circuit 42 is turned to an H level, the decoder 38C turns on the driver 51 of the motor 13 by using the gate signals P1, P2, N1, N2, N3, and N4 (SC2), and thus a forward current flows through the coil 130, in the same manner as in the first embodiment.

Next, the current detection circuit 61C determines whether or not the current I flowing through the coil 130 exceeds the upper limit current value Imax (SC3). As described above, the current detection circuit 61C continuously performs the determination process in SC3 until voltages generated in the detection resistors 58 and 59 exceed a reference voltage generated from the second reference voltage generation circuit 63 (NO in SC3).

On the other hand, in a case where a determination result in SC3 is YES, the current detection circuit 61C turns the detection signal DT2 to an H level, a reset signal is input to the SR latch circuit 39, and the signal TON is turned to an L level. In a case where the signal TON is turned to an L level, the decoder 38C controls the gate signals so as to turn off the driver 51 (SC4).

Next, it is determined whether or not a time from drive starting or drive resuming is within the mask time t30 (SC5). The zeroth timer 35C measuring the mask time t30 cancels a reset state thereof when the output DON is turned to an H level, and starts to measure a time. Therefore, in a case where the output TM0 from the zeroth timer 35C has an L level, the time from drive starting or drive resuming is within the time t30, and thus a determination result in SC5 is YES. On the other hand, in a case where the output TM0 from the zeroth timer 35C has an H level, the time from drive starting or drive resuming exceeds the time t30, and thus a determination result in SC5 is NO.

In a case where a determination result in SC5 is NO, it is determined whether or not the ON time Ton of the driver 51 measured by the second timer 32C is shorter than the time t32 (SC6). In a case where the signal TON is turned to an H level, the second timer 32C cancels a reset state thereof, and starts to measure a time. The output TM2 has an L level in a case where a measured time is shorter than the time t32, and the output TM2 has an H level in a case where the measured time is equal to or longer than the time t32. Therefore, in SC6, a determination result is YES in a case where the output TM2 has an L level, and a determination result is NO in a case where the output TM2 has an H level.

In a case where a determination result in SC5 is YES, or a determination result in SC6 is NO, it is determined whether or not the time t31 has elapsed from turning-off of the driver 51 (SC7). In a case where a determination result in SC7 is NO, the determination in SC7 continuously waits until the time t31 elapses, that is, the output TM1 from the first timer 31C is turned to an H level.

In a case where a determination result in SC7 is YES, that is, the output TM1 is turned to an H level, output from the OR circuit 44C is turned to an H level, the output TON from the SR latch circuit 39 is turned to an H level, and thus the decoder 38C turns on the driver 51 (SC2). Hereinafter, the motor control circuit 30C repeatedly performs SC2 to SC7 until a determination result in SC6 is YES.

In a case where a determination result in SC6 is YES, an elapsed time from starting of a step measured by the third timer 33C is within the first setting time t33 (SC8). In a case where a determination result in SC8 is NO, the mask time t30 elapses such that the output TM0 has an H level, the current I exceeds the upper limit current value Imax such that the detection signal DT2 has an H level, and the ON time is shorter than the time t32 such that the output TM2 has an L level. Therefore, an output from the AND circuit 41C has an H level. In a case where a determination result in the process in SC8 is NO, an elapsed time from starting of the step exceeds the time t33 such that the output TM3 has an H level, and thus an output from the AND circuit 81 also has an H level. Thus, a clock signal is input to the flip-flop 40, the drive polarity signal PL is inverted, and thus a polarity is switched (SC9). Therefore, in the third embodiment, the second timer 32C, the third timer 33C, the zeroth timer 35C, the current detection circuit 61C, the flip-flop 40, and the decoder 38C configure a polarity switching unit which determines whether or not a polarity switching condition is satisfied, and switches a polarity of a drive signal.

Since the drive polarity signal PL is inverted, the clock signal CL is output from the differentiation circuit 371C, the number-of-steps control circuit 36C reduces the remaining number of steps by one (SC10), repeatedly performs SC2 to SC11 until the remaining number of steps becomes 0 (until a determination result in SC11 is YES), and thus the motor 13 can be normally driven as illustrated in FIG. 19.

As described above, since an ON time of the driver 51, that is, the motor 13 and a rotation angle of the rotor 133 are correlated with each other, the time t32 is set to a value generated when the rotor 133 is rotated by a predetermined angle (for example, 180° in a bipolar rotor) corresponding to rotation in one step. Therefore, in a case where an ON time is shorter than the time t32, it can be detected that the rotor 133 is rotated by a predetermined angle. However, as illustrated in FIG. 19, an ON time may be temporarily shorter than the time t32 even if the rotor 133 is not rotated by a predetermined angle right after driving is started (first step). In order to prevent a wrong determination in this case, the mask time t30 is set in the first step, and control is performed such that an ON time is compared with the time t32 after the mask time t30 elapses.

Thus, as illustrated in FIG. 19, the motor 13 can be normally driven.

Operation (Comparative Example) During Occurrence of Defect

Here, for comparison with the present embodiment, a description will be made of an example in which a defect occurs due to the influence of an external magnetic field or impact in a case where the third timer 33C and the fourth timer 34C are not provided, with reference to a timing chart in FIG. 20.

An ON time and an OFF time of the driver 51 depend on an inverse induced voltage generated in the coil 130, but the inverse induced voltage changes due to the influence of an external magnetic field or impact, and thus a relationship between an ON time or an OFF time and a rotational position of the rotor 133 may not be established. For example, as illustrated in FIG. 20, there is a case where an ON time is shorter than the time t32 due to the influence of an external magnetic field or impact before a timing at which the rotor 133 is regarded to be rotated by 180°, thus polarity switching is performed although the rotor 133 is not rotated, so that driving is finished despite a predetermined number of steps not being finished.

The example illustrated in FIG. 20 is an example of defect occurrence patterns, and defects of other various patterns occur due to a disturbance.

Operation in Third Embodiment

A description will be made of an operation for preventing the defect in the present embodiment with reference to FIGS. 18 and 21.

In FIG. 18, in a case where a determination result in SC6 is YES, and polarity switching in SC7 is immediately performed, there is a probability that the defect as illustrated in FIG. 20 may occur due to the influence of an external magnetic field or the like.

Therefore, in the present embodiment, in a case where a determination result in SC6 is YES, as described above, it is determined whether or not a time from drive starting in each step (drive starting in each phase) is within the first setting time t33 (SC8).

The third timer 33C cancels a reset state thereof and starts to measure a time in a state in which the clock signal CL has an L level at a timing at which the output DON is turned to an H level, that is, at the time of drive starting and drive resuming, that is, in the first step, in a state in which the output DON has an H level and the clock signal CL is turned to an H level, that is, a polarity is switched. In a case where the time t33 has elapsed from drive starting in each step, the third timer 33C turns the output TM3 to an H level. Therefore, in a case where the output TM3 has an L level, a determination result in SC8 is YES. In a case where the output TM3 has an H level, a determination result in SC8 is NO.

In a case where a determination result in SC8 is NO, as described above, the process in SC9 of switching a polarity and the process in SC10 of reducing the number of steps by one, and, in a case where the remaining number of steps becomes 0 in SC11, a pointer drive process in FIG. 18 is finished.

On the other hand, in a case where a determination result in SC8 is YES, since an output from the AND circuit 41C has an H level, and the output TM3 has an L level, an output from the AND circuit 82 to which the output TM3 is inverted to be input has an H level, and the output DOFF from the SR latch circuit 80 has an H level. Thus, the output DON of the AND circuit 42C has an L level, and thus driving of the driver 51 is stopped (SC12). Therefore, in the third embodiment, the second timer 32C, the third timer 33C, the SR latch circuit 80, and the decoder 38C are provided to configure a drive stopping unit.

In a case where driving of the driver 51 is stopped, it is determined whether or not the standby setting time t34 has elapsed from starting of the stop (SC13). In other words, the fourth timer 34C measuring the time t34 starts measurement when the output DOFF is turned to an H level, and, in a case where the time t34 elapses and an output from the fourth timer 34C is turned to an H level, the SR latch circuit 80 is reset, and the output DOFF is turned to an L level. In a case where the output DOFF is turned to an L level, the output DON is turned to an H level, and thus driving of the driver 51 is resumed (SC2). Thereafter, SC2 to SC13 are repeatedly performed as appropriate, the driving is continuously performed until n becomes 0. In a case where n becomes 0, a determination result in SC11 is YES, and driving is finished.

The time t30 to the time t34 respectively measured by the timers 31C to 35C may be set according to characteristics or drive voltages of the motor 13, and, for example, the time t30 is set to 1500 μsec, the time t31 is set to 25 μsec, the time t32 is set to 20 μsec, the time t33 is set to 1000 μsec, and the time t34 is set to 1 sec.

Effects of Third Embodiment

According to the third embodiment, the same effects as those in the first and second embodiments can be achieved.

In other words, in the motor control circuit 30C, in a case where an ON time of the driver 51 is shorter than the time t32 within the time t33 from starting of a step, driving of the driver 51 is stopped, and thus it is possible to prevent the motor 13 from being driven in a state of being influenced by a disturbance such as an external magnetic field.

Therefore, it is possible to prevent the occurrence of a problem that the motor 13 is not accurately controlled due to a disturbance, and thus a hand position is inaccurate.

In a case where the current I exceeds the upper limit current value Imax, the motor control circuit 30C turns off the driver 51, and can thus prevent the current I from exceeding the upper limit current value Imax and can easily reduce power consumption.

In a case where rotation of the rotor 133 is detected during an ON time of the driver 51, wrong detection may tend to be performed in a first step right after driving is started, but the mask time t30 is set, and thus wrong detection can be prevented.

The motor control circuit 30C is provided with the timers 31 to 35 in addition to the current detection circuit 61C which is an upper limit detection unit comparing the current I with the upper limit current value Imax, and can perform control by only measuring an ON time of a drive unit or an OFF time of the drive unit. Thus, a configuration of the motor control circuit 30C can be simplified.

Fourth Embodiment

Next, a fourth embodiment of the present disclosure will be described with reference to FIGS. 22 to 31.

Figure 22:
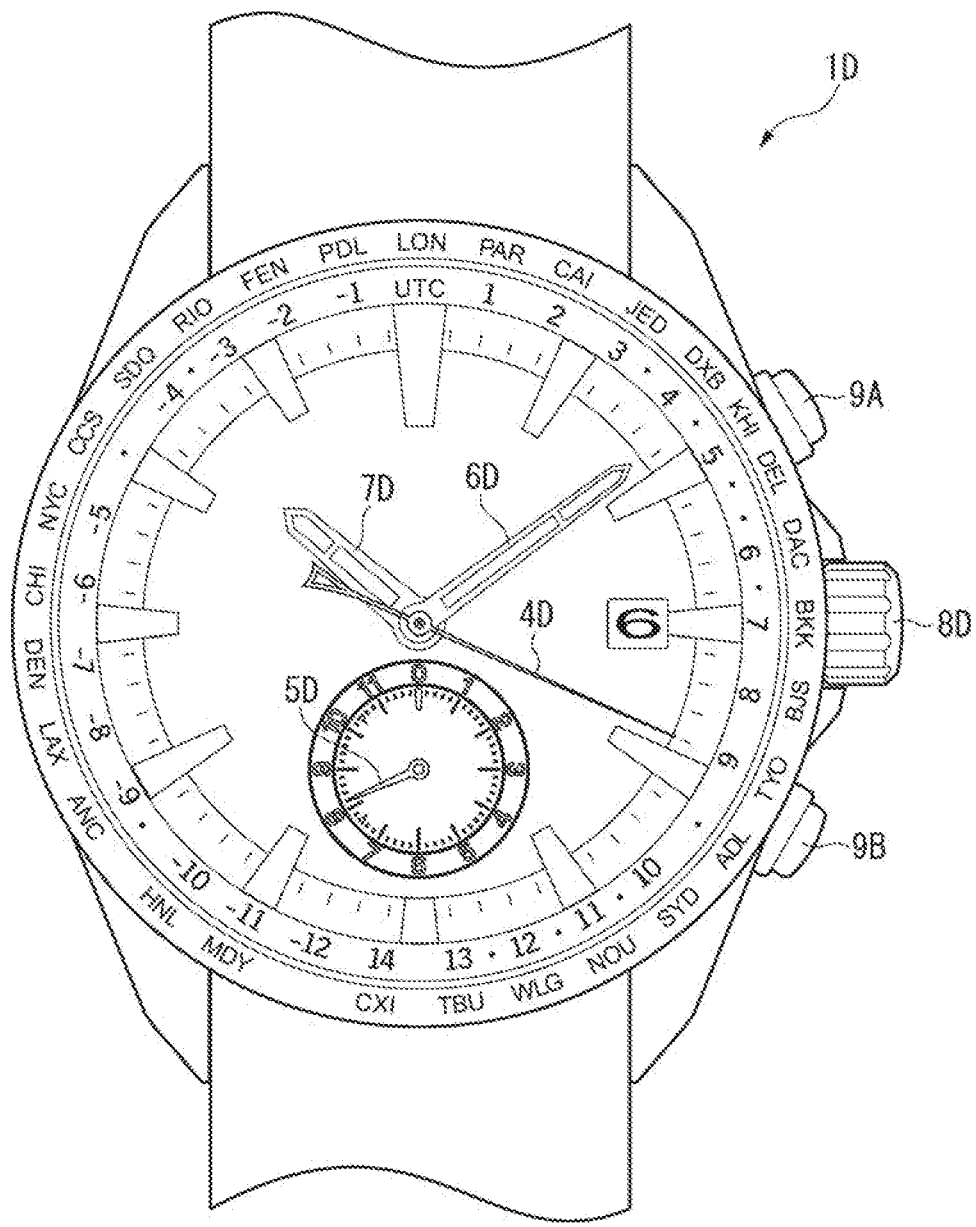
FIG. 22 is a front view illustrating an electronic timepiece of a fourth embodiment.

An electronic timepiece 1D of the fourth embodiment is an analog electronic timepiece having a universal time function as illustrated in FIG. 22. The electronic timepiece 1D includes a minute hand 6D and an hour hand 7D which are center hands, a second hand 5D disposed on the six o'clock side, a city hand 4D indicating a time zone, a crown 8D, and buttons 9A and 9B.

Figure 23:
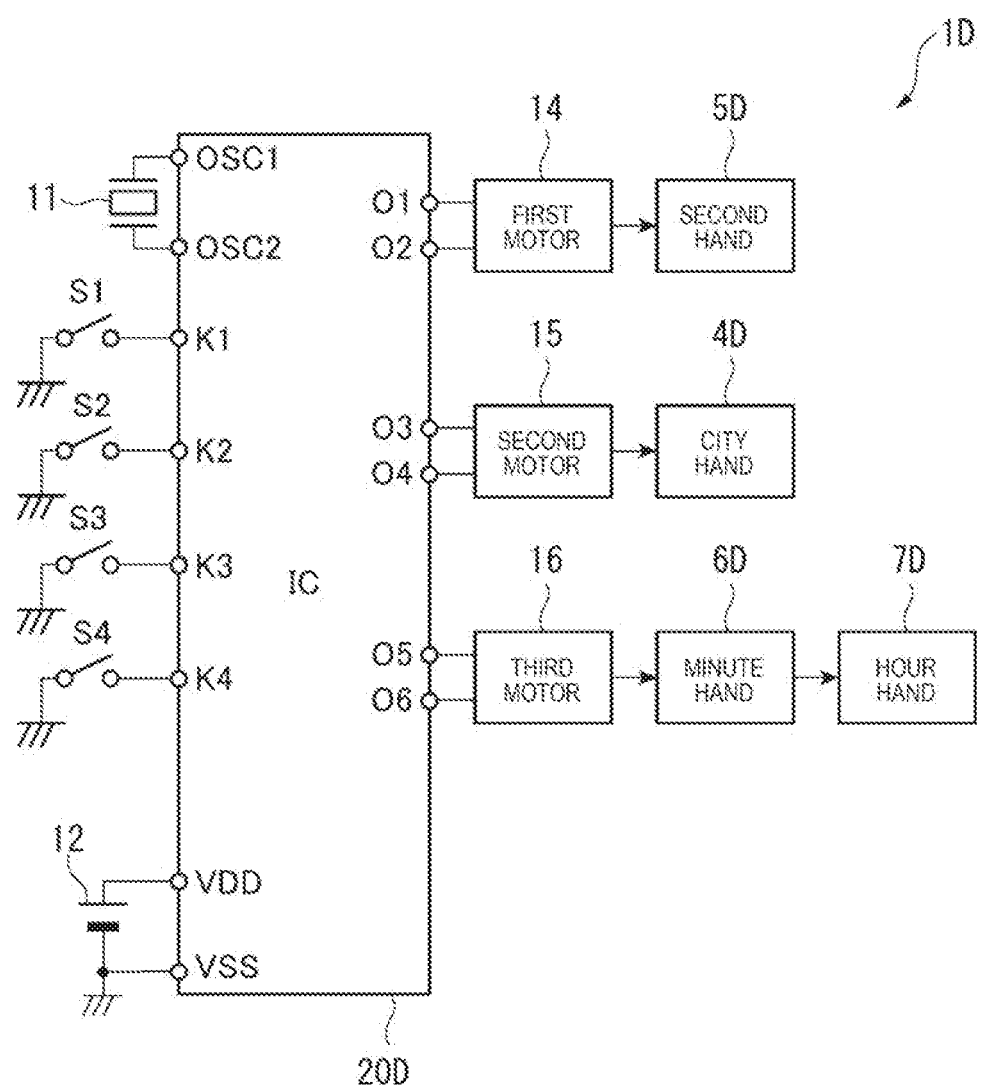
FIG. 23 is a circuit diagram illustrating a circuit configuration of the electronic timepiece according to the fourth embodiment.

As illustrated in FIG. 23, in the same manner as the electronic timepiece 1 of the first embodiment, the electronic timepiece 1D includes a quartz crystal resonator 11 which is a signal source, a battery 12 which is a power source, push switches S1 and S2 which are turned on and off in conjunction with an operation on the buttons 9A and 9B, switches S3 and S4 which are turned on and off in conjunction with an extraction operation on the crown 8D, and a first motor 14, a second motor 15, a third motor 16, and an IC 20D for the timepiece.

The first motor 14, the second motor 15, and the third motor 16 are the same stepping motors as the motor 13 of the first embodiment, and thus a description thereof will be omitted.

The second hand 5D is moved by the first motor 14, and indicates a second of a time point. The city hand 4D is moved by the second motor 15, and indicates a representative city of a set time zone.

The minute hand 6D and the hour hand 7D are moved by the third motor 16 in conjunction with each other. Thus, the minute hand 6D displays a minute in 180 divisions per turn, and the hour hand 7D displays an hour in 2160 divisions per turn.

As illustrated in FIG. 23, the IC 20D has connection terminals OSC1 and OSC2 connected to the quartz crystal resonator 11, input/output terminals K1 to K4 connected to the switches S1 to S4, power source terminals VDD and VSS connected to the battery 12, and the output terminals O1 to O6 connected to the coils 130 of the motors 14 to 16.

Circuit Configuration of IC

Figure 24:
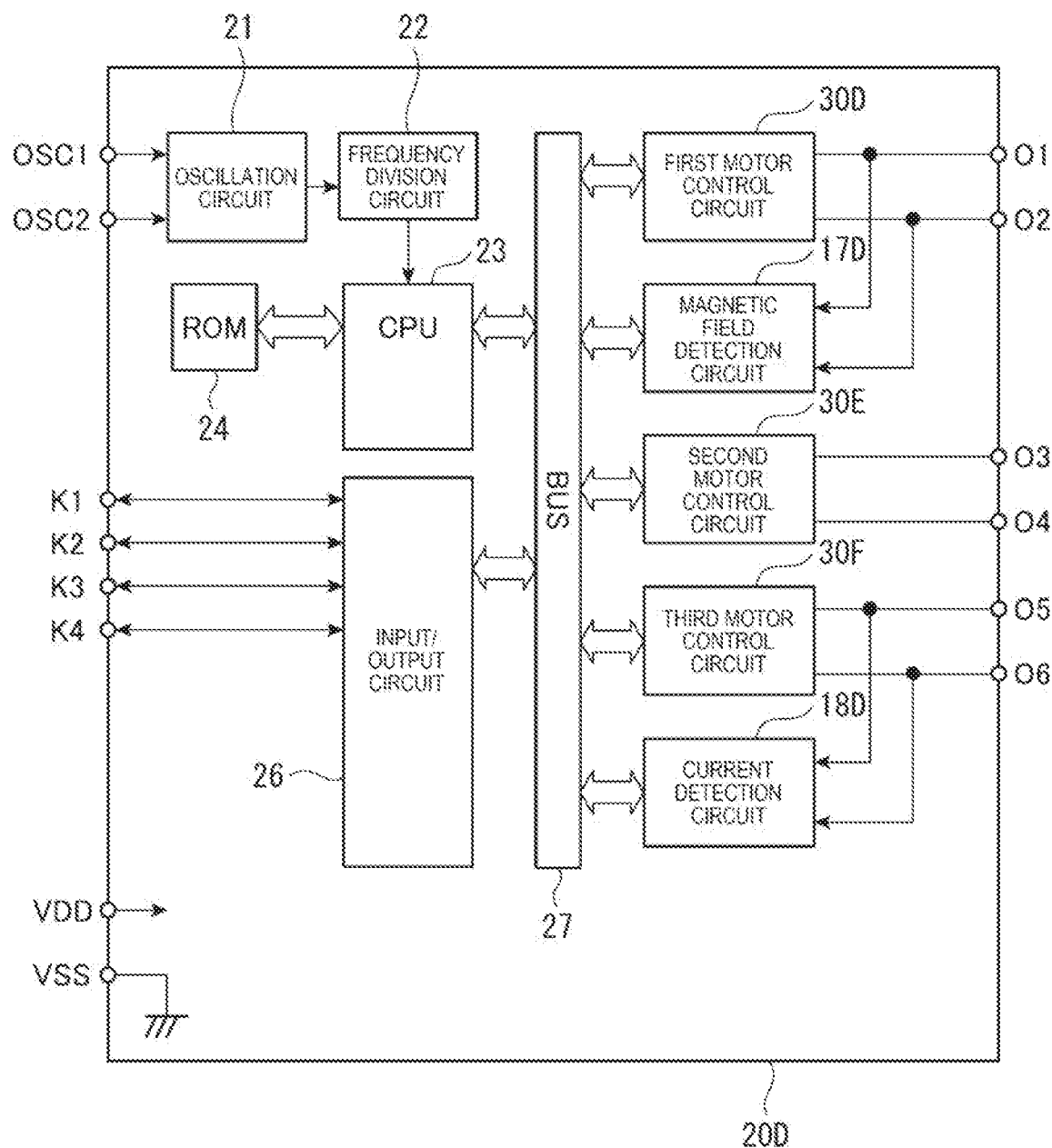
FIG. 24 is a circuit diagram illustrating a configuration of an IC of the electronic timepiece according to the fourth embodiment.

As illustrated in FIG. 24, the IC 20D includes an oscillation circuit 21, a frequency division circuit 22, a CPU 23 for control of the electronic timepiece 1D, a ROM 24, an input/output circuit 26, and a bus 27. The IC 20D includes a first motor control circuit 30D driving the first motor 14, a second motor control circuit 30E driving the second motor 15, a third motor control circuit 30F driving the third motor 16, a magnetic field detection circuit 17D which is a magnetic field detector, and a current detection circuit 18D.

The oscillation circuit 21, the frequency division circuit 22, the CPU 23, the ROM 24, the input/output circuit 26, and the bus 27 have the same configurations as those in the first embodiment.

The first motor control circuit 30D drives the first motor 14 every second, and is thus configured with a control circuit capable of achieving low power consumption, employed in a wristwatch or the like. In other words, the first motor control circuit 30D performs control in which a main drive pulse having a small pulse width is output, then an induced voltage of the coil 130 of the first motor 14 is measured, so that it is detected whether or not the rotor 133 is being rotated, and, in a case where the rotor 133 is not rotated, a correction drive pulse (fixed pulse) fixed to a pulse width larger than that of the main drive pulse is output such that the rotor 133 is reliably rotated. The magnetic field detection circuit 17D is provided along with the first motor control circuit 30D, a magnetic field detection pulse is output to the coil 130 of the first motor before a main drive pulse is output, and an induced voltage generated in the coil 130 is detected by the magnetic field detection circuit 17D, so that the presence or absence of an external magnetic field is detected.

Here, in a case where an external magnetic field is not detected, the first motor control circuit 30D performs low power consumption drive control of outputting the main drive pulse so as to detect rotation, and outputting the correction drive pulse in a case where rotation is not detected. In a case where an external magnetic field is detected, the first motor control circuit 30D reliably rotates the rotor 133 by outputting the correction drive pulse (fixed pulse) instead of the main drive pulse. In this case, it is not necessary to detect rotation of the rotor 133.

The second motor control circuit 30E drives the second motor 15 with a fixed pulse to be normally rotated and reversely rotated.

In the electronic timepiece 1D, in a case where the button 9A is pushed, the second motor control circuit 30E causes the city hand 4D to be moved in a normal rotation direction (clockwise direction), and to indicate a city name of the next time zone. In a case where the button 9B is pushed, the second motor control circuit 30E causes the city hand 4D to be moved in a reverse rotation direction (counterclockwise direction), and to indicate a city name of the next time zone.

A time zone is typically set every hour, and, thus, whenever the buttons 9A and 9B are pushed, the time zone is changed every hour. A time zone which is not set every hour may be present, such as India which is set in a time zone of +5.5 hours with respect to UTC. In this case, when the buttons 9A and 9B are pushed, the next time zone of a set time zone may be selected.

Figure 25:
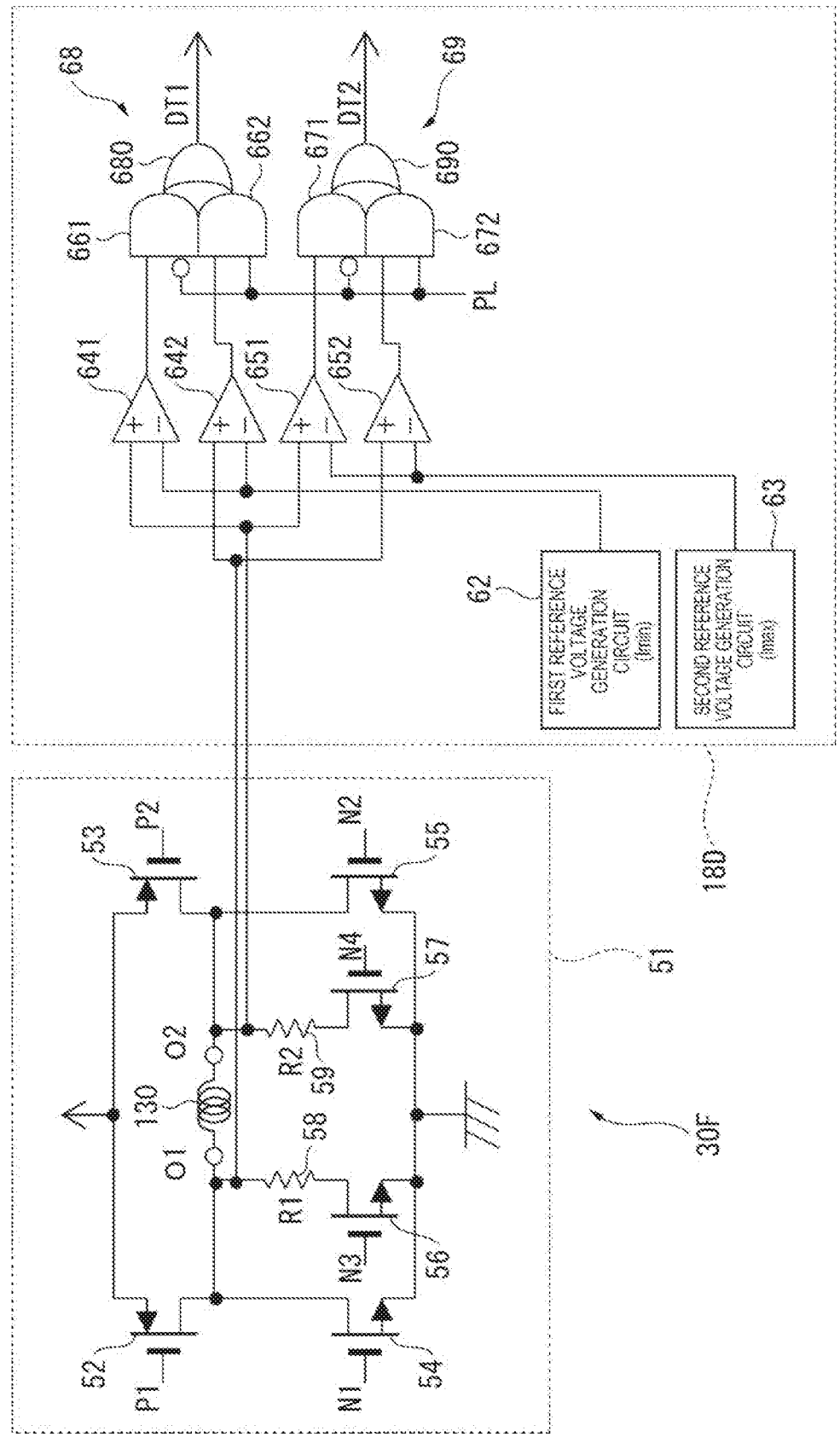
FIG. 25 is a circuit diagram illustrating configurations of a driver and a detection circuit according to the fourth embodiment.

The third motor control circuit 30F includes the same driver 51 as in each of the embodiments as illustrated in FIG. 25. However, the motor control circuits 30, 30B, and 30C of the embodiments include the logic circuits driving the transistors 52 to 57 of the driver 51, but, in the present embodiment, the logic circuits driving the transistors 52 to 57 of the driver 51 are not provided. In the present embodiment, the CPU 23 directly controls the transistors 52 to 57 via the bus 27, so as to control driving of the third motor 16. Thus, in the fourth embodiment, the CPU 23 configures a drive control unit, a polarity switching unit, and a drive stopping unit.

The current detection circuit 18D is provided along with the third motor control circuit 30F. As illustrated in FIG. 25, the current detection circuit 18D includes a first reference voltage generation circuit 62, a second reference voltage generation circuit 63, comparators 641, 642, 651, and 652, and complex gates 68 and 69. The complex gate 68 is a single element having a function equivalent to a combination of AND circuits 661 and 662 and an OR circuit 680. The complex gate 69 is a single element having a function equivalent to a combination of AND circuits 671 and 672 and an OR circuit 690. In other words, the current detection circuit 18D has a combined configuration of the current detection circuits 61 and 61C.

The outputs DT1 and DT2 as detection results in the current detection circuit 18D are detected by the CPU 23 via the bus 27, and the CPU 23 controls the driver 51 of the third motor control circuit 30F according to the outputs DT1 and DT2.

The third motor control circuit 30F drives the third motor 16 to move the hands every 20 seconds during normal hand movement. In this case, the minute hand 6D is moved by 2 degrees (=360/180), and the hour hand 7D is moved by ⅙ degrees (=360/2160).

During a time zone changing operation using the buttons 9A and 9B, the third motor control circuit 30F moves the minute hand 6D and the hour hand 7D according to a changed time zone. For example, in a case where a time zone advances by an hour by using the button 9A, the minute hand 6D and the hour hand 7D are moved by +60 minutes in conjunction therewith.

Next, a description will be made of an operation of the electronic timepiece 1D of the fourth embodiment with reference to flowcharts in FIGS. 26 and 27.

In a case where an input from the switch S1 connected to the input/output terminal K1 of the IC 20D is detected according to a push operation on the button 9A, the CPU 23 outputs a drive pulse from the second motor control circuit 30E, so as to subject the city hand 4D to one-step normal rotation (rightward rotation corresponding to a clockwise direction) (SD1). In this case, in conjunction with the movement of the city hand 4D, the CPU 23 sets a completion number of steps which is a total number of steps until driving of the minute hand 6D and the hour hand 7D is completed, and initializes a variable n for counting the number of steps to 0.

For example, in a case where the city hand 4D indicates a time zone as a result of advancing by one hour, the CPU 23 sets the completion number of steps to 180 which is the number of steps for moving the minute hand 6D and the hour hand 7D by +60 minutes. In a case where the city hand 4D indicates a time zone as a result of advancing by thirty minutes, the CPU 23 sets the completion number of steps to 90.

In a case where the city hand 4D indicates a time zone as a result of returning by one hour, the CPU 23 sets the completion number of steps to 1980 (=180×11). In the present embodiment, since the minute hand 6D and the hour hand 7D driven by the third motor control circuit 30F are set to be movable only in the normal rotation direction, in a case where the city hand 4D is returned by one hour, the minute hand 6D and the hour hand 7D are moved in the normal rotation direction by eleven hours due to the twelve-hour clock.

Next, the CPU 23 starts fast-forward control of the minute hand 6D and the hour hand 7D (SD2), and turns on the driver 51 of the third motor control circuit 30F for the minute and hour hands (SD3).

After the driver 51 is turned on, the CPU 23 detects the current I flowing through the coil 130 by using the current detection circuit 18D, and determines whether or not the current I is equal to or more than the upper limit current value Imax (SD4). In a case where a determination result in SD4 is NO, the CPU 23 continuously performs the determination process in SD4.

In a case where a determination result in SD4 is YES, the CPU 23 turns off the driver 51 (SD5). Thereafter, the CPU 23 determines whether or not the current I flowing through the coil 130 is equal to or less than the lower limit current value Imin (SD6). In a case where a determination result in SD6 is NO, the CPU 23 continuously performs the determination process in SD6.

In a case where a determination result in SD6 is YES, the CPU 23 determines whether a step is the first step after drive starting or the first step after drive resuming (SD7).

In a case where a determination result in SD7 is NO, the CPU 23 determines whether or not a proportion of the period Ton in which the driver 51 is in an ON state is higher than that in the previous time (SD8). The proportion of the period Ton is obtained by Ton/(Ton+Toff).

Here, the period Ton, the period Toff, the induced voltage V, the drive voltage E, the drive current i, and the coil resistance R have a relationship of the following Equation (6), and a timing which is the optimum for switching a drive polarity may be estimated on the basis of the induced voltage V.

$$V = E * Ton/(Ton+Toff) - R*i \qquad (6)$$

Figure 28:
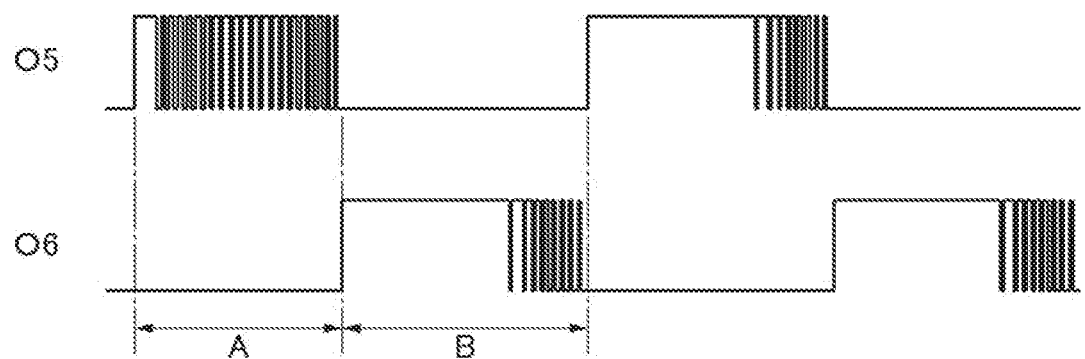
FIG. 28 is a waveform diagram illustrating motor drive signals according to the fourth embodiment.
Figure 29:
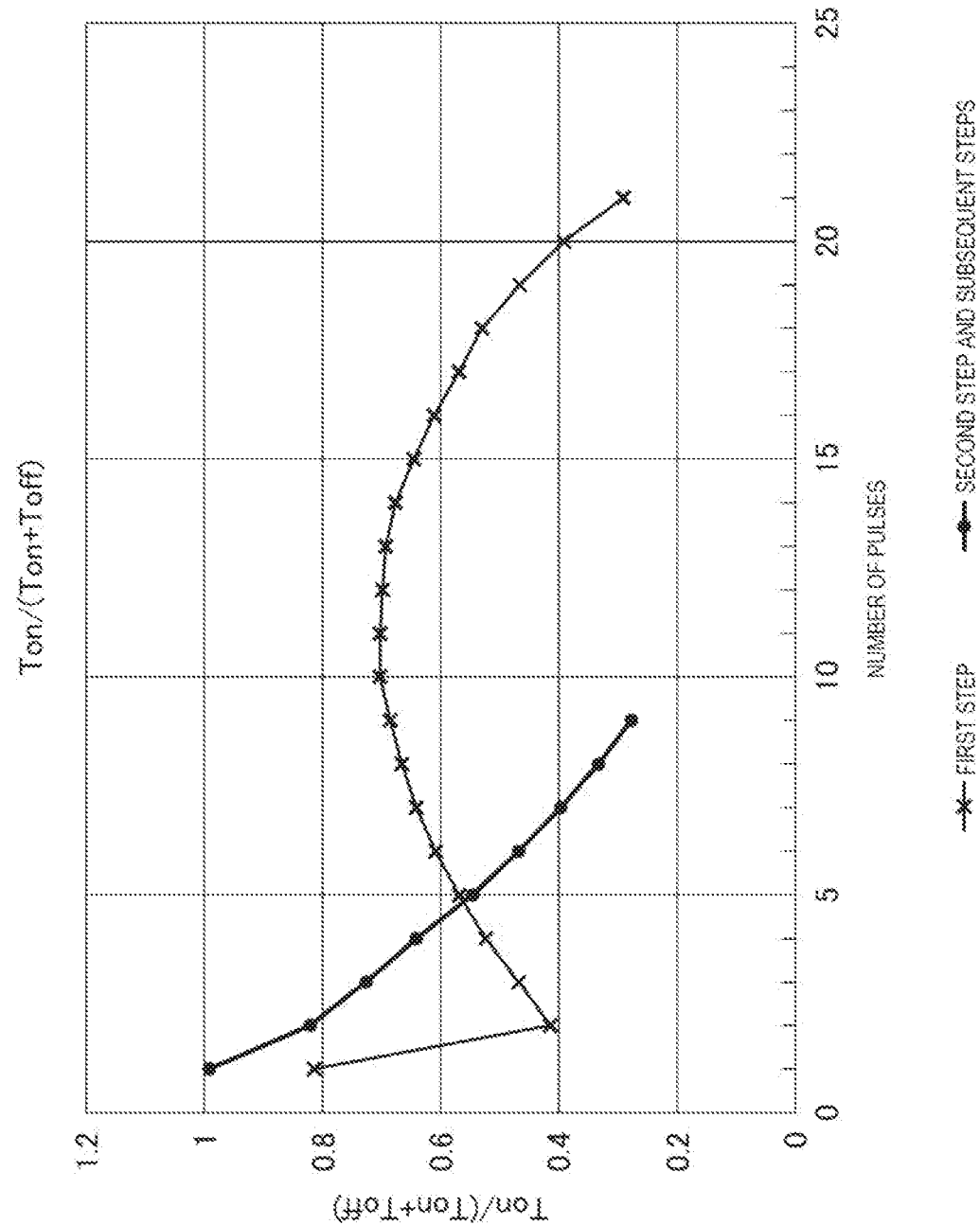
FIG. 29 is a graph illustrating a relationship between the number of pulses of a motor drive signal and a proportion of an ON time according to the fourth embodiment.

FIG. 28 is a waveform diagram illustrating drive signals during normal control in the output terminals O5 and O6 connected to the coil 130 of the third motor 16, and FIG. 29 is a graph illustrating Ton/(Ton+Toff) in the first and second steps. In other words, as illustrated in FIG. 28, the first step is a period A in which a drive signal is output from the output terminal O5, and the second step is a period B in which a drive signal is output from the output terminal O6.

As illustrated in FIGS. 28 and 29, a proportion of Ton in each pulse in the first step, that is, Ton/(Ton+Toff) is 0.8 in a first pulse, decreases to about 0.4 in a second pulse, then gradually increases up to tenth to twelfth pulses, and then decreases.

Ton/(Ton+Toff) in the second step is about 1.0 in a first pulse, and has a tendency to decrease according to an increase in the number of pulses.

Figure 30:
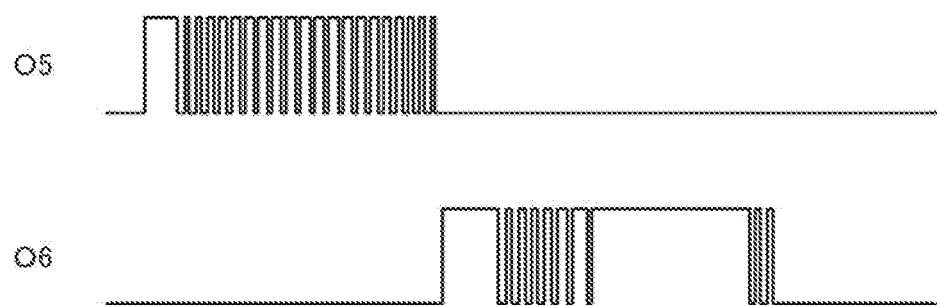
FIG. 30 is a waveform diagram illustrating motor drive signals according to the fourth embodiment.
Figure 31:
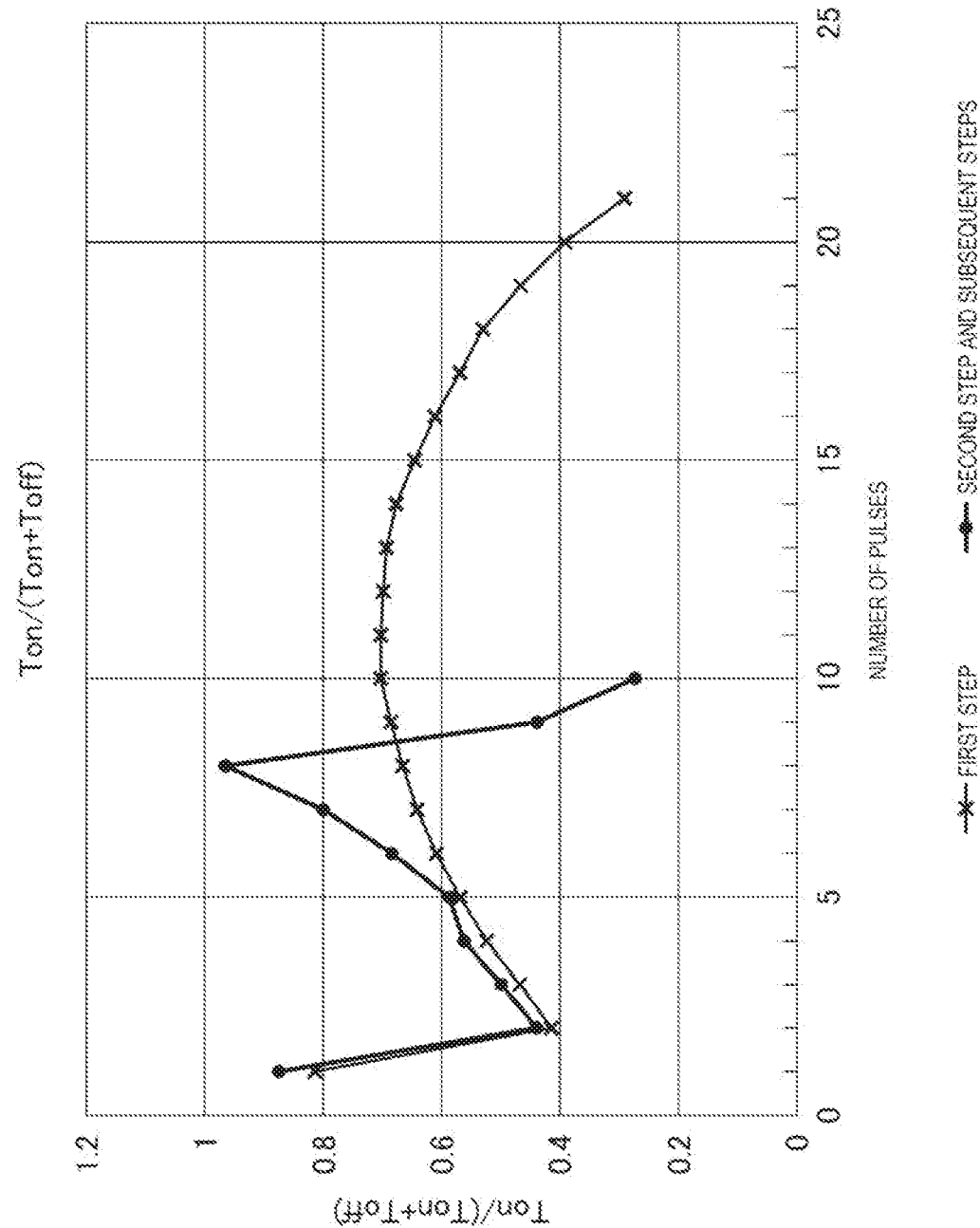
FIG. 31 is a graph illustrating a relationship between the number of pulses of a motor drive signal and a proportion of an ON time according to the fourth embodiment.

On the other hand, in a case where a hand is moved under an external magnetic field, the above-described relationship may not be established due to the influence of the magnetic field, and thus Ton/(Ton+Toff) changes unlike during normal times. FIGS. 30 and 31 illustrate an example thereof. Ton/(Ton+Toff) is the same as during normal times in the first step, but, in the second step and subsequent steps, Ton/(Ton+Toff) greatly decreases in a second pulse, then increases up to an eighth pulse, and then rapidly decreases. In such an environment, for example, Ton/(Ton+Toff) in the second pulse may possibly decrease to a switching setting value (0.3 in the present embodiment) or less, and thus it may be wrongly determined that the rotor 133 is rotated before the rotor 133 is rotated by 180 degrees. The switching setting value is not limited to 0.3, and may be set according to a specification or the like of the motor 16.

The CPU 23 determines whether or not Ton/(Ton+Toff) is higher than that in the previous time (SD8) in a case of the second step and subsequent steps (NO in SD7). A case where Ton/(Ton+Toff) is higher than that in the previous pulse in the second step and subsequent steps is a case where a hand is moved under an external magnetic field as described above.

In a case where a determination result in SD8 is NO, and a determination result in SD7 is YES, the CPU 23 determines whether or not Ton/(Ton+Toff) is equal to or lower than 0.3 (SD9). As illustrated in FIGS. 29 and 31, in control in the first step, Ton/(Ton+Toff) decreases to about 0.4 in a second pulse, but, then, gently increases, and then decreases. A case where Ton/(Ton+Toff) is equal to or lower than 0.3 is a case where the rotor 133 is regarded to be rotated by 180°. Also in control in the second step, Ton/(Ton+Toff) is equal to or lower than 0.3 in a case where the rotor 133 is regarded to be rotated by 180°.

Thus, in the present embodiment, in SD9, it is determined whether or not Ton/(Ton+Toff) is equal to or lower than 0.3, and thus it is determined whether or not the rotor 133 is rotated.

In the present embodiment, the rotation determination condition for the rotor 133 in SD9 is used in both of the first step and the second step, but a rotation determination condition in the first step may be separately set by taking into consideration the tendency illustrated in FIGS. 29 and 31.

Figure 26:
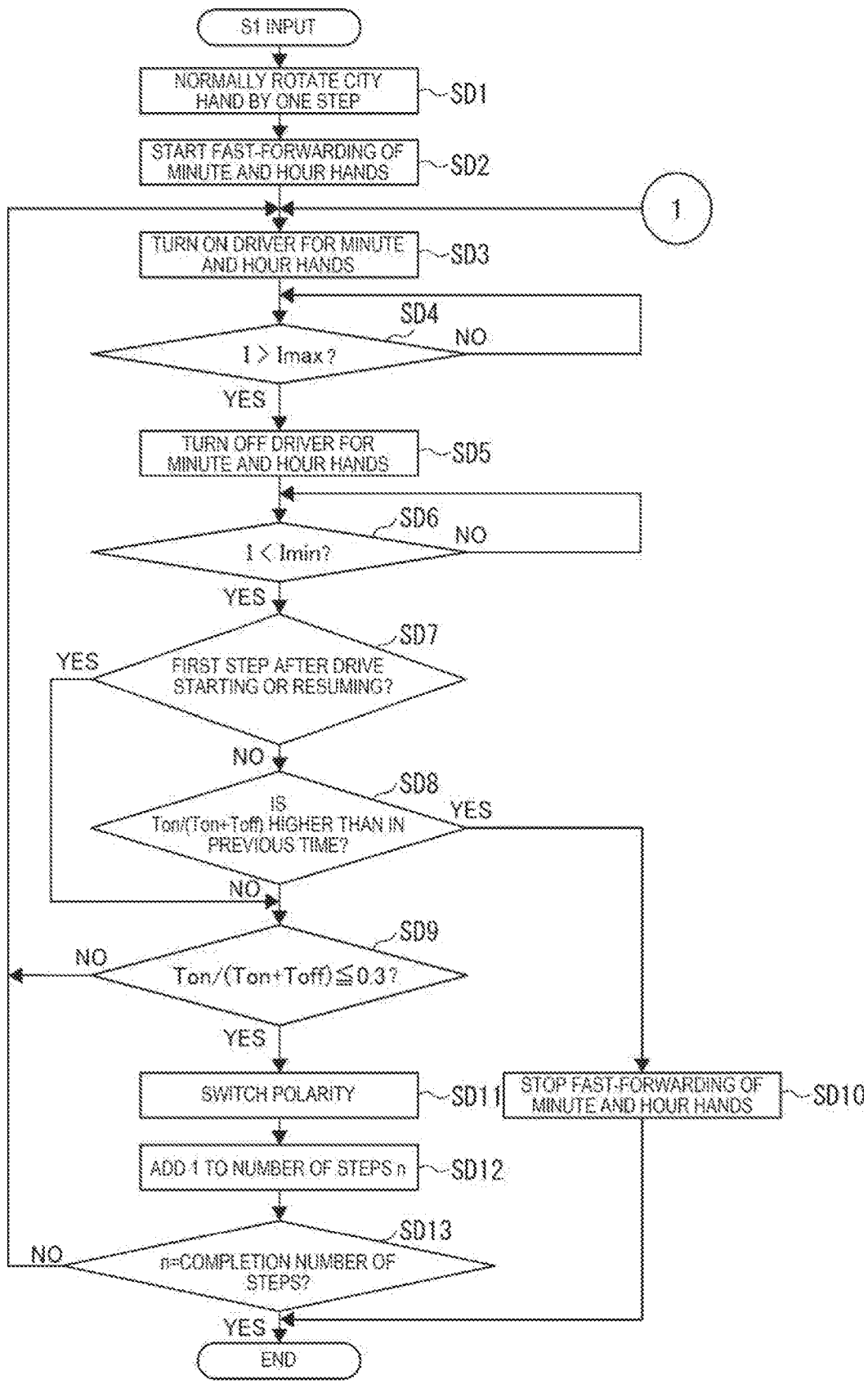
FIG. 26 is a flowchart illustrating a motor control process according to the fourth embodiment.

On the other hand, in FIG. 26, in a case where a determination result in SD7 is NO, and a determination result in SD8 is YES, there is a high probability that the influence of an external magnetic field may be received. Therefore, in a case where a determination result in SD8 is YES, the CPU 23 stops driving of the driver 51, also stops the fast-forwarding process for the minute and hour hands (SD10), and finishes the process. In this case, the minute hand 6D and the hour hand 7D are not corrected by a change amount of a time zone, but fast-forwarding is resumed in a case where the influence of an external magnetic field disappears through an interruption process per second which will be described later.

In a case where a determination result in SD9 is NO, the CPU 23 repeatedly performs the processes in SD3 to SD9.

In a case where a determination result in SD9 is YES, the CPU 23 switches a polarity (SD11), and adds 1 to the number of steps n (SD12). The CPU 23 determines whether or not the number of steps n is the completion number of steps (for example, 180) (SD13), returns to SD3 in a case where a determination result in SD13 is NO, and continuously performs fast-forwarding of the minute hand 6D and the hour hand 7D. In a case where a determination result in SD13 is YES, the CPU 23 determines that fast-forwarding of the minute hand 6D and the hour hand 7D, corresponding to the change amount (for example, one hour) of the time zone, is finished, and finishes the driving.

Next, a description will be made of an interruption process of 1 Hz performed by the CPU 23 in order to move the second hand 5D with reference to FIG. 27.

The CPU 23 detects an external magnetic field every second in order to move the second hand 5D (SD21). Specifically, an external magnetic field detection pulse is output from the first motor control circuit 30D to the coil 130 of the first motor 14, and an induced voltage generated in the coil 130 is detected by the magnetic field detection circuit 17D such that an external magnetic field is detected.

The CPU 23 determines the presence or absence of an external magnetic field on the basis of a detection result in the magnetic field detection circuit 17D (SD22). In a case where it is determined that an external magnetic field is present (YES in SD22), the CPU 23 causes the first motor control circuit 30D to move the second hand 5D with a fixed pulse (SD23). In a case where it is determined that an external magnetic field is absent (NO in SD22), the CPU 23 causes the first motor control circuit 30D to move the second hand 5D according to the above-described low power consumption drive control (SD24).

In a case where the second hand 5D is moved in SD24, the CPU 23 determines whether or not fast-forwarding of the minute and hour hands is stopped (SD25). In a case where a determination result in SD25 is YES, the CPU 23 returns to SD23 in FIG. 26, and resumes the fast-forwarding process of the minute and hour hands. In other words, stopping of fast-forwarding of the minute and hour hands (SD10) is performed in a case where a determination result in SD8 in FIG. 26 is YES, that is, there is the influence of an external magnetic field, and thus fast-forwarding may be resumed in a case where it is determined that an external magnetic field disappears.

In a case where a determination result in SD25 is NO, and the second hand is moved in SD23, the CPU 23 determines that fast-forwarding of the minute and hour hands is being performed (SD26). An interruption process of one second occurs not only during changing of a time zone but also during normal time display. Therefore, a case where a determination result in SD25 is NO includes a case where fast-forwarding of the minute and hour hands is performed, and the minute and hour hands are moved for normal time display without performing fast-forwarding.

Similarly, a case where an external magnetic field is detected and the second hand is moved with a fixed pulse includes a case where fast-forwarding of the minute and hour hands is performed, and the minute and hour hands are moved for normal time display without performing fast-forwarding. For example, as illustrated in FIG. 26, fast-forwarding of the minute and hour hands is not stopped in the first step (YES in SD7) after drive starting, and thus fast-forwarding of the minute and hour hands may be performed even in a case where an external magnetic field is detected through an interruption process of 1 Hz.

Therefore, the CPU 23 determines whether or not fast-forwarding of the minute and hour hands is performed in SD26, and causes the third motor control circuit 30F to perform a normal display process using the minute and hour hands (SD27) in a case where the fast-forwarding is not performed (No in SD26). In the present embodiment, the CPU 23 drives the third motor control circuit 30F by one step every twenty seconds, and moves the minute hand 6D twice, that is, by ⅓ of the scale (6 degrees) of one minute.

Figure 27:
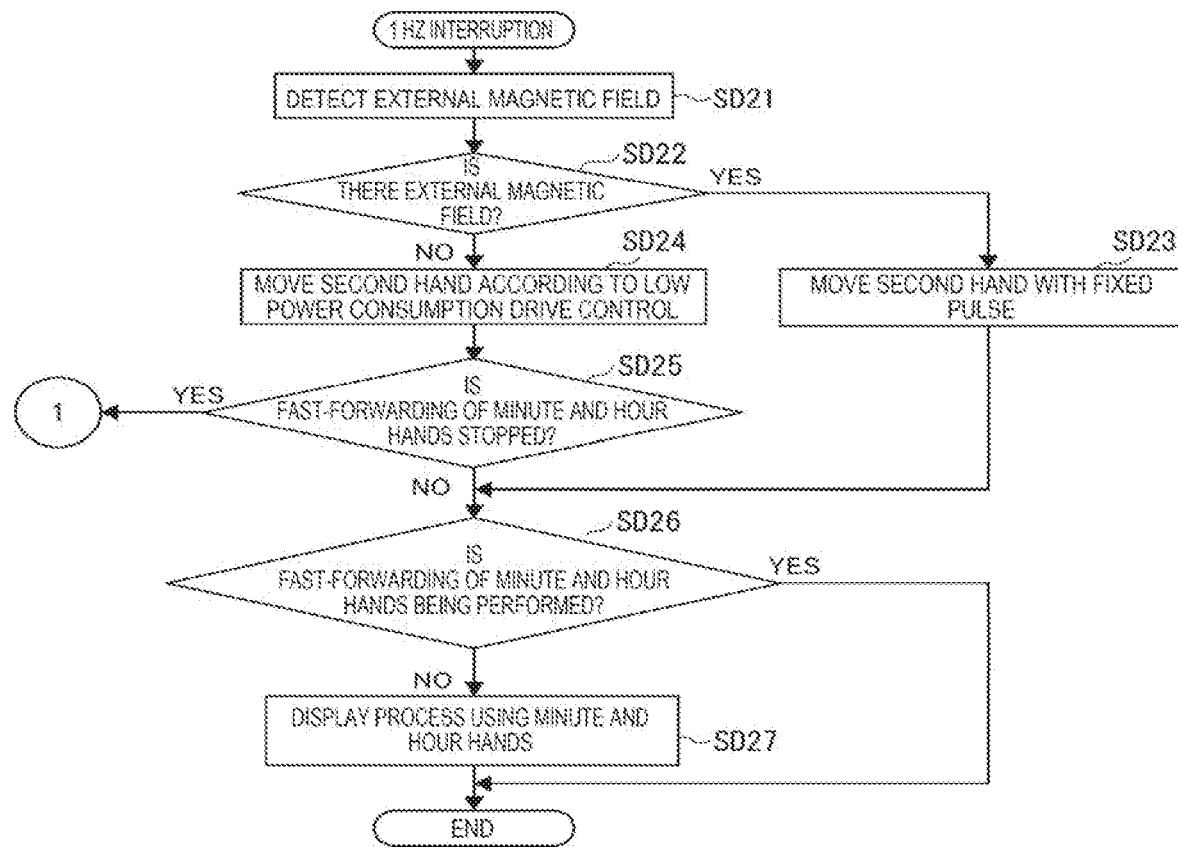
FIG. 27 is a flowchart illustrating the motor control process according to the fourth embodiment.

On the other hand, in a case where a determination result in SD26 is YES, since fast-forwarding of the minute and hour hands is performed in the flowchart in FIG. 26, the third motor control circuit 30F is not required to be controlled in the flowchart in FIG. 27, and thus the process is finished.

Effects of Fourth Embodiment

According to the fourth embodiment, the same effects as those in the first to third embodiments can be achieved.

In other words, in the motor control circuit 30D, in control after the second step and subsequent steps, in a case where a proportion of an ON time in each pulse is higher than in the previous pulse, that is, Ton/(Ton+Toff) is higher than in the previous time (YES in SD8), it is determined that there is the influence of a disturbance such as an external magnetic field, driving of the driver 51 is stopped, and a fast-forwarding process for the minute and hour hands is stopped. Therefore, it is possible to prevent the motor 13 from being driven in a state of being influenced by the disturbance such as an external magnetic field, and therefore to prevent the occurrence of a problem that the motor 13 is not accurately controlled due to the disturbance, and thus a hand position is inaccurate.

In the first step in which an operation which is different from that in the second step and subsequent steps is performed, the determination in SD8 is not performed, and thus it is possible to prevent a wrong determination of the presence or absence of a disturbance in the first step.

In SD9, since it is detected that Ton/(Ton+Toff) is reduced to 0.3 or less, and it is determined that the rotor 133 is rotated up to a predetermined angle, driving of the rotor 133 in each step can be performed with high accuracy.

The motor control circuit 30D is provided with the current detection circuit 18D which compares the current I flowing through the coil 130 with the upper limit current value Imax and the lower limit current value Imin, turns off the driver 51 in a case where the current I exceeds the upper limit current value Imax, and turns on the driver 51 in a case where the current I is less than the lower limit current value Imin. Therefore, it is possible to simplify drive control for the driver 51.

The motor control circuit 30D can be easily configured since the CPU 23 controls the driver 51 without using a dedicated logic circuit performing drive control for the driver 51.

In the fourth embodiment, in a case where Ton/(Ton+Toff) is higher than in the previous time after the second step and subsequent steps (YES in SD8), it is determined that there is the influence of an external magnetic field, and fast-forwarding of the minute and hour hands is stopped, but a result of detecting a magnetic field every second in SD21 may be held, and fast-forwarding of the minute and hour hands may be temporarily prohibited according to the result.

Detection of an external magnetic field is not limited to a case of being performed by using the first motor 14, and may be performed by using the second motor 15 driving the city hand 4D. In other words, a magnetic field detection pulse has a small pulse width, and does not rotate the rotor 133, and thus an external magnetic field may be detected by using any motor.

Fifth Embodiment

Next, a fifth embodiment of the present disclosure will be described with reference to FIGS. 32 and 33.

In the fifth embodiment, a control flow in the electronic timepiece 1D of the fourth embodiment is changed. Therefore, a configuration or the like of the electronic timepiece 1D is the same as that in the fourth embodiment, and thus a description thereof will be omitted.

Figure 32:
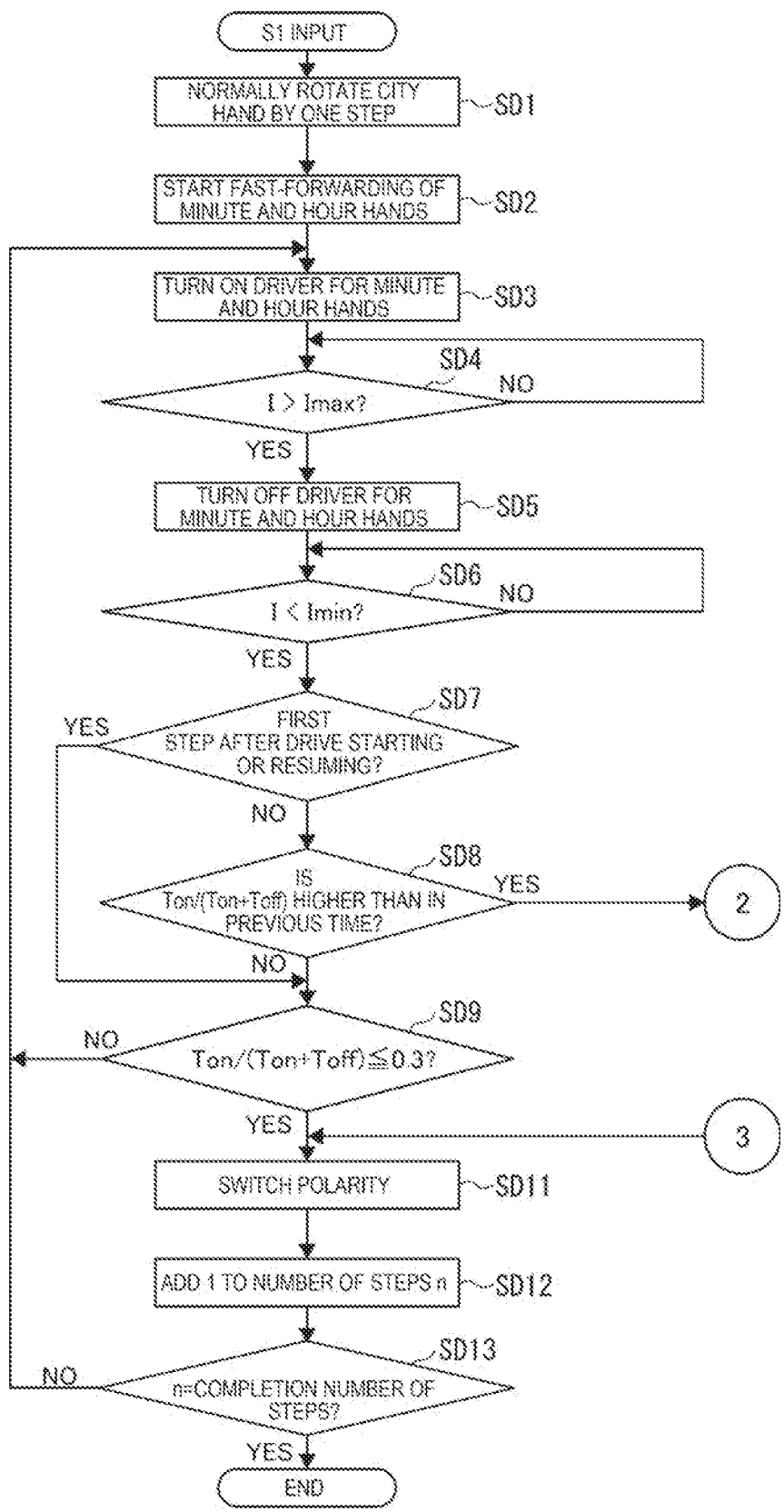
FIG. 32 is a flowchart illustrating a motor control process according to a fifth embodiment.
Figure 33:
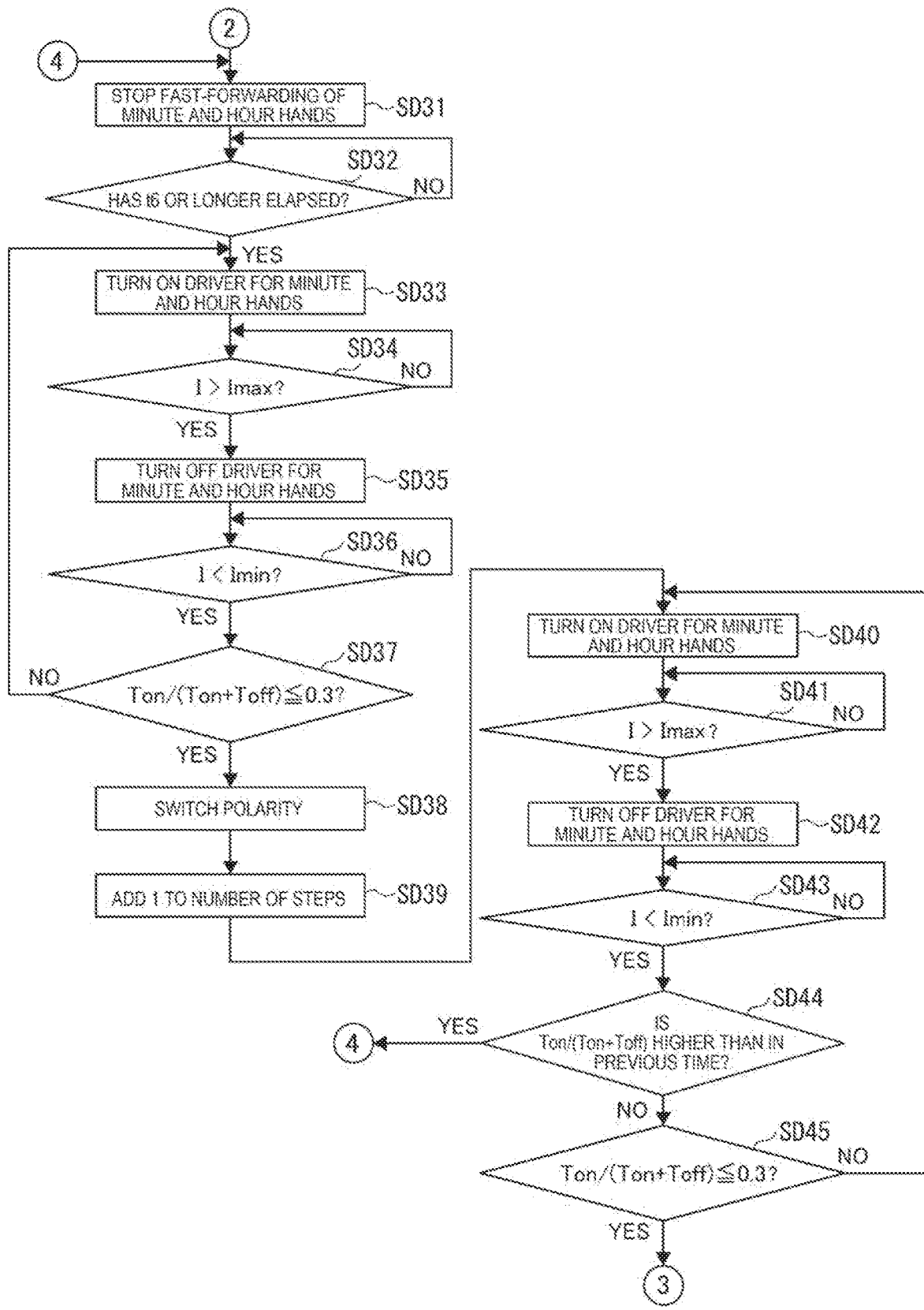
FIG. 33 is a flowchart illustrating the motor control process according to the fifth embodiment.

In the fifth embodiment, as illustrated in FIGS. 32 and 33, in a case where fast-forwarding of the minute and hour hands is stopped due to an external magnetic field, two-step driving is performed, it is determined whether or not the influence of the external magnetic field disappears on the basis of a relationship between the ON period Ton and the OFF period Toff of the driver 51 at that time, and it is controlled whether or not fast-forwarding of the minute and hour hands is resumed on the basis of a result thereof.

Thus, fast-forwarding control for the minute and hour hands in FIG. 32 (SD1 to SD13) is the same as the control in the fourth embodiment in FIG. 26, and is thus given the same reference sign, and a description thereof will be omitted.

In the fifth embodiment, in a case where a determination result in SD8 is YES, that is, it is determined that there is the influence of an external magnetic field, the CPU 23 performs a process in FIG. 33. In other words, the CPU 23 stops fast-forwarding of the minute and hour hands (SD31), and waits for a standby setting time t6 to elapse (SD32). The time t6 is, for example, one second, and may be set to a time for which it can be expected that the influence of an external magnetic field disappears in a case where the CPU 23 waits for the time t6.

After the time t6 elapses, the CPU 23 performs two-step driving, that is, performs the same processes in SD3 to SD12 in FIG. 32 twice, determines the presence or absence of an external magnetic field again, and determines whether or not fast-forwarding of the minute and hour hands is resumed according to a determination result.

Thus, after a determination result in SD32 is YES, the CPU 23 turns on the driver 51 of the third motor control circuit 30F for the minute and hour hands (SD33), and determines whether or not the current I exceeds the upper limit current value Imax (SD34).

The CPU 23 repeatedly performs the determination process in SD34 until a determination result in SD34 is YES, and turns off the driver 51 in a case where a determination result is YES (SD35).

After the process in SD35 is performed, the CPU 23 determines whether or not the current I is less than the lower limit current value Imin (SD36), and repeatedly performs the determination process in SD36 until a determination result in SD36 is YES.

In a case where a determination result in SD36 is YES, the CPU 23 determines whether or not Ton/(Ton+Toff) is equal to or lower than 0.3, that is, the rotor 133 is rotated by a predetermined angle (SD37).

In a case where a determination result in SD37 is NO, the CPU 23 returns to SD33 and continuously performs the process, and, in a case where a determination result is YES, the CPU 23 switches a polarity (SD38) and adds 1 to the number of steps n (SD39) in the same manner as in SD11 and SD12. Consequently, one-step driving is finished.

Next, the CPU 23 starts driving in the second step, turns on the driver 51 of the third motor control circuit 30F (SD40), determines whether or not the current I exceeds the upper limit current value Imax (SD41), and turns off the driver 51 (SD42) in a case where a determination result in SD41 is YES.

After the process in SD42 is performed, the CPU 23 determines whether or not the current I is equal to or less than the lower limit current value Imin (SD43), determines whether or not Ton/(Ton+Toff) is higher than in the previous time, that is, there is the influence of an external magnetic field (SD44) in a case where a determination result in SD43 is YES, and returns to SD31 and performs two-step driving again in a case where a determination result in SD44 is YES.

On the other hand, in a case where a determination result in SD44 is NO, the CPU 23 determines whether or not the Ton/(Ton+Toff) is equal to or lower than 0.3, that is, the rotor 133 is rotated by a predetermined angle (SD45), returns to SD40 and continuously performs the process in a case where a determination result in SD45 is NO, returns to SD11 and continuously performs the process since it is not necessary to detect the presence or absence of an external magnetic field through two-step driving in a case where a determination result is YES, and performs fast-forwarding of the minute and hour hands to a position corresponding to a changed time zone.

Effects of Fifth Embodiment

According to the fifth embodiment, the same effects as those in the fourth embodiment can be achieved.

In the fourth embodiment, in a case where fast-forwarding of the minute and hour hands is stopped due to the influence of an external magnetic field, the presence or absence of an external magnetic field is detected during an interruption process of 1 Hz for second driving, and fast-forwarding is resumed, but, in the fifth embodiment, the presence or absence of an external magnetic field is determined during driving every two steps of the third motor 16 driving the minute and hour hands, and fast-forwarding is resumed. In other words, since a process is completed in the third motor control circuit 30F, the fifth embodiment is applicable to a timepiece in which a second hand is normally driven with a fixed pulse, and which does not have an external magnetic field detection function.

In the fifth embodiment, in a case where a determination result in SD8 is YES, two-step driving is performed, but the influence of an external magnetic field may be determined in one step, and may be determined through plural-step driving of three or more steps.

Other Embodiments

The present disclosure is not limited to the above embodiments, and modifications, alterations, and the like within the scope of the present disclosure capable of realizing some aspects of the embodiments are included in the present disclosure.

For example, in the motor control circuit 30C of the third embodiment, an ON time of the driver 51, polarity switching based on an elapsed time from starting of a step, and stopping of driving of the driver are selected, but only an ON time of the driver 51 may be selected. In the same manner as in the first modification example, polarity switching may be controlled for an ON time of the driver 51, and stopping of driving of the driver 51 may be controlled for an elapsed time from the time of starting driving or the time of switching a polarity. Such controls may be combined with each other.

In the third embodiment, the flow returns to SC2 after the standby setting time t4 elapses in SC13, but, in the same manner as in the second embodiment, control may be performed such that an external magnetic field is detected instead of SC13, and the flow returns to SC2 in a case where it is determined that there is no external magnetic field.

A magnetic field detector is not limited to detecting an external magnetic field through chopper amplification, such as the magnetic field detection circuit 71, and may include a control unit that brings at least one end of the coil 130 into any one of a high impedance state, a pull-down state, and a pull-up state, and a voltage detection unit that detects a voltage generated in one end of the coil 130. A dedicated magnetic sensor may be used.

In the above-described respective embodiments, the electronic timepiece 1 is of a wristwatch type but may be, for example, a table clock. The motor control circuit of the embodiments of the present disclosure is not limited to controlling a motor driving a pointer of a timepiece, and may be applied to a control circuit or the like for a motor for a pointer indicating a measured value in each of various meters. Particularly, since a difference in a drive amount of a motor is small even in a case where the influence of a disturbance is received, the motor control circuit is not limited to an electronic timepiece, and may be used for various electronic apparatuses.

What is claimed is:
1. A movement comprising:
a motor having a coil and a rotor;
a driver that has an ON state and an OFF state, and outputs a drive signal to the coil so as to drive the motor and rotate the rotor;
a lower limit detector configured to determine whether a current flowing through the coil in response to the drive signal is less than a lower limit, wherein the lower limit detector (i) detects the current flowing through the coil during rotation of the rotor and at a same time that the rotor is being rotated one step and (ii) compares the current detected during the rotation of the rotor to the lower limit;
a drive controller that brings the driver into the ON state based on a detection result in the lower limit detector, and brings the driver into the OFF state based on an elapsed time from the driver being brought into the ON state;
a polarity switcher that switches a polarity of the drive signal when an OFF time satisfies a polarity switching condition, the OFF time being an elapsed time from the driver being brought into the OFF state; and
a drive stopper that stops driving of the driver in response to the OFF time satisfying a drive stopping condition, wherein the drive stopping condition corresponds to a determination that the OFF time exceeds a first stop determination time, and wherein the first stop determination time corresponds to a predetermined time subsequent to the driver being brought into the OFF state.

2. The movement according to claim 1,
wherein the polarity switcher determines that the polarity switching condition is satisfied when the OFF time is longer than a first switching determination time, and is shorter than a first stop determination time.

3. The movement according to claim 1, further comprising:
a timer that detects that an elapsed time from the driver being stopped by the drive stopper, and
wherein the drive controller resumes driving of the driver when the timer detects that the elapsed time becomes equal to a standby setting time.

4. The movement according to claim 1, further comprising:
a magnetic field detector that detects an external magnetic field,
wherein the drive controller resumes driving of the driver according to an output from the magnetic field detector after the driver has been stopped by the drive stopper.

5. The movement according to claim 4,
wherein the magnetic field detector includes:
- a controller that brings at least one end of the coil into any of a high impedance state, a pull-down state, and a pull-up state; and
- a voltage detector that detects a voltage generated in one end of the coil.

6. The movement according to claim 4,
wherein the magnetic field detector includes:
- a chopper amplification circuit that subjects a voltage generated in at least one end of the coil to chopper amplification, and
- a voltage detector that detects the voltage.

7. The movement according to claim 1,
wherein the drive controller:
- outputs the drive signal in one step or a plurality of steps after a standby setting time elapses from the driver being stopped by the drive stopper, and
- resumes driving of the driver when a drive stopping condition for the driver is not satisfied at the time of outputting the drive signal.

8. An electronic timepiece comprising:
a casing; and
the movement according to claim 1 housed within the casing.

9. A movement comprising:
- a driver that has an ON state and an OFF state, and outputs a drive signal to a coil of a motor so as to drive the motor and rotate a rotor of the motor;
- a lower limit detector configured to determine whether a current flowing through the coil in response to the drive signal is less than a lower limit, wherein the lower limit detector (i) detects the current flowing through the coil during rotation of the rotor and at a same time that the rotor is being rotated one step and (ii) compares the current detected during the rotation of the rotor to the lower limit;
- a drive controller that brings the driver into the ON state based on a detection result in the lower limit detector, and brings the driver into the OFF state based on an elapsed time from the driver being brought into the ON state;
- a polarity switcher that switches a polarity of the drive signal when an OFF time satisfies a polarity switching condition, the OFF time being an elapsed time from the driver being brought into the OFF state; and
- a drive stopper that stops driving of the driver in response to an elapsed time from a time of starting to drive the driver or a time of switching the polarity satisfying a drive stopping condition.

10. The movement according to claim 9,
wherein the polarity switcher determines that the polarity switching condition is satisfied when the elapsed time from the time of starting to drive the driver or the time of switching the polarity is shorter than a second stop determination time, and the OFF time is longer than a first switching determination time, and
wherein the drive stopper determines that the drive stopping condition is satisfied when the elapsed time from the time of starting to drive the driver or the time of switching the polarity is equal to or longer than the second stop determination time.

11. The movement according to claim 9, further comprising:
- a timer that detects that an elapsed time from the driver being stopped by the drive stopper, and wherein the drive controller resumes driving of the driver when the timer detects that the elapsed time becomes equal to a standby setting time.

12. The movement according to claim 9, further comprising:
- a magnetic field detector that detects an external magnetic field,
wherein the drive controller resumes driving of the driver according to an output from the magnetic field detector after the driver has been stopped by the drive stopper.

13. The movement according to claim 12,
wherein the magnetic field detector includes:
- a controller that brings at least one end of the coil into any of a high impedance state, a pull-down state, and a pull-up state; and
- a voltage detector that detects a voltage generated in one end of the coil.

14. The movement according to claim 12,
wherein the magnetic field detector includes:
- a chopper amplification circuit that subjects a voltage generated in at least one end of the coil to chopper amplification, and
- a voltage detector that detects the voltage.

15. The movement according to claim 9,
wherein the drive controller:
- outputs the drive signal in one step or a plurality of steps after a standby setting time elapses from the driver being stopped by the drive stopper, and
- resumes driving of the driver when a drive stopping condition for the driver is not satisfied at the time of outputting the drive signal.

16. A movement comprising:
- a motor having a coil and a rotor;
- a driver that has an ON state and an OFF state, and outputs a drive signal to the coil so as to drive the motor and rotate the rotor;
- an upper limit detector configured to determine whether a current flowing through the coil in response to the drive signal is more than an upper limit, wherein the upper limit detector (i) detects the current flowing through the coil during rotation of the rotor and at a same time that the rotor is being rotated one step and (ii) compares the current detected during the rotation of the rotor to the upper limit;
- a drive controller that brings the driver into the OFF state based on a detection result in the upper limit detector, and brings the driver into the ON state based on an elapsed time from the driver being brought into the OFF state;
- a polarity switcher that switches a polarity of the drive signal when an ON time satisfies a polarity switching condition, the ON time being an elapsed time from the driver being brought into the ON state; and
- a drive stopper that stops driving of the driver in response to the ON time satisfying a drive stopping condition.

17. The movement according to claim 16,
wherein the polarity switcher determines that the polarity switching condition is satisfied when the ON time is shorter than a second setting time after a first setting time elapses from the time of starting to drive the driver or the time of switching the polarity, and wherein the drive stopper determines that the drive stopping condition is satisfied when the ON time is shorter than the second setting time before the first setting time elapses from the time of starting to drive the driver or the time of switching the polarity.

* * * * *